US011383270B2

(12) United States Patent
Wauke et al.

(10) Patent No.: US 11,383,270 B2
(45) Date of Patent: Jul. 12, 2022

(54) VIBRATION GENERATOR FOR VIBRATING IN MULTIPLE DIRECTIONS

(71) Applicant: ALPS ALPINE CO., LTD., Tokyo (JP)

(72) Inventors: Tomokuni Wauke, Miyagi (JP); Takashi Ogihara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 344 days.

(21) Appl. No.: 16/774,208

(22) Filed: Jan. 28, 2020

(65) Prior Publication Data

US 2020/0156112 A1 May 21, 2020

Related U.S. Application Data

(63) Continuation of application No. PCT/JP2018/028661, filed on Jul. 31, 2018.

(30) Foreign Application Priority Data

Aug. 3, 2017 (JP) .............................. JP2017-151068
Oct. 13, 2017 (JP) .............................. JP2017-199862

(51) Int. Cl.
*H02K 33/18* (2006.01)
*B06B 1/04* (2006.01)
(Continued)

(52) U.S. Cl.
CPC .............. *B06B 1/045* (2013.01); *H02K 33/18* (2013.01); *H02K 33/16* (2013.01); *H02K 35/02* (2013.01)

(58) Field of Classification Search
CPC ........ H02K 33/16; H02K 33/18; H02K 35/02; H02K 35/04; B06B 1/045
See application file for complete search history.

(56) References Cited

U.S. PATENT DOCUMENTS

2010/0033030 A1  2/2010  Amemiya et al.
2013/0061736 A1  3/2013  Wauke
(Continued)

FOREIGN PATENT DOCUMENTS

CN     106411092 A  *  2/2017  ............. H02K 33/02
JP     2013-056309      3/2013
(Continued)

OTHER PUBLICATIONS

International Search Report for PCT/JP2018/028661 dated Oct. 16, 2018.

*Primary Examiner* — Eric Johnson
(74) *Attorney, Agent, or Firm* — IPUSA, PLLC

(57) ABSTRACT

A vibration generator includes a housing, a vibrating body accommodated in the housing, an elastic support supporting the vibrating body such that the vibrating body can vibrate along a first direction and a second direction intersecting each other, and a magnetic drive configured to drive the vibrating body along the first direction and the second direction using a magnetic force, and wherein the magnetic drive includes a plurality of first magnetic field generators disposed side by side at a predetermined interval in the vibrating body in the first direction or the second direction, and a plurality of second magnetic field generators disposed on positions facing both ends of each of the plurality of first magnetic field generators in the housing, and wherein a longitudinal direction of the housing is in a third direction intersecting the first direction and the second direction.

3 Claims, 34 Drawing Sheets

(51) Int. Cl.
    *H02K 33/16*     (2006.01)
    *H02K 35/02*     (2006.01)

(56) References Cited

U.S. PATENT DOCUMENTS

| | | | |
|---|---|---|---|
| 2017/0310203 A1* | 10/2017 | Takeda | H02K 33/16 |
| 2018/0166965 A1* | 6/2018 | Mao | H02K 33/16 |

FOREIGN PATENT DOCUMENTS

| | | | |
|---|---|---|---|
| JP | 2016-096677 | 5/2016 | |
| WO | 2007/086426 | 8/2007 | |
| WO | WO-2010021482 A2 * | 2/2010 | H02K 33/18 |

\* cited by examiner

VIBRATION GENERATOR FOR VIBRATING IN MULTIPLE DIRECTIONS

CROSS-REFERENCE TO RELATED APPLICATIONS

This application is a continuation of International Application PCT/JP2018/028661, filed on Jul. 31, 2018 and designated the U.S., which is based on and claims priority to Japanese patent application No. 2017-151068 filed on Aug. 3, 2017, and Japanese patent application No. 2017-199862 filed on Oct. 13, 2017. The entire contents of these applications are incorporated herein by reference.

BACKGROUND OF THE INVENTION

1. Field of the Invention

The disclosures herein relate to a vibration generator.

2. Description of the Related Art

In a mobile information terminal (for example, a smartphone, a mobile phone, and a tablet), a game console, and an electronic device such as an information display device installed in a vehicle such as a car, a vibration generator that can generate a vibration for giving various incoming notifications (for example, an incoming call, an incoming mail, and an incoming SNS message) and giving a feedback on a user operation to a user with a tactile feel, has been used.

As such a vibration generator, for example, a vibration generator that can vibrate the vibrating body along a vertical direction and a transverse direction (i.e., a direction orthogonal to a direction along a magnetic core) by providing a vibrating body supported by an elastic support and a permanent magnet inside a housing, supplying an alternating current to an electromagnet provided in the vibrating body, generating an alternating magnetic field around the electromagnet, and alternately generating an attractive force and a repulsive force between the electromagnet and the permanent magnet, has been known (for example, see Patent Document 1 below).

Related-Art Documents

Patent Document

[Patent Document 1] Japanese Laid-open Patent Publication No. 2016-96677

SUMMARY OF THE INVENTION

In recent years, size reduction of an electric device with a vibration generator installed is noticeable, and it demands a vibration generator to be thinner. However, in the vibration generator described in Patent Document 1 above, if the size of the vibration generator is reduced in a longitudinal direction overall, a longitudinal length of a coil provided in the electromagnet becomes short. Thus, in the vibration generator described in Patent Document 1 above, thrust force of the electromagnetic in a transverse direction becomes weak, and there is a possibility that it is difficult to obtain a sufficient vibration in the transverse direction. Therefore, a thin vibration generator that can generate a sufficient vibration in any of the multiple vibrating directions is desired.

According to one aspect of an embodiment, a vibration generator includes a housing, a vibrating body accommodated in the housing, an elastic support supporting the vibrating body such that the vibrating body can vibrate along a first direction and a second direction intersecting each other, and a magnetic drive configured to drive the vibrating body along the first direction and the second direction using a magnetic force, and wherein the magnetic drive includes a plurality of first magnetic field generators disposed side by side at a predetermined interval in the vibrating body in the first direction or the second direction, and a plurality of second magnetic field generators disposed on positions facing both ends of each of the plurality of first magnetic field generators in the housing, and wherein a longitudinal direction of the housing is in a third direction intersecting the first direction and the second direction.

According to another aspect of an embodiment, a vibration generator includes a housing, a vibrating body accommodated in the housing, an elastic support supporting the vibrating body such that the vibrating body can vibrate along a first direction and a second direction intersecting each other, and a magnetic drive configured to drive the vibrating body along the first direction and the second direction using a magnetic force, and wherein the magnetic drive includes a plurality of first magnetic field generators disposed side by side at a predetermined interval on the vibrating body in the first direction or the second direction, and a plurality of second magnetic field generators disposed on positions facing both ends of each of the plurality of first magnetic field generators in the housing, and wherein the vibrating body includes a weight between the plurality of first magnetic field generators.

According to still another aspect of an embodiment, a vibration generator includes a housing, a vibrating body accommodated in the housing, an elastic support supporting the vibrating body such that the vibrating body can vibrate along a first direction, and a magnetic drive configured to drive the vibrating body along the first direction using a magnetic force, and wherein the magnetic drive includes a plurality of coils disposed side by side at a predetermined interval in the vibrating body in the first direction, and a plurality of magnets disposed on positions facing both ends of each of the plurality of coils in the housing, wherein each of the plurality of coils extends in a third direction intersecting the first direction, and wherein a longitudinal direction of the housing is in the third direction.

According to a still further aspect of an embodiment, a vibration generator includes a housing, a vibrating body accommodated in the housing, an elastic support supporting the vibrating body such that the vibrating body can vibrate along a first direction, and a magnetic drive configured to drive the vibrating body along the first direction using a magnetic force, and wherein the magnetic drive includes a plurality of coils disposed side by side at a predetermined interval on the vibrating body in the first direction, and a plurality of magnets disposed on positions facing both ends of each of the plurality of coils in the housing, wherein each of the plurality of coils extends in a third direction intersecting the first direction, and wherein the vibrating body includes a weight between the plurality of coils.

DESCRIPTION OF THE PREFERRED EMBODIMENTS

First Embodiment

In the following, a first embodiment will be described with reference to the drawings.

(Configuration of a Vibration Generator 10)

Figure 1:
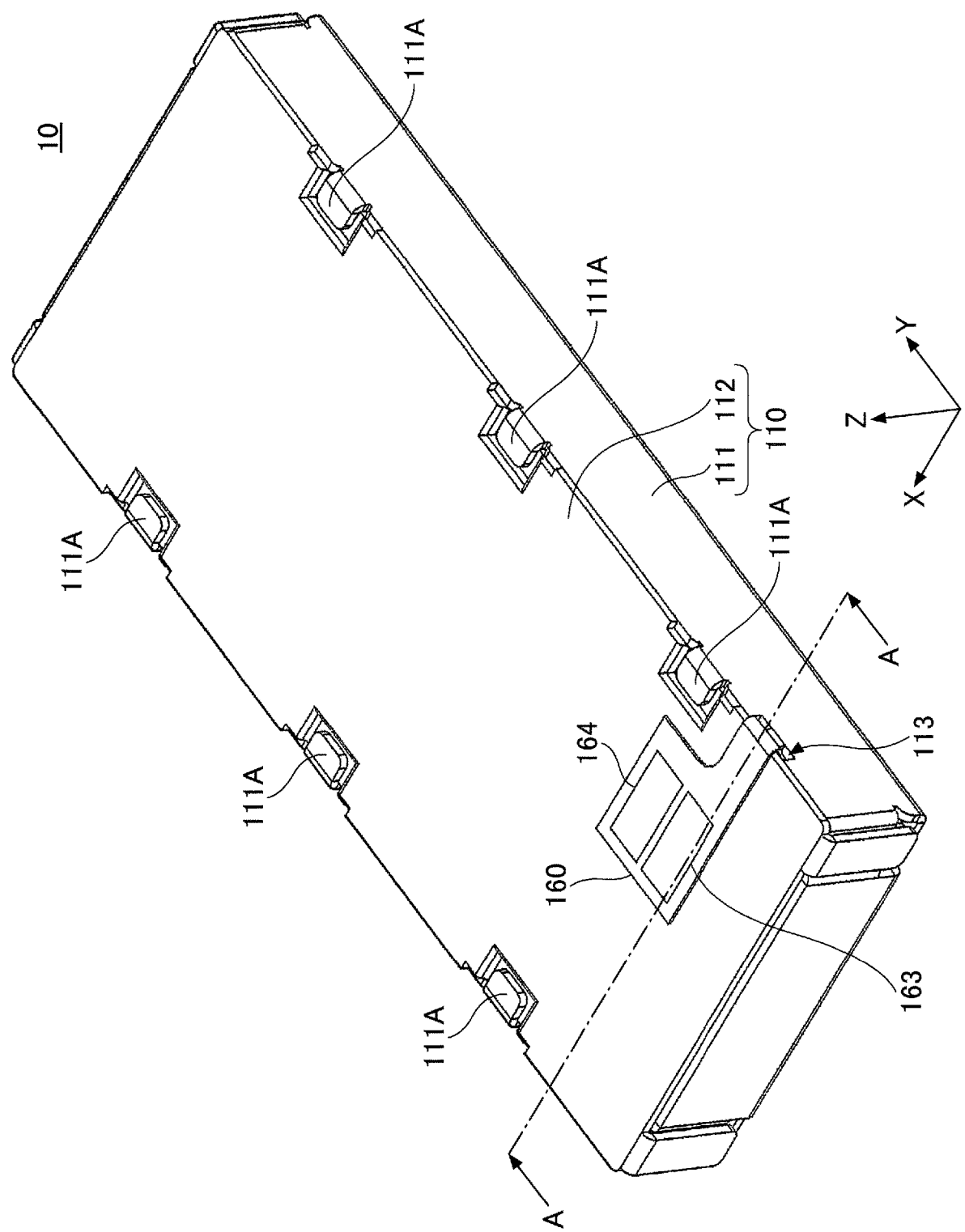
FIG. 1 is a perspective view illustrating a vibration generator according to a first embodiment.
Figure 2:
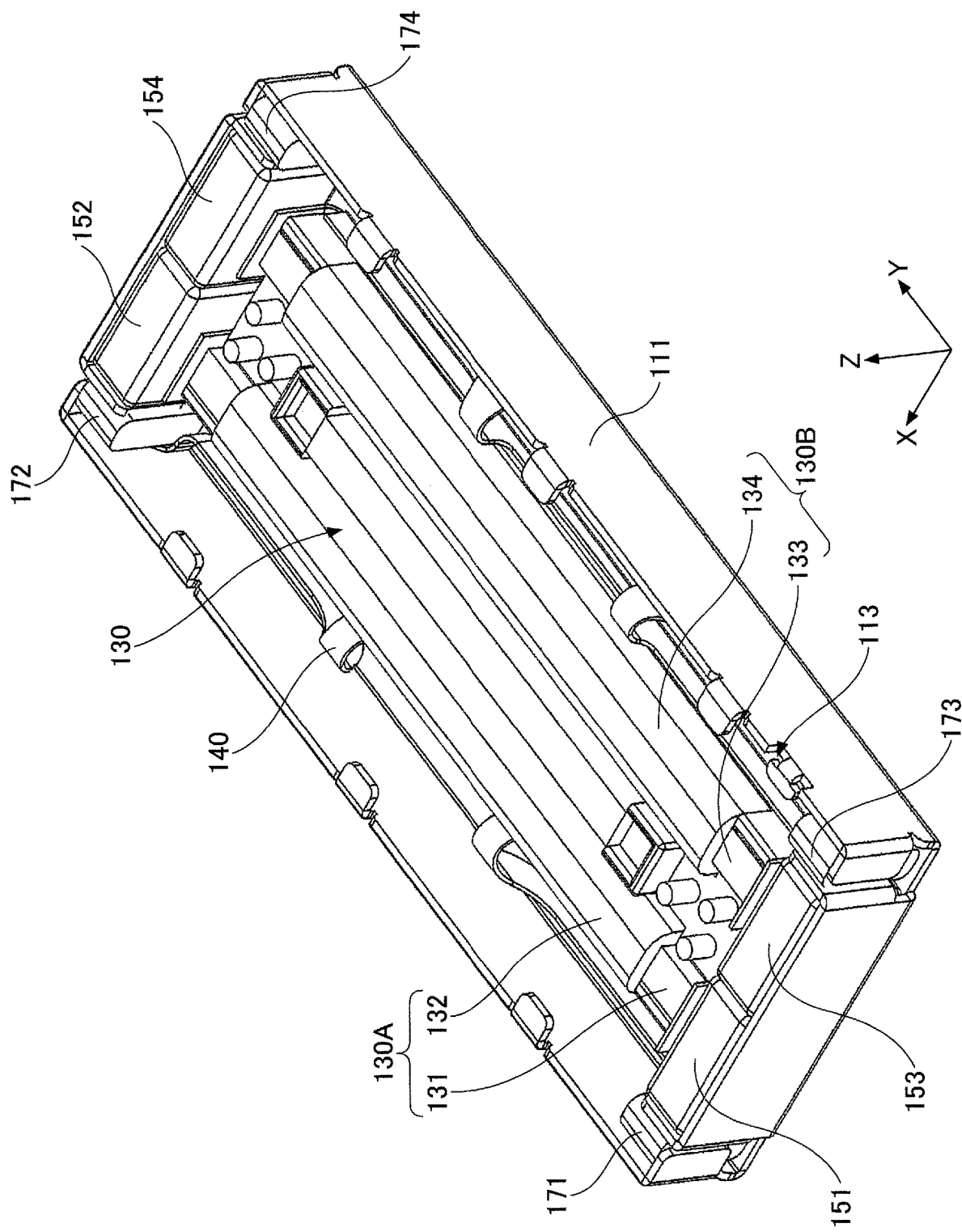
FIG. 2 is a perspective view illustrating a vibration generator (in a state in which an upper case and FPC are removed) according to a first embodiment.
Figure 3:
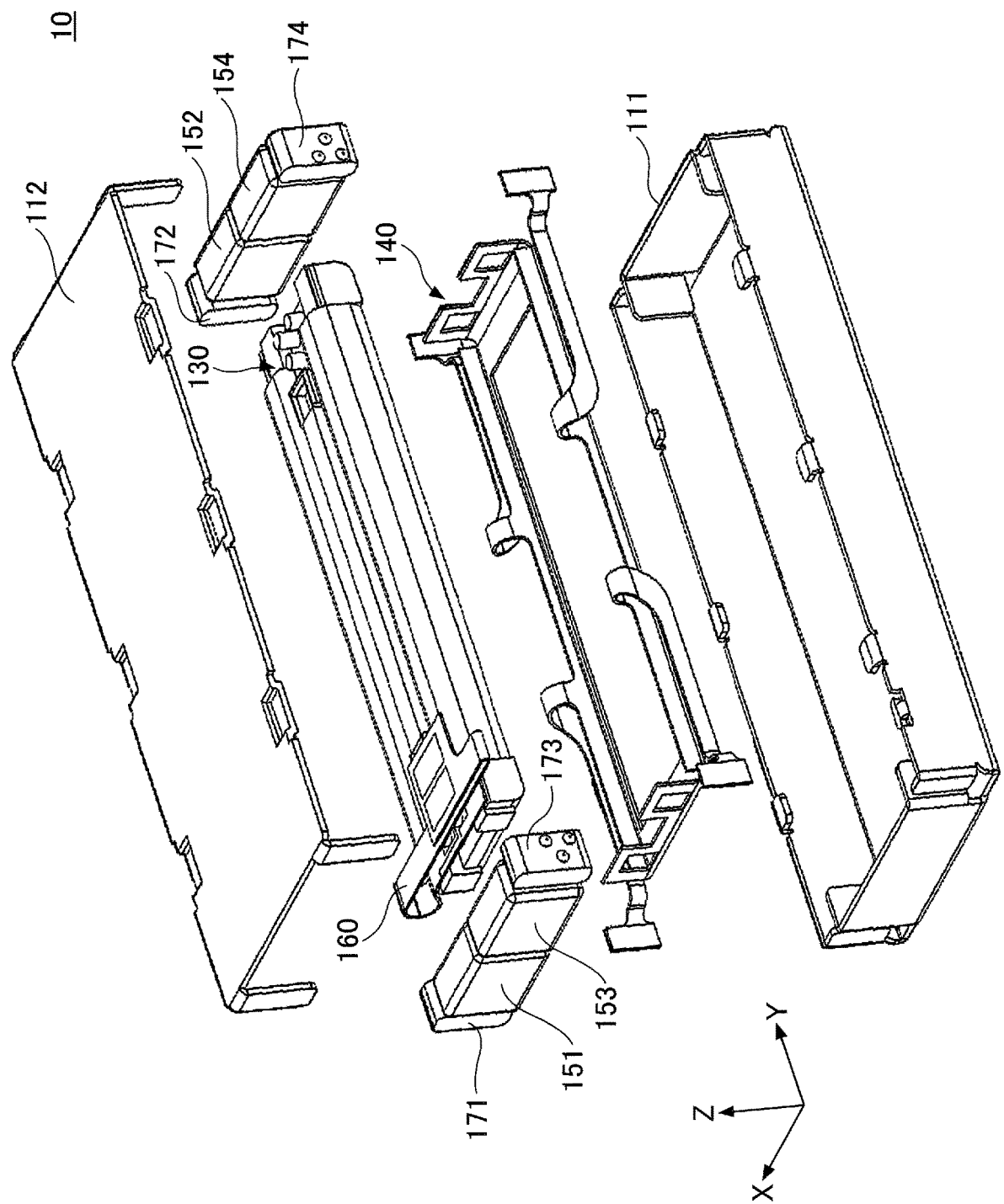
FIG. 3 is an exploded view of a vibration generator according to a first embodiment.

FIG. 1 is a perspective view illustrating a vibration generator 10 according to the first embodiment. FIG. 2 is a perspective view illustrating the vibration generator 10 (in a state in which an upper case 112 and FPC 160 are removed) according to the first embodiment. FIG. 3 is an exploded view of the vibration generator 10 according to the first embodiment. In the following description, for convenience, a Z axis direction in the drawing is a vertical direction or an up-down direction, an X axis direction in the drawing is a transverse direction or a left-right direction, and a Y axis direction in the drawing is a front-back direction.

The vibration generator 10 illustrated in FIG. 1 to FIG. 3 is, for example, a device installed in a mobile information terminal (for example, a smartphone, a mobile phone, and a tablet), a game console, and an electronic device such as an information display device installed in a vehicle such as a car. The vibration generator 10 is used in order to generate a vibration for giving various incoming notifications (for example, an incoming call, an incoming mail, and an incoming SNS message) and giving a feedback on a user operation to a user with a tactile feel, for example.

The vibration generator 10 is configured such that a vibrating body unit 130 provided in a housing 110 vibrates along the up-down direction (i.e., the Z axis direction in the drawing) and the left-right direction (i.e., the X axis direction in the drawing). Especially, the vibration generator 10 of the embodiment is a device that achieves thickness reduction in the up-down direction compared with a general vibration generator that vibrates along the up-down direction and the left-right direction. For example, in a general vibration generator (for example, the vibration generator described in Patent Document 1), a ratio between size in the up-down direction and size in the left-right direction is approximately 1:1. In the vibration generator 10 of the embodiment, a ratio between size in the up-down direction and size in the left-right direction is approximately 1:3. Additionally, the vibration generator 10 of the embodiment can obtain a sufficient vibration of the vibrating body unit 130 with achieving thickness reduction in the up-down direction, by providing two electromagnets arranged in the left-right direction (i.e., the X axis direction in the drawing) in the vibrating body unit 130.

As illustrated in FIG. 1 to FIG. 3, the vibration generator 10 includes the housing 110, the vibrating body unit 130, an elastic support 140, permanent magnets from 151 to 154, flexible printed circuits (FPC) 160, spacers from 171 to 174.

The housing 110 is formed by processing a metallic plate, and is a box-shaped member approximately forming a thin cuboid. The housing 110 includes a lower case 111 and an upper case 112 that can be separated from each other. The lower case 111 is a container-shaped member having an open upper portion. Inside the lower case 111, the other components (i.e., the vibrating body unit 130, the elastic support 140, the permanent magnets from 151 to 154, the FPC 160, and the spacers from 171 to 174) are assembled. The upper case 112 is a cover member, and closes the upper open portion of the lower case 111 by covering the upper open portion of the lower case 111. As illustrated in FIG. 1, the upper case 112 is fixed to the lower case 111 by multiple hooks 111A provided on an upper edge of the lower case 111. The multiple hooks 111A are folded inside and press the upper case 112 from above.

The vibrating body unit 130 is an example of a vibrating body. The vibrating body unit 130 includes a first electromagnet 130A and a second electromagnet 130B (i.e., an example of a first magnetic field generator constituting a magnetic drive) inside the vibrating body unit 130, and is a portion that vibrates along the up-down direction (i.e., the Z axis direction in the drawing) and the left-right direction (i.e., the X axis direction in the drawing) inside the housing 110 by generating a magnetic field with the first electromagnet 130A and the second electromagnet 130B.

The elastic support 140 is a member that enables the vibrating body unit 130 to vibrate by supporting the vibrating body unit 130 and elastically deforming in the up-down direction (i.e., the Z axis direction in the drawing) and the left-right direction (i.e., the X axis direction in the drawing) inside the housing 110.

The permanent magnets from 151 to 154 are examples of second magnetic field generators constituting a magnetic drive. The permanent magnets 151 and 153 are provided side by side in the transverse direction inside the housing 110 such that the permanent magnets 151 and 153 face ends (i.e., ends on a negative side of the Y axis in the drawing) of magnetic cores 131 and 133 provided in the vibrating body unit 130. The permanent magnets 152 and 154 are provided side by side in the transverse direction inside the housing 110 such that the permanent magnets 152 and 154 face the other ends (i.e., ends on a positive side of the Y axis in the drawing) of the magnetic cores 131 and 133 provided in the vibrating body unit 130.

The FPC 160 is a member connecting coils 132 and 134 to an external circuit (which is not illustrated) so as to supply an alternating current to the coils 132 and 134 provided in the first electromagnet 130A and the second electromagnet 130B of the vibrating body unit 130. The FPC 160 is a film-shaped member having a structure in which wiring formed by a metallic film is sandwiched by resin materials such as polyimide. The FPC 160 is flexible and can be bent. As illustrated in FIG. 1, an end of the FPC 160 on an external circuit side is exposed outside the housing 110, and two electrode terminals 163 and 164 formed by a metallic film are provided in the exposed portion.

The spacers from 171 to 174 are respectively disposed in spaces between the permanent magnets from 151 to 154 and side walls of the lower case 111, and fill the spaces. In addition, the spacers from 171 to 174 respectively fix front parts of elastic arms from 142a to 142d provided in the elastic support 140 to the side walls of the lower case 111 by pressing the front parts of the elastic arms from 142a to 142d to the side walls of the lower case 111.

The vibration generator 10 configured as described above can generate an alternating magnetic field around the coils 132 and 134 by supplying an alternating current to the coils 132 and 134 from the external circuit through the FPC 160. This causes the vibrating body unit 130 to vibrate along the up-down direction (i.e., the Z axis direction in the drawing) and the left-right direction (i.e., the X axis direction in the drawing) by an attractive force and a repulsive force generated between the first electromagnet 130A and the second electromagnet 130B, and the permanent magnets from 151 to 154 with elastic deformation of the elastic support 140 supporting the vibrating body unit 130. Specific configurations of the vibrating body unit 130 and the elastic support 140 will be described later with reference to FIG. 4 to FIG. 8. Specific configurations of the permanent magnets from 151 to 154 will be described later with reference to FIG. 9 and FIG. 10.

(Configuration of the Vibrating Body Unit 130)

Figure 4:
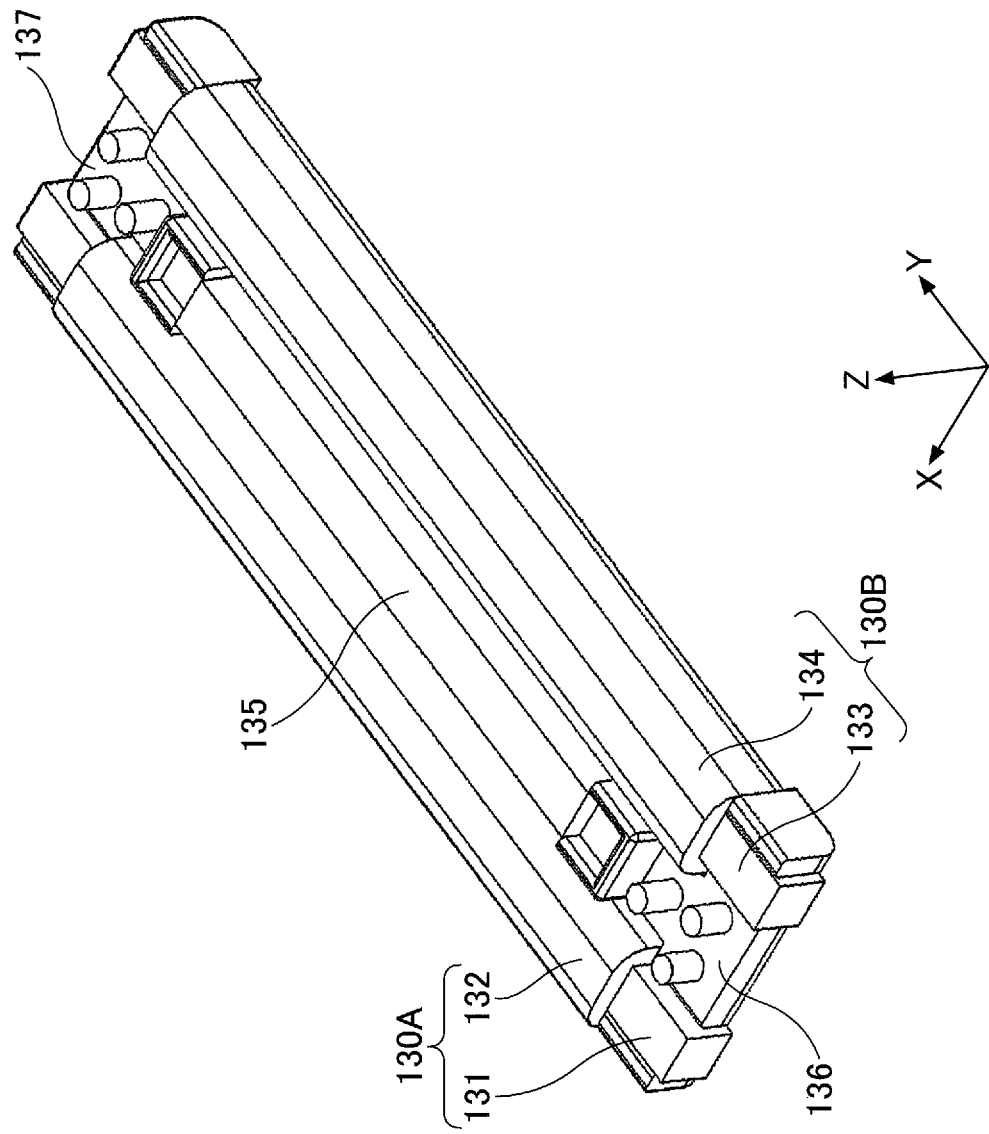
FIG. 4 is a perspective view illustrating a vibrating body unit provided in a vibration generator according to a first embodiment.
Figure 5:
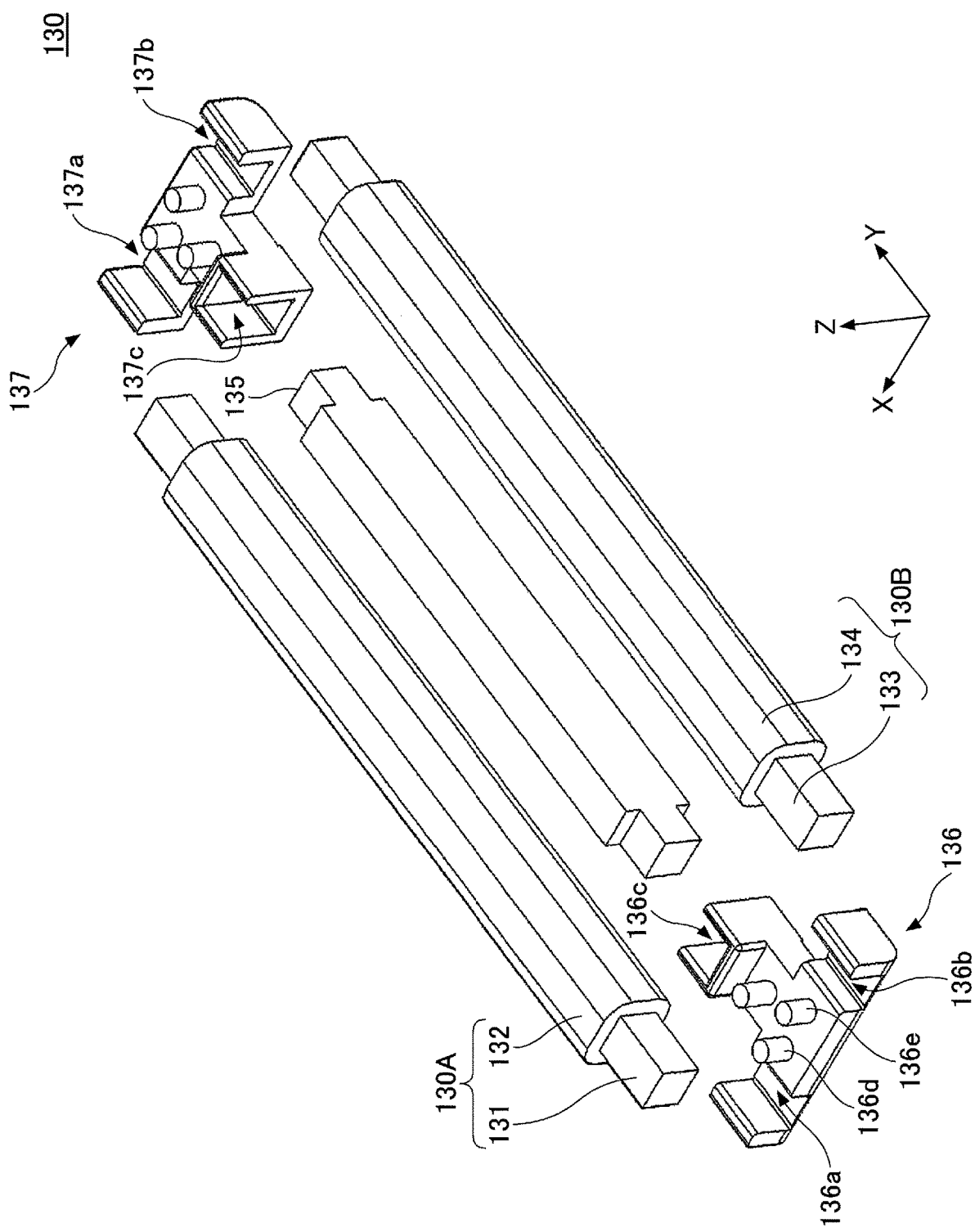
FIG. 5 is an exploded view of a vibrating body unit provided in a vibration generator according to a first embodiment.

FIG. 4 is a perspective view illustrating the vibrating body unit 130 provided in the vibration generator 10 according to the first embodiment. FIG. 5 is an exploded view of the vibrating body unit 130 provided in the vibration generator 10 according to the first embodiment.

As illustrated in FIG. 4 and FIG. 5, the vibrating body unit 130 includes a magnetic core 131, the coil 132, a magnetic core 133, the coil 134, a weight 135, a holder 136, and a holder 137.

The magnetic core 131 and the coil 132 constitute the first electromagnet 130A. The magnetic core 131 is a prism-shaped member formed by ferromagnetic material such as iron. The coil 132 is formed by a wire being multiply wound around the magnetic core 131. For the wire forming the coil 132, it is preferable to use material having relatively low electric resistance, and, for example, a copper wire covered by an insulator is preferably used. The wire forming the coil 132 is connected to the FPC 160 (see FIG. 1) by soldering for example. The first electromagnet 130A generates an alternating magnetic field around the first electromagnet 130A by an electric current being supplied to the coil 132 from the external circuit through the FPC 160. This magnetizes the first electromagnet 130A such that one end of the magnetic core 131 has a different magnetic pole from the other end of the magnetic core 131, and one end and the other end of the magnetic core 131 alternately switch between the north pole and the south pole.

The magnetic core 133 and the coil 134 constitute the second electromagnet 130B. The magnetic core 133 is a prism-shaped member formed by ferromagnetic material such as iron. The coil 134 is formed by a wire being multiply wound around the magnetic core 133. For the wire forming the coil 134, it is preferable to use material having relatively low electric resistance, and, for example, a copper wire covered by an insulator is preferably used. The wire forming the coil 134 is connected to the FPC 160 (see FIG. 1) by soldering for example. The second electromagnet 130B generates an alternating magnetic field around the second electromagnet 130B by an electric current being supplied to the coil 134 from the external circuit through the FPC 160. This magnetizes the second electromagnet 130B such that one end of the magnetic core 133 has a different magnetic pole from the other end of the magnetic core 133, and one end and the other end of the magnetic core 133 alternately switch between the north pole and the south pole.

The weight 135 is a prism-shaped member having a fixed weight, and being disposed parallel to the first electromagnet 130A and the second electromagnet 130B, between the first electromagnet 130A and the second electromagnet 130B. For example, metallic material is used for the weight 135 so as to obtain a sufficient weight. Especially, it is preferable to use metallic material with a relatively high specific gravity. In the embodiment, as a preferred example of metallic material with a relatively high specific gravity, tungsten, which has a higher specific gravity than iron used in the magnetic cores 131 and 133 and copper used in the coils 132 and 134, is used for the weight 135.

The holder 136 is an example of a holding member. The holder 136 holds one end (i.e., an end on the negative side of the Y axis in the drawing) of each of the magnetic core 131, the magnetic core 133, and the weight 135. Specifically, in the holder 136, a magnetic core holding portion 136a, a magnetic core holding portion 136b, and a weight holding portion 136c are formed. The magnetic core holding portion 136a is a portion holding one end of the magnetic core 131. The magnetic core holding portion 136a approximately has the same width of the magnetic core 131, and has a groove-shaped portion that is cut out along the longitudinal direction (i.e., the Y axis direction in the drawing) of the magnetic core 131. As an upper portion of the magnetic core holding portion 136a is open, it is possible to easily fit one end of the magnetic core 131 from above. The magnetic core holding portion 136b is provided next to the magnetic core holding portion 136a in the transverse direction (i.e., the X axis direction in the drawing), and is a portion holding one end of the magnetic core 133. The magnetic core holding portion 136b approximately has the same width of the magnetic core 133, and a groove-shaped portion that is cut out along the longitudinal direction (i.e., the Y axis direction in the drawing) of the magnetic core 133. As an upper portion of the magnetic core holding portion 136b is open, it is possible to easily fit one end of the magnetic core 133 from above. The weight holding portion 136c is provided between the magnetic core holding portion 136a and the magnetic core holding portion 136b, and is a portion holding one end of the weight 135. The weight holding portion 136c approximately has the same width of one end of the weight 135, and is a U-shaped portion which is open inside in planar view from above. As an upper portion of the weight holding portion 136c is open, it is possible to easily fit one end of the weight 135 from above. On an upper surface of the holder 136, three column-shaped projecting portions are formed. Among three column-shaped projecting portions, projecting portions 136d and 136e are provided side by side in the transverse direction (i.e., the X axis direction in the drawing) between the magnetic core holding portion 136a and the magnetic core holding portion 136b, and can support an end of the FPC 160 on the coils 132 and 134 side at predetermined positions by circle-shaped opening portions formed on the end of the FPC 160 on the coils 132 and 134 side being fit to the projecting portions 136d and 136e.

The holder 137 is an example of a holding member. The holder 137 holds the other end (i.e., an end on positive side of the Y axis in the drawing) of each of the magnetic core 131, the magnetic core 133, and the weight 135. Specifically, in the holder 137, a magnetic core holding portion 137a, a magnetic core holding portion 137b, and a weight holding portion 137c are formed. The magnetic core holding portion 137a is a portion holding the other end of the magnetic core 131. The magnetic core holding portion 137a approximately has the same width of the magnetic core 131, and has a groove-shaped portion that is cut out along the longitudinal direction (i.e., the Y axis direction in the drawing) of the magnetic core 131. As an upper portion of the magnetic core holding portion 137a is open, it is possible to easily fit the other end of the magnetic core 131 from above. The magnetic core holding portion 137b is provided next to the magnetic core holding portion 137a in the transverse direction (i.e., the X axis direction in the drawing), and is a portion holding the other end of the magnetic core 133. The magnetic core holding portion 137b approximately has the same width of the magnetic core 133, and has a groove-shaped portion that is cut out along the longitudinal direction (i.e., the Y axis direction in the drawing) of the magnetic core 133. As an upper portion of the magnetic core holding portion 137b is open, it is possible to easily fit the other end of the magnetic core 133 from above. The weight holding portion 137c is provided between the magnetic core holding portion 137a and the magnetic core holding portion 137b, and is a portion holding the other end of the weight 135. The weight holding portion 137c approximately has the same width of the other end of the weight 135, and is a U-shaped portion which is open inside in planar view from above. As an upper portion of the weight holding portion 137c is open, it is possible to easily fit the other end of the weight 135 from above.

The holder 136 and the holder 137 can use a component common to each other. For example, the vibration generator 10 of the embodiment uses a component common to the holder 136 for the holder 137. Thus, in the vibration generator 10 of the embodiment, three projecting portions are provided on the holder 137, which is similar to the holder 136. Thus, for example, in the vibration generator 10 of the embodiment, the FPC 160 can be provided on the holder 137 side and the end of the FPC 160 on the coils 132 and 134 side can be supported by the holder 137.

For the holder 136 and the holder 137, insulating and nonmagnetic material (for example, resin) can be used. In the embodiment, for example, as material of the holder 136 and the holder 137, nylon (i.e., polyamide resin) is used. By using resin material for the holder 136 and the holder 137, an upper edge of the weight holding portion 136c in the holder 136 and an upper edge of the weight holding portion 137c in the holder 137 can be thermally deformed, and this can prevent the weight 135 from falling off the holder 136 and the holder 137.

As described above, in the vibrating body unit 130 of the vibration generator 10 of the embodiment, two electromagnets 130A and 130B are provided side by side in the transverse direction (i.e., the X axis direction in the drawing). This enables the vibration generator 10 of the embodiment to achieve thickness reduction of the vibrating body unit 130, and compensate for a decrease of a vibrating quantity accompanied with the thickness reduction (i.e., size reduction of an electromagnet) of the vibrating body unit 130, with two electromagnets 130A and 130B. Therefore, according to the vibration generator 10 of the embodiment, thickness reduction of the vibrating body unit 130 can be achieved and a sufficient vibration of the vibrating body unit 130 can be obtained.

In addition, in the vibration generator 10 of the embodiment, a longitudinal direction of the housing 110 is in the front-back direction (i.e., the third direction) that intersects the up-down direction (i.e., the first direction) and the left-right direction (i.e., the second direction). From this, in the vibration generator 10 of the embodiment, the magnetic cores 131 and 133 constituting the electromagnets 130A and 130B can be long thin bar-shaped magnetic cores having a longitudinal direction in a direction (i.e., the front-back direction) that intersects vibrating directions (i.e., the up-down direction and the left-right direction). Therefore, according to the vibration generator 10 of the embodiment, as winding diameter of wires of the coils 132 and 134 can be small, a total length of the wires can be relatively short with respect to the winding number of the coils 132 and 134, and it can control against electric resistance of the wires.

In addition, in the vibration generator 10 of the embodiment, the vibrating body unit 130 includes the weight 135 having a fixed weight. This enables the vibration generator 10 of the embodiment to compensate for a decrease of weight accompanied with thickness reduction (i.e., size reduction of an electromagnet) of the vibrating body unit 130 with the weight 135. Therefore, according to the vibration generator 10 of the embodiment, thickness reduction of the vibrating body unit 130 can be achieved and a sufficient vibration of the vibrating body unit 130 can be obtained.

Especially, in the vibrating body unit 130 of the vibration generator 10 of the embodiment, two electromagnets 130A and 130B are disposed away from each other so as to avoid interfering with each other. In the vibrating body unit 130 of the vibration generator 10 of the embodiment, the weight 135 is disposed in a space between two electromagnets 130A and 130B. From this, it is not necessary for the vibration generator 10 of the embodiment to provide an additional space for the weight 135 in the vibrating body unit 130, and this can obtain a sufficient vibration of the vibrating body unit 130 without causing the vibrating body unit 130 to be larger.

The vibration generator 10 of the embodiment adopts a configuration in which both ends of each of the magnetic core 131, the magnetic core 133, and the weight 135 are held by the holders 136 and 137. This enables the vibration generator 10 of the embodiment to easily and surely maintain a state in which the magnetic core 131, the magnetic core 133, and the weight 135 have predetermined intervals from each other. Therefore, according to the vibration generator 10 of the embodiment, easiness of assembling the vibrating body unit 130 can be increased and stable performance of the vibrating body unit 130 can be obtained.

(Configuration of the Elastic Support 140)

Figure 6:
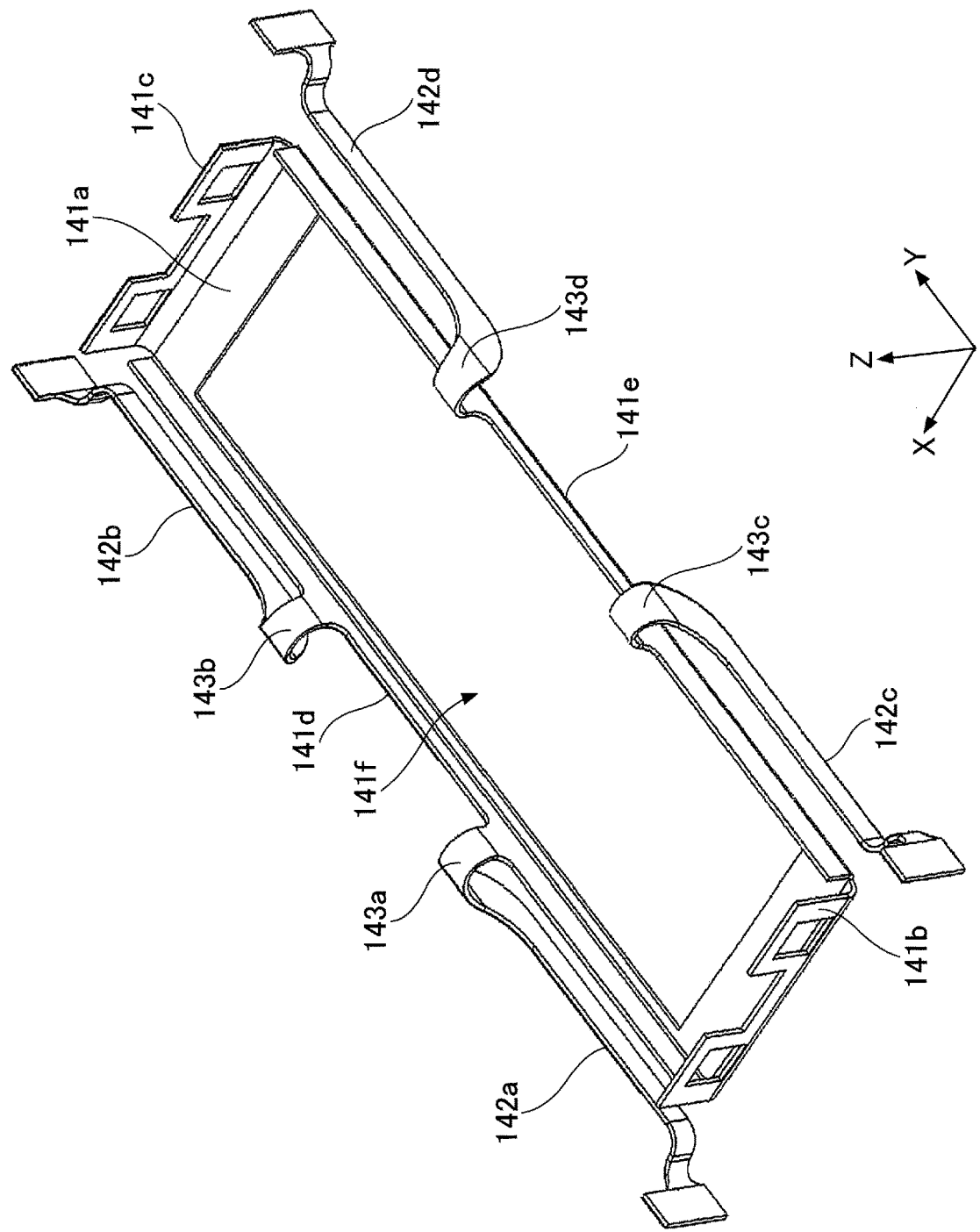
FIG. 6 is a perspective view illustrating an elastic support provided in a vibration generator according to a first embodiment.
Figure 7:
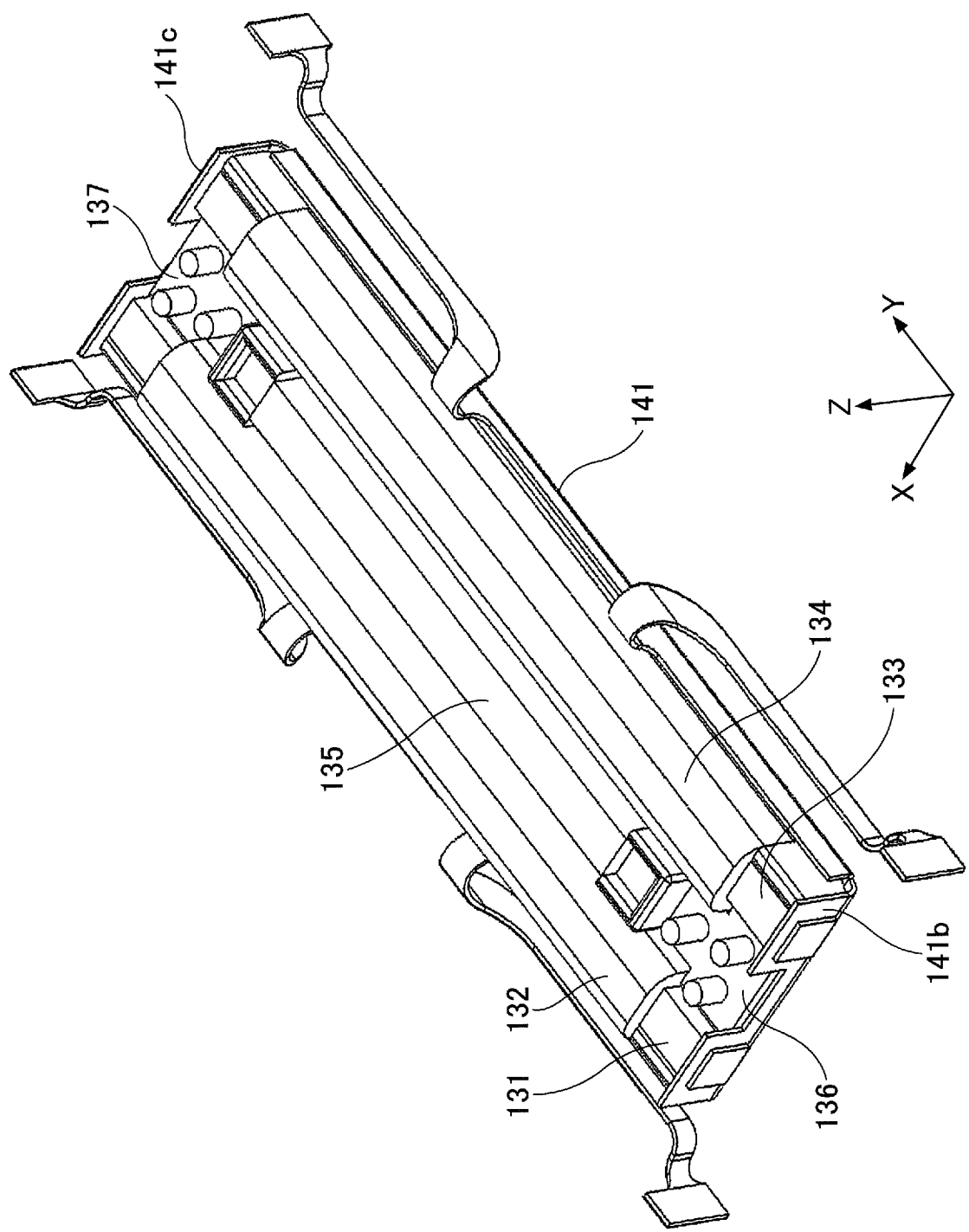
FIG. 7 is a perspective view illustrating an elastic support (in a state of supporting a vibrating body unit) provided in a vibration generator according to a first embodiment.
Figure 8:
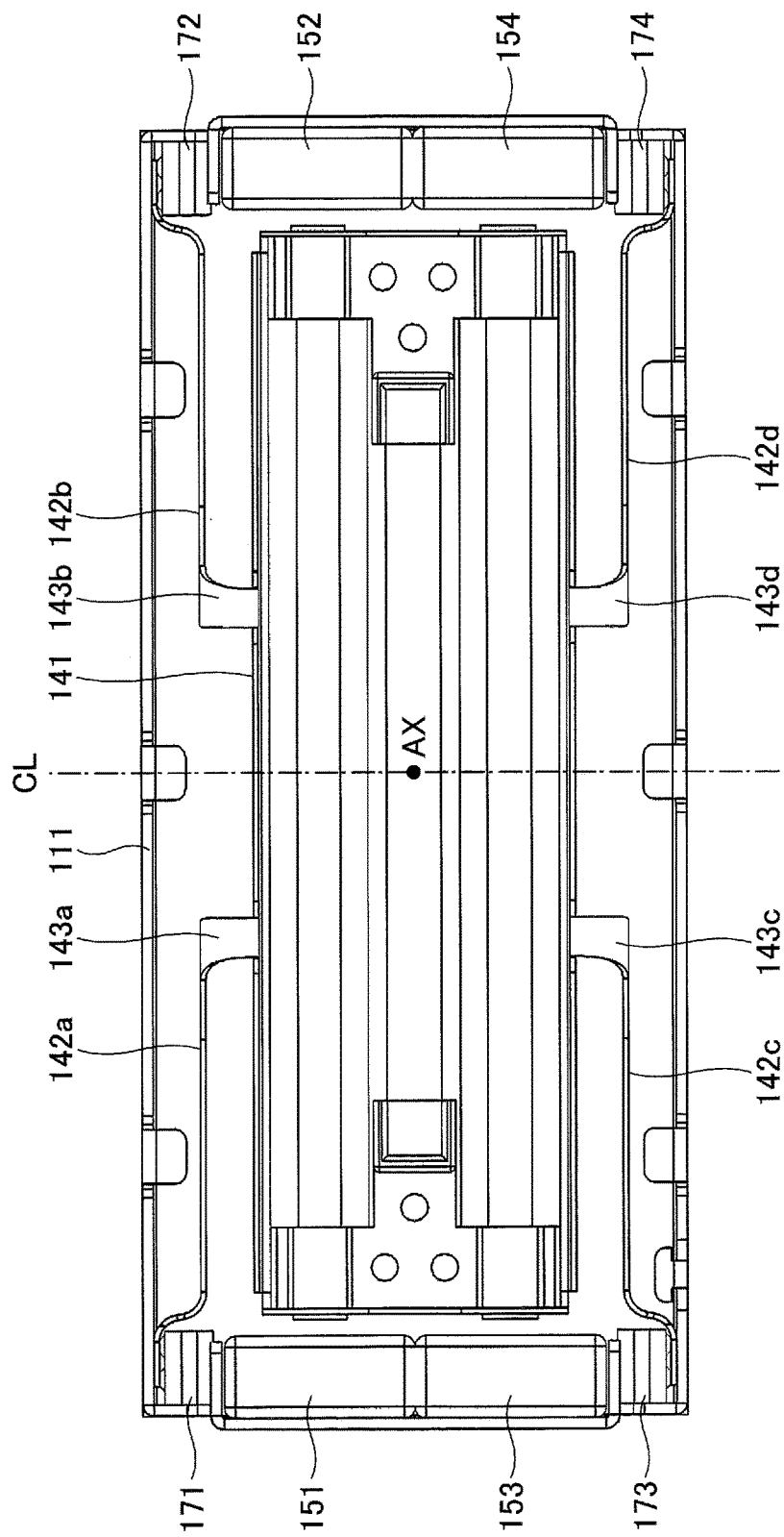
FIG. 8 is a plan view illustrating an elastic support (in a state of being incorporated in a lower case) provided in a vibration generator according to a first embodiment.

FIG. 6 is a perspective view illustrating the elastic support 140 provided in the vibration generator 10 according to the first embodiment. FIG. 7 is a perspective view illustrating the elastic support 140 (in a state of supporting the vibrating body unit 130) provided in the vibration generator 10 according to the first embodiment. FIG. 8 is a plan view illustrating the elastic support 140 (in a state of being incorporated in the lower case 111) provided in the vibration generator 10 according to the first embodiment.

As illustrated in FIG. 6 and FIG. 7, the elastic support 140 is a member formed by processing a metallic plate having a spring property in a predetermined shape. The elastic support 140 includes a vibrating body holding portion 141, an elastic arm, and an elastic beam.

The vibrating body holding portion 141 is a tray-shaped portion holding the vibrating body unit 130. The vibrating body holding portion 141 is approximately formed in a rectangle shape in planar view from above. The vibrating body holding portion 141 includes a bottom surface 141a, a first wall 141b, a second wall 141c, a first side wall 141d, and a second side wall 141e.

The bottom surface 141a is a planar part forming a rectangle shape having a transverse direction in the left-right direction (i.e., the X axis direction in the drawing) and a longitudinal direction in the front-back direction (i.e., the Y axis direction in the drawing). In the bottom surface 141a, a relatively large rectangle-shaped opening portion 141f, which is opened along an outer edge of the bottom surface 141a, is formed. This moderately weakens torsional rigidity of both the left and right bottom edges extending along the longitudinal direction (i.e., the Y axis direction in the drawing), and the bottom edges becomes easily twisted outward in the left-right direction (i.e., the X axis direction in the drawing). Thus, the vibrating body holding portion 141 causes the elastic support 140 to easily deform elastically in the up-down direction (i.e., the Z axis direction in the drawing). As a result, the vibration generator of the embodiment can obtain a sufficient vibration generated by the vibrating body unit 130 supported by the vibrating body holding portion 141.

The first wall 141b is a wall-shaped part erected vertically on one short side part (i.e., a short side part on the negative side of the Y axis in the drawing) of the bottom surface 141a. In the first wall 141b, two rectangle-shaped opening portions (i.e., an example of a fixing portion) are formed side by side in the transverse direction (i.e., the X axis direction in the drawing). As illustrated in FIG. 7, by swaging the two opening portions after penetrating one end of each of the magnetic core 131 and the magnetic core 133 (i.e., an end on the negative side of the Y axis in the drawing) into a corresponding opening portion of the two opening portions, one end of each of the magnetic core 131 and the magnetic core 133 can be securely supported. As illustrated in FIG. 7, one end of each of the magnetic core 131 and the magnetic core 133 is held by the holder 136. Thus, the first wall 141b can easily and surely hold one end of each of the holder 136 and the weight 135 in addition to one end of each of the magnetic core 131 and the magnetic core 133 by holding one end of each of the magnetic core 131 and the magnetic core 133.

The second wall 141c is a wall-shaped part erected vertically on the other short side part (i.e., a short side part on the positive side of the Y axis in the drawing) of the bottom surface 141a. In the second wall 141c, two rectangle-shaped opening portions (i.e., an example of a fixing portion) are formed side by side in the transverse direction (i.e., the X axis direction in the drawing). As illustrated in FIG. 7, by swaging the two opening portions after penetrating the other end of each of the magnetic core 131 and the magnetic core 133 (i.e., an end on the positive side of the Y axis in the drawing) into a corresponding opening portion of the two opening portions, the other end of each of the magnetic core 131 and the magnetic core 133 can be securely supported. As illustrated in FIG. 7, the other end of each of the magnetic core 131 and the magnetic core 133 is held by the holder 137. Thus, the second wall 141c can easily and surely hold the other end of each of the holder 137 and the weight 135 in addition to the other end of each of the magnetic core 131 and the magnetic core 133 by holding the other end of each of the magnetic core 131 and the magnetic core 133.

The first side wall 141d is a wall-shaped part erected vertically on one long side part (i.e., a long side part on a positive side of the X axis in the drawing) of the bottom surface 141a. The second side wall 141e is a wall-shaped part erected vertically on the other long side part (i.e., a long side part on a negative side of the X axis in the drawing) of the bottom surface 141a.

The elastic arm is a thin long plate portion extending straight along the longitudinal direction (i.e., the Y axis direction in the drawing) of the vibrating body holding portion 141 on each of the left and right outer sides of the vibrating body holding portion 141. The elastic arm is a portion that functions what is called a flat spring, and enables the vibrating body unit 130 to vibrate in the transverse direction (i.e., the X axis direction in the drawing) by the elastic arm being elastically deformed in the transverse direction (i.e., the X axis direction in the drawing). Specifically, in the embodiment, the elastic support 140 includes four elastic arms 142a, 142b, 142c, and 142d.

The elastic arm 142a is an example of a first elastic arm. The elastic arm 142a is a portion extending straight along the first side wall 141d toward one end side (i.e., the negative side of the Y axis in the drawing) of the first side wall 141d outside the first side wall 141d. A terminal end of the elastic arm 142a is connected to an upper edge of the first side wall 141d by an elastic beam 143a curved upward on a position away from the center of the first side wall 141d (i.e., a position on a center line CL illustrated in FIG. 8) to one end side (i.e., the negative side of the Y axis in the drawing).

The elastic arm 142b is an example of a second elastic arm. The elastic arm 142b is a portion extending straight along the first side wall 141d toward the other end side (i.e., the positive side of the Y axis in the drawing) of the first side wall 141d outside the first side wall 141d. A terminal end of the elastic arm 142b is connected to an upper edge of the first side wall 141d by an elastic beam 143b curved upward on a position away from the center of the first side wall 141d (i.e., a position on a center line CL illustrated in FIG. 8) to the other end side (i.e., the positive side of the Y axis in the drawing).

The elastic arm 142c is an example of a third elastic arm. The elastic arm 142c is a portion extending straight along the second side wall 141e toward one end side (i.e., the negative side of the Y axis in the drawing) of the second side wall 141e outside the second side wall 141e. A terminal end of the elastic arm 142c is connected to an upper edge of the second side wall 141e by an elastic beam 143c curved upward on a position away from the center of the second side wall 141e (i.e., a position on a center line CL illustrated in FIG. 8) to one end side (i.e., the negative side of the Y axis in the drawing).

The elastic arm 142d is an example of a fourth elastic arm. The elastic arm 142d is a portion extending straight along the second side wall 141e toward the other end side (i.e., the positive side of the Y axis in the drawing) of the second side wall 141e outside the second side wall 141e. A terminal end of the elastic arm 142d is connected to an upper edge of the second side wall 141e by an elastic beam 143d curved upward on a position away from the center of the second side wall 141e (i.e., a position on a center line CL illustrated in FIG. 8) to the other end side (i.e., the positive side of the Y axis in the drawing).

The elastic support 140 configured as described above is elastically deformed in the transverse direction (i.e., the X axis direction in the drawing) mainly by each of the elastic arms from 142a to 142d being largely bent in the transverse direction (i.e., the X axis direction in the drawing). In addition, the elastic support 140 is configured to be elastically deformed in the vertical direction (i.e., the Z axis direction in the drawing) by torsional deformation of both the left and right bottom edges extending along the longitudinal direction (i.e., the Y axis direction in the drawing) of the vibrating body holding portion 141, which is caused mainly by each of the elastic arms from 142a to 142d being bent in the vertical direction (i.e., the Z axis direction in the drawing), and the opening portion 141f being provided in the bottom surface 141a. Here, as each of the elastic arms from 142a to 142d is relatively short in a vertical length (i.e., a length in the Z axis direction in the drawing), and a straight portion extending along the longitudinal direction (i.e., the Y axis direction in the drawing) of the vibrating body holding portion 141 is sufficiently long, and that is, has a sufficient elastic effective length, each of the elastic arms from 142a to 142d can be largely bent in the transverse direction (i.e., the X axis direction in the drawing). This enables the vibration generator 10 of the embodiment to achieve thickness reduction of the vibrating body unit 130 and obtain a sufficient vibration in the transverse direction (i.e., the X axis direction in the drawing) of the vibrating body unit 130.

As illustrated in FIG. 8, the elastic arms from 142a to 142d are connected to the vibrating body holding portion 141 on respective positions away from the center (i.e., a position on a center line CL) of the vibrating body holding portion 141 in the longitudinal direction (i.e., the Y axis direction in the drawing) by respective elastic beams from 143a to 143d. That is, on both the left and right side walls of the vibrating body holding portion 141, two elastic beams are connected to each of the left and right side walls such that the center line CL is between the two elastic beams, and the two elastic beams are provided on positions moderately away from the center line CL. This can prevent the vibration generator 10 of the embodiment from rotating the vibrating body holding portion 141 around the center line CL as a rotating axis. Additionally, this can prevent the vibration generator 10 of the embodiment from rotating the vibrating body holding portion 141 in an XY plane around an AX axis, which is parallel to the Z axis and is passing through a center of the vibrating body holding portion 141 in the X axis direction and Y axis direction in the drawing, as a rotating axis.

As illustrated in FIG. 8, a front part of each of the elastic arms from 142a to 142d is bent in a crank shape outward, and a flat portion (i.e., an example of a housing fixing portion) positioned outside the straight portion (i.e., an elastic effective portion) extending along the longitudinal direction (i.e., the Y axis direction in the drawing) of the vibrating body holding portion 141, is formed. The front part of each of the elastic arms from 142a to 142d is fixed to a corresponding position on an inner surface of the side wall of the lower case 111 of the housing 110 by a selectable fixing method (such as an adhesive, a rivet, and a screw) on the flat portion. As illustrated in FIG. 8, this can approximately position the straight portion of each of the elastic arms from 142a to 142d in a center between the side wall of the vibrating body holding portion 141 and the side wall of the lower case 111, and enables the vibration generator 10 of the embodiment to obtain a sufficient range of vibration in the left-right direction (i.e., the X axis direction in the drawing) in each of the elastic arms from 142a to 142d. As illustrated in FIG. 8, the embodiment adopts a configuration that the flat portion of each of the elastic arms from 142a to 142d is fixed to an internal surface of a corresponding side wall of the lower case 111 by being sandwiched between the internal surface of the corresponding side wall of the lower case 111 and a corresponding spacer of the spacers from 171 to 174.

(Magnetization State of the Permanent Magnets from 151 to 154)

Figure 9:
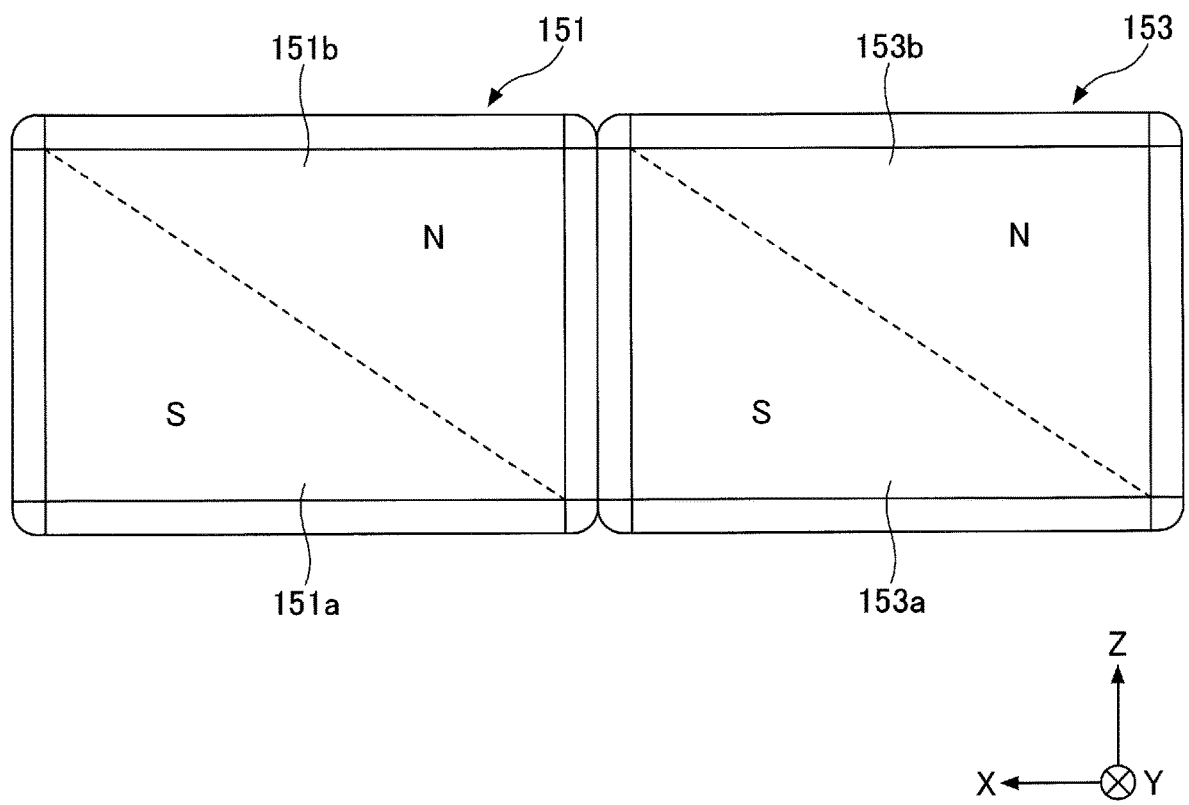
FIG. 9 is a drawing for describing a magnetization state of a permanent magnet provided in a vibration generator according to a first embodiment.

FIG. 9 is a drawing for describing a magnetization state of the permanent magnets provided in the vibration generator 10 according to the first embodiment. Here, a magnetization state of the permanent magnets 151 and 153 in planar view of the permanent magnets 151 and 153 from the negative side of the Y axis will be described As illustrated in FIG. 9, the permanent magnet 151 is divided into two regions by a diagonal line from an upper left corner to a lower right corner in plan view from the negative side of the Y axis in the drawing, and the two regions are magnetized such that the two regions have polarities different from each other. In an example illustrated in FIG. 9, a first magnetized region 151a, which is a lower left region of the permanent magnet 151, is magnetized to the south pole, and a second magnetized region 151b, which is an upper right region of the permanent magnet 151, is magnetized to the north pole.

Similarly, the permanent magnet 153 is divided into two regions by a diagonal line from an upper left corner to a lower right corner in plan view from the negative side of the Y axis in the drawing, and the two regions are magnetized such that the two regions have polarities different from each other. In an example illustrated in FIG. 9, a first magnetized region 153a, which is a lower left region of the permanent magnet 153, is magnetized to the south pole, and a second magnetized region 153b, which is an upper right region of the permanent magnet 153, is magnetized to the north pole.

The permanent magnets 152 and 154 facing the permanent magnets 151 and 153 across the first electromagnet 130A and the second electromagnet 130B, are divided into two regions (i.e., a first magnetized region and a second magnetized region) by a diagonal line from an upper left corner to a lower right corner in plan view from the negative side of the Y axis in the drawing, as in the permanent magnets 151 and 153. However, in contrary to the permanent magnets 151 and 153, the permanent magnets 152 and 154 are magnetized such that a first magnetized region, which is a lower left region, is magnetized to the north pole, and a second magnetized region, which is an upper right region, is magnetized to the south pole.

(Operation of the Vibrating Body Unit 130)

Figure 10A:
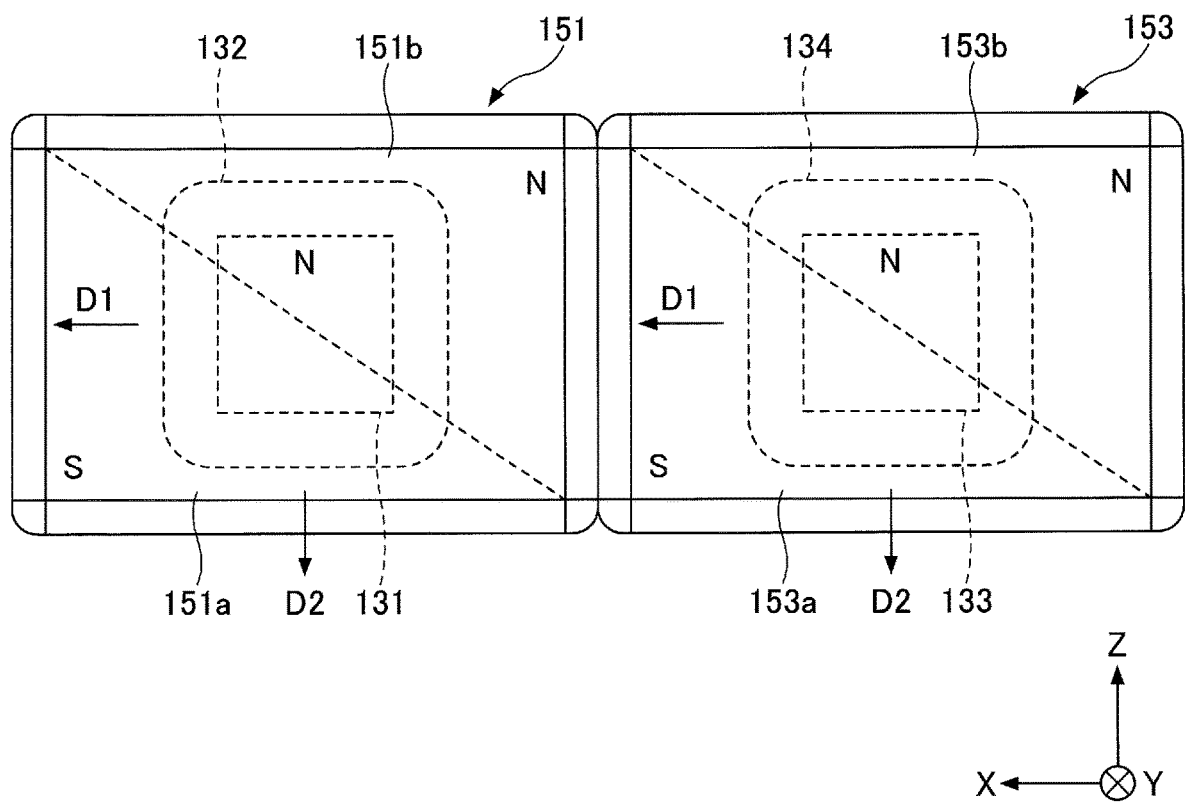
FIG. 10A is a drawing for describing an operation of a vibrating body unit provided in a vibration generator according to a first embodiment.
Figure 10B:
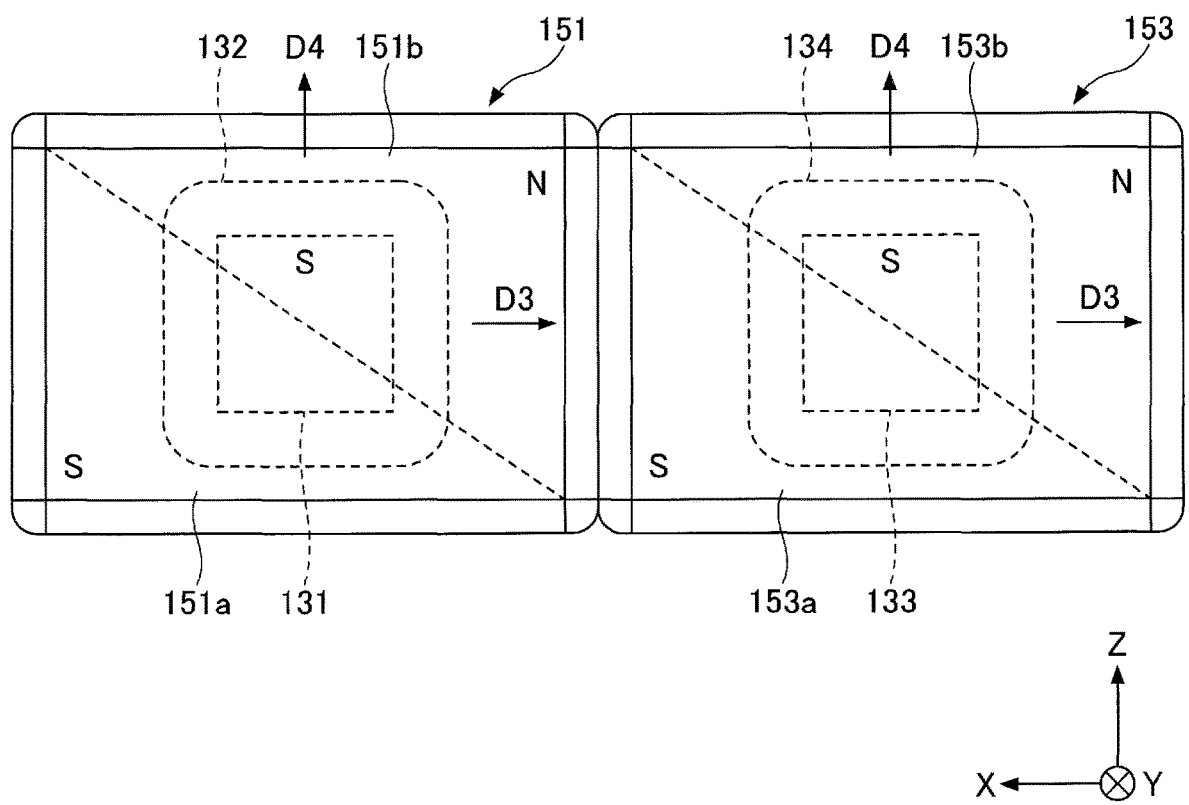
FIG. 10B is a drawing for describing an operation of a vibrating body unit provided in a vibration generator according to a first embodiment.

FIG. 10A and FIG. 10B are drawings for describing an operation of the vibrating body unit 130 provided in the vibration generator 10 according to the first embodiment.

In the vibration generator 10 according to the first embodiment, both ends of the magnetic core 131 are magnetized such that both ends of the magnetic core 131 have polarities different from each other, by causing an alternating current to flow through the coil 132 constituting the first electromagnet 130A and generating an alternating magnetic field around the first electromagnet 130A.

In addition, in the vibration generator 10 according to the first embodiment, both ends of the magnetic core 133 are magnetized such that both ends of the magnetic core 133 have polarities different from each other, by causing an alternating current to flow through the coil 134 constituting the second electromagnet 130B and generating an alternating magnetic field around the second electromagnet 130B.

For example, as illustrated in FIG. 10A, when one end (i.e., an end in the negative side of the Y axis in the drawing) of each of the magnetic core 131 and the magnetic core 133 is magnetized to the north pole, on one end of the magnetic core 131, an attractive force toward the first magnetized region 151a (i.e., the south pole) of the permanent magnet 151 and a repulsive force repelling the second magnetized region 151b (i.e., the north pole) of the permanent magnet 151 are generated.

Simultaneously, on the other end of the magnetic core 131 magnetized to the south pole, an attractive force toward the first magnetized region (i.e., the north pole) of the permanent magnet 152 and a repulsive force repelling the second magnetized region (i.e., the south pole) of the permanent magnet 152 are generated.

In addition, on one end of the magnetic core 133, an attractive force toward the first magnetized region 153a (i.e., the south pole) of the permanent magnet 153 and a repulsive force repelling the second magnetized region 153b (i.e., the north pole) of the permanent magnet 153 are generated.

Simultaneously, on the other end of the magnetic core 133 magnetized to the south pole, an attractive force toward the first magnetized region (i.e., the north pole) of the permanent magnet 154 and a repulsive force repelling the second magnetized region (i.e., the south pole) of the permanent magnet 154 are generated.

This moves the vibrating body unit 130 to the left (i.e., an arrow D1 direction) and to the down position (i.e., an arrow D2 direction). At this time, a thrust force of the vibrating body unit 130 directed to the left is a total of a thrust force of the first electromagnet 130A directed to the left and a thrust force of the second electromagnet 130B directed to the left. In addition, a thrust force of the vibrating body unit 130 directed to the down position is a total of a thrust force of the first electromagnet 130A directed to the down position and a thrust force of the second electromagnet 130B directed to the down position. This enables the vibrating body unit 130 to obtain a sufficient thrust force for vibrating with a predetermined resonance frequency while elastically deforming the elastic support 140.

Additionally, as illustrated in FIG. 10B, when one end (i.e., an end on the negative side of the Y axis in the drawing) of each of the magnetic core 131 and the magnetic core 133 is magnetized to the south pole, on one end of the magnetic core 131, an attractive force toward the second magnetized region 151b (i.e., the north pole) of the permanent magnet 151 and a repulsive force repelling the first magnetized region 151a (i.e., the south pole) of the permanent magnet 151 are generated.

Simultaneously, on the other end of the magnetic core 131 magnetized to the north pole, an attractive force toward the second magnetized region of the permanent magnet 152 and a repulsive force repelling the first magnetized region of the permanent magnet 152 are generated.

In addition, on one end of the magnetic core 133, an attractive force toward the second magnetized region 153b (i.e., the north pole) of the permanent magnet 153 and a repulsive force repelling the magnetized region 153a (i.e., the south pole) of the permanent magnet 153 are generated.

Simultaneously, on the other end of the magnetic core 133 magnetized to the north pole, an attractive force toward the second magnetized region (i.e., the south pole) of the permanent magnet 154 facing the other end of the magnetic core 133 and a repulsive force repelling the first magnetized region (i.e., the north pole) of the permanent magnet 154 are generated.

This moves the vibrating body unit 130 to the right position (i.e., an arrow D3 direction) and to the up position (i.e., an arrow D4 direction). At this time, a thrust force of the vibrating body unit 130 directed to the right position is a total of a thrust force of the first electromagnet 130A directed to the right position and a thrust force of the second electromagnet 130B directed to the right position. In addition, a thrust force of the vibrating body unit 130 directed to the up position is a total of a thrust force of the first electromagnet 130A directed to the up position and a thrust force of the second electromagnet 130B directed to the up position. This enables the vibrating body unit 130 to obtain a sufficient thrust force for vibrating with a predetermined resonance frequency while elastically deforming the elastic support 140.

As described, in the vibration generator 10 according to the embodiment, by current flowing directions of the coils 132 and 134, a moving direction of the vibrating body unit 130 is determined to be the left and down directions or right and up directions. As a result, in the vibration generator 10 according to the embodiment, by supplying an alternating current to the coils 132 and 134, a move of the vibrating body unit 130 to the left position (i.e., the arrow D1 direction in the drawing) and to the down position (i.e., the arrow D2 direction) as illustrated in FIG. 10A and a move of the vibrating body unit 130 to the right position (i.e., the arrow D3 direction in the drawing) and to the up position (i.e., the arrow D4 direction) as illustrated in FIG. 10B are alternately repeated. This causes the vibrating body unit 130 to vibrate in the up-down direction (i.e., the Z axis direction in the drawing) and the left-right direction (i.e., the X axis direction in the drawing).

Here, the vibrating body unit 130 is supported by the elastic support 140, and vibrates along the transverse direction (i.e., the X axis direction in the drawing) with a first natural frequency, and along the vertical direction (i.e., the Z axis direction in the drawing) with a second natural frequency. The first natural frequency is a frequency determined in accordance with a first elastic modulus and quantity of the vibrating body unit 130. The second natural frequency is a frequency determined in accordance with a second elastic modulus and quantity of the vibrating body unit 130. The first elastic modulus and the second elastic modulus are different from each other. Thus, the first natural frequency and the second natural frequency are different from each other.

That is, the vibrating body unit 130 sufficiently vibrates along the transverse direction (i.e., the X axis direction in the drawing) by controlling a frequency of an alternating current supplied to the coils 132 and 134 from an external circuit, and generating an alternating magnetic field with the same frequency of the first natural frequency around each of the first electromagnet 130A and the second electromagnet 130B. Additionally, the vibrating body unit 130 sufficiently vibrates along the vertical direction (i.e., the Z axis direction in the drawing) by controlling a frequency of an alternating current supplied to the coils 132 and 134 from an external circuit, and generating an alternating magnetic field with the same frequency of the second natural frequency around each of the first electromagnet 130A and the second electromagnet 130B.

If the coils 132 and 134 can mutually move in the same direction (that is, the magnetic cores 131 and 133 can have the same polarities on both ends) when an alternating current is supplied to the coils 132 and 134, a configuration in which the coils 132 and 134 are mutually connected in parallel (that is, a configuration in which both ends of a wire forming the coil 132 and both ends of a wire forming the coil 134 are connected to the FPC 160) may be adopted, or, a configuration in which the coils 132 and 134 are mutually connected in series (that is, a configuration in which one end of a wire forming the coil 132 is connected to one end of wire forming the coil 134, and the other end of a wire forming the coil 132 and the other end of a wire forming the coil 134 are connected to the FPC 160) may be adopted. In addition, the wires of the coil 132 and the coil 134 may mutually have the same coiling direction, and may mutually have the reversed coiling direction.

Configurations of a permanent magnet and an electromagnet are not limited to this as the coils 132 and 134 are only required to be able to mutually move in the same direction when an alternating current is supplied to the coils 132 and 134. For example, in the embodiment, adjacent permanent magnets 151 and 153 have the same magnetic direction, and adjacent permanent magnets 152 and 154 have the same magnetic direction, but by arranging adjacent permanent magnets having a reversed magnetic direction and configuring that the magnetic cores 131 and 133 have polarities different from each other on both ends, the coils 132 and 134 can mutually move in the same direction.

(Supporting Structure of the FPC 160)

Figure 11:
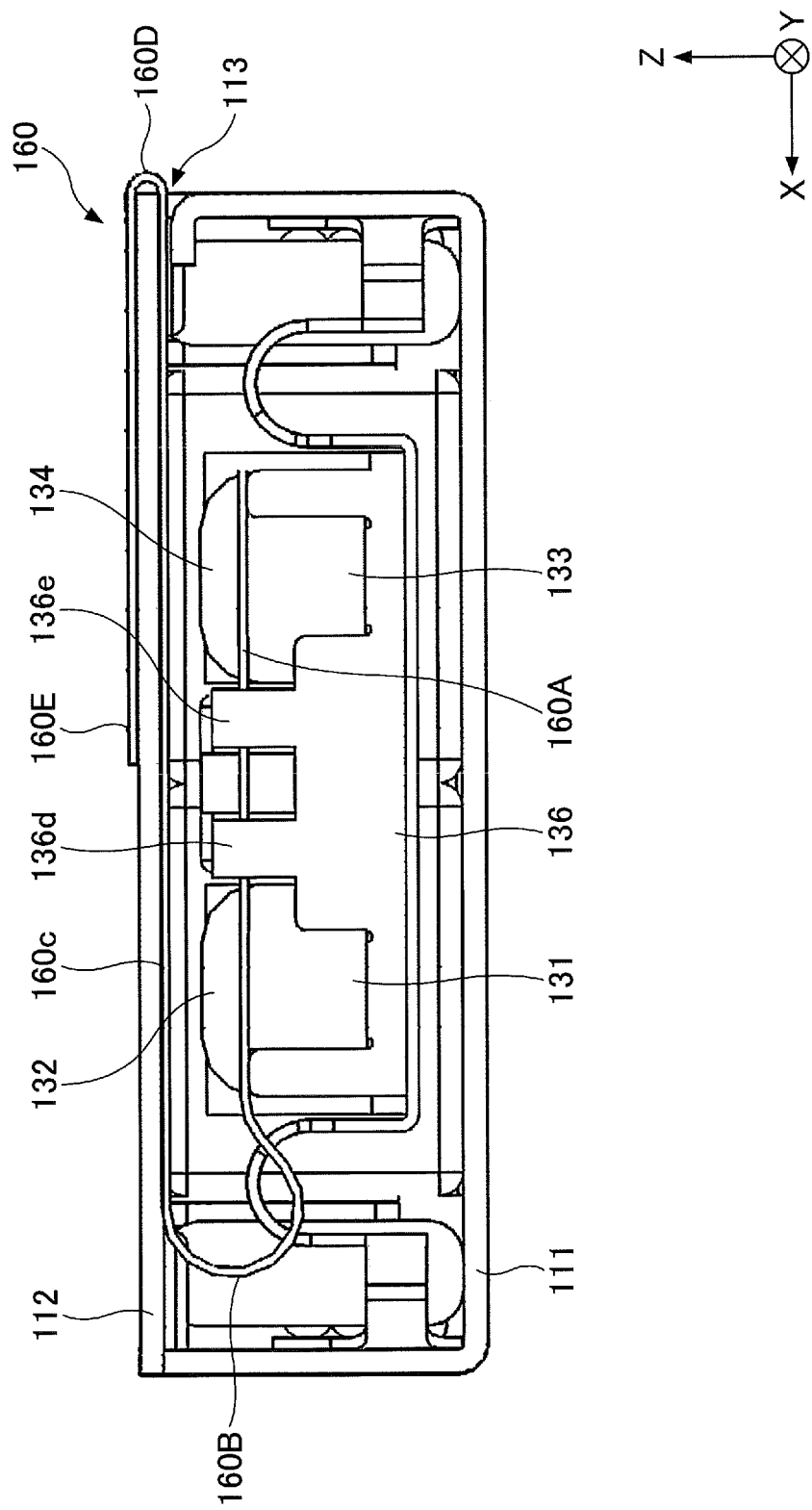
FIG. 11 is a cross-sectional view along A-A of the vibration generator illustrated in FIG. 1.
Figure 12:
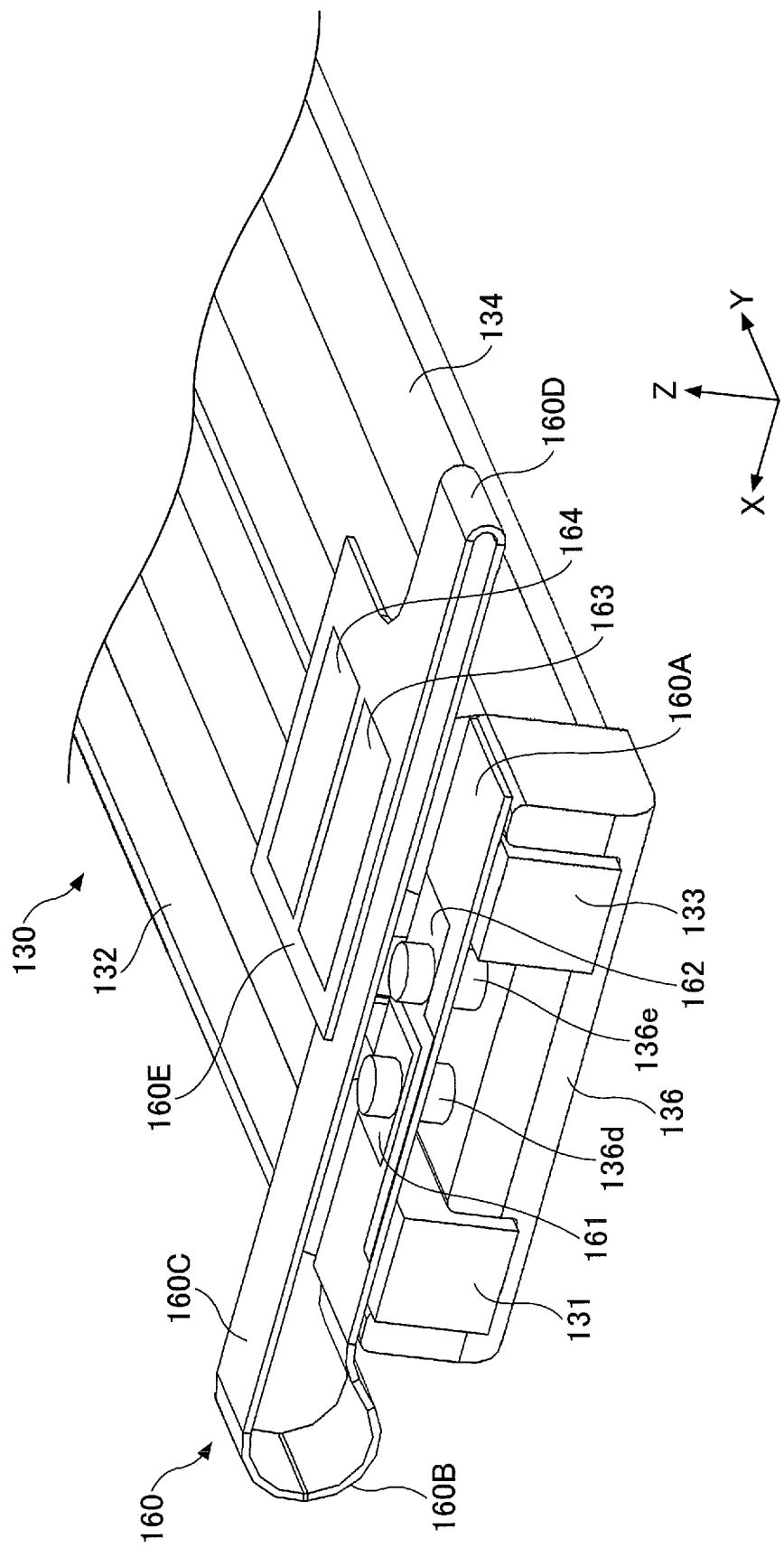
FIG. 12 is a drawing illustrating a supporting structure of FPC in a vibration generator according to a first embodiment.

FIG. 11 is a cross-sectional view along A-A of the vibration generator 10 illustrated in FIG. 1. FIG. 12 is a drawing illustrating a supporting structure of the FPC 160 in the vibration generator 10 according to the first embodiment.

As illustrated in FIG. 11 and FIG. 12, the FPC 160 includes a first line portion 160A, a first bending portion 160B, a second line portion 160C, a second bending portion 160D, and a third line portion 160E in order from the vibrating body unit 130 side.

The first line portion 160A is a portion extending straight in the transverse direction (i.e., the X axis direction in the drawing) along the upper surface of the holder 136. As illustrated in FIG. 12, on an upper surface of the first line portion 160A, two electrode terminals 161 and 162 formed by a metallic film are provided for connecting the coils 132 and 134. The first line portion 160A (i.e., a portion where the electrode terminals 161 and 162 are provided) includes two circle-shaped opening portions, and by fitting the column-shaped projecting portions 136$d$ and 136$e$ provided on the holder 136 into the two opening portions, the first line portion 160A is supported by the holder 136 in a state positioned at a predetermined position.

The first bending portion 160B is a portion bent upwards at 180° from an end (i.e., an end on the positive side of the X axis in the drawing) of the first line portion 160A and connected to the second line portion 160C. That is, the first bending portion 160B is a portion for turning an extending direction of the FPC 160 from the vibrating body unit 130 to an external circuit, from one direction in the transverse direction (i.e., the positive direction of the X axis in the drawing) to the other direction in the transverse direction (i.e., the negative direction of the X axis in the drawing).

The second line portion 160C is a portion extending straight in the transverse direction (i.e., the X axis direction in the drawing) along a back surface of the upper case 112 above the first line portion 160A. The second line portion 160C extends to an opening portion 113 formed on the side wall of the housing 110 (i.e., a side wall of the lower case 111 on the negative side of the X axis), and portions of the FPC 160 after the second line portion 160C (i.e., the second line portion 160C and the third line portion 160E) are exposed from the opening portion 113 to the outside of the housing 110.

The second bending portion 160D is a portion exposed outside the housing 110, bent upwards at 180° from an end (i.e., an end on the negative side of the X axis in the drawing) of the second line portion 160C, and connected to the third line portion 160E. That is, the second bending portion 160D is a portion for turning an extending direction of the FPC 160 from the vibrating body unit 130 to an external circuit, from the other direction in the transverse direction (i.e., the negative direction of the X axis in the drawing) to one direction in the transverse direction (i.e., the positive direction of the X axis in the drawing).

The third line portion 160E is a portion exposed outside the housing 110, and extending straight in the transverse direction (i.e., the X axis direction in the drawing) along a surface of the upper case 112. As illustrated in FIG. 12, on an upper surface of the third line portion 160E, two electrode terminals 163 and 164 formed by a metallic film are provided for connecting an external circuit.

As described, the vibration generator 10 of the embodiment can support an end of the FPC 160 on the vibrating body unit 130 side by the holder 136. This enables the vibration generator 10 of the embodiment to stably hold the end of the FPC 160 on the vibrating body unit 130 side inside the housing 110. Thus, according to the vibration generator 10 of the embodiment, for example, easiness of soldering work for the FPC 160 can be increased, and an occurrence of defect such as a connection failure and disconnection can be avoided.

Second Embodiment

In the following, with reference to the drawings, a second embodiment will be described. In the second embodiment, a modified example of the vibration generator 10 described in the first embodiment will be described. In the following description, changes from the vibration generator 10 of the first embodiment will be mainly described. In the following description, constituting members similar to constituting members of the vibration generator of the first embodiment are denoted by similar reference numerals, and detailed descriptions are omitted.

(Configuration of a Vibration Generator 20)

Figure 13:
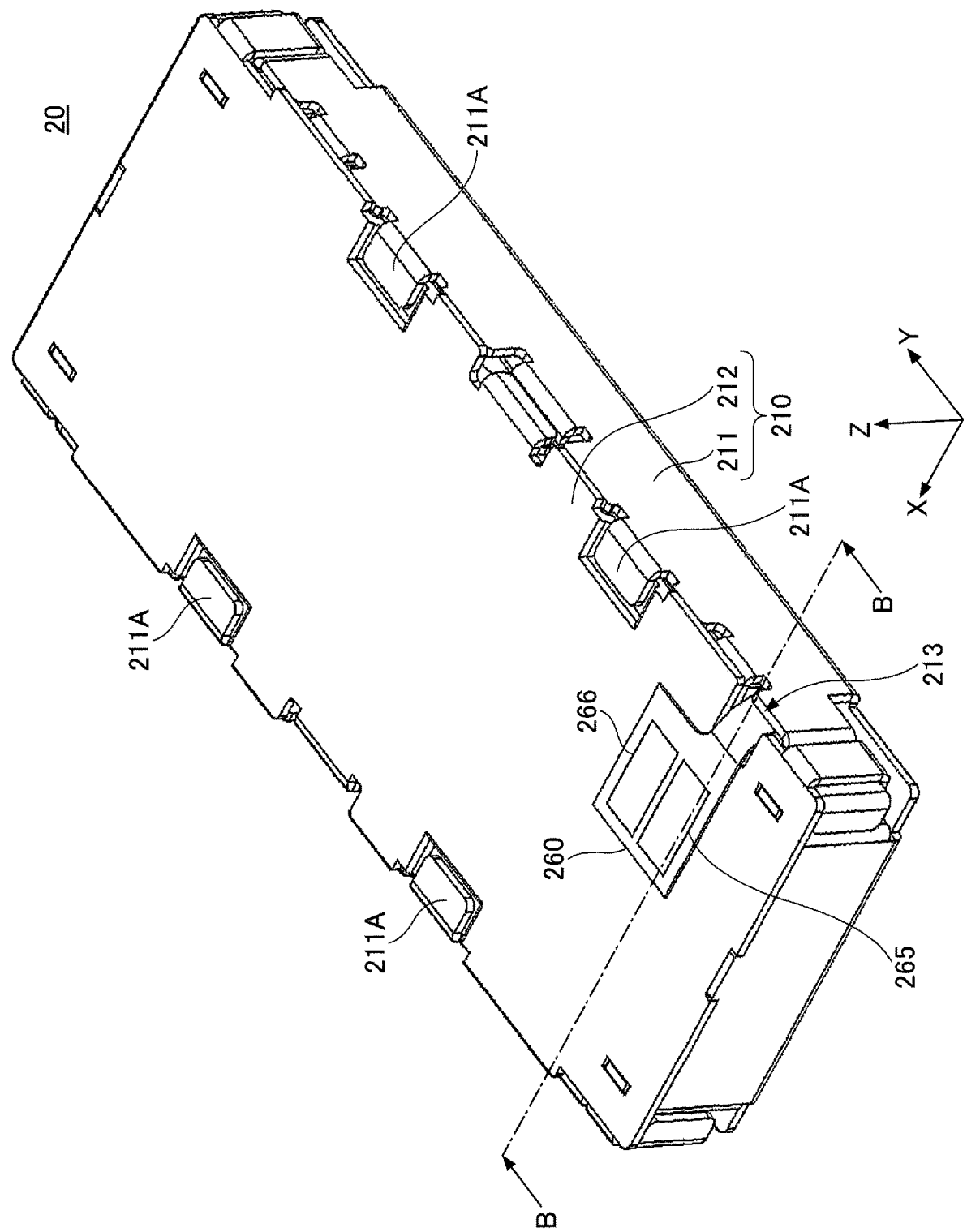
FIG. 13 is a perspective view illustrating a vibration generator according to a second embodiment.
Figure 14:
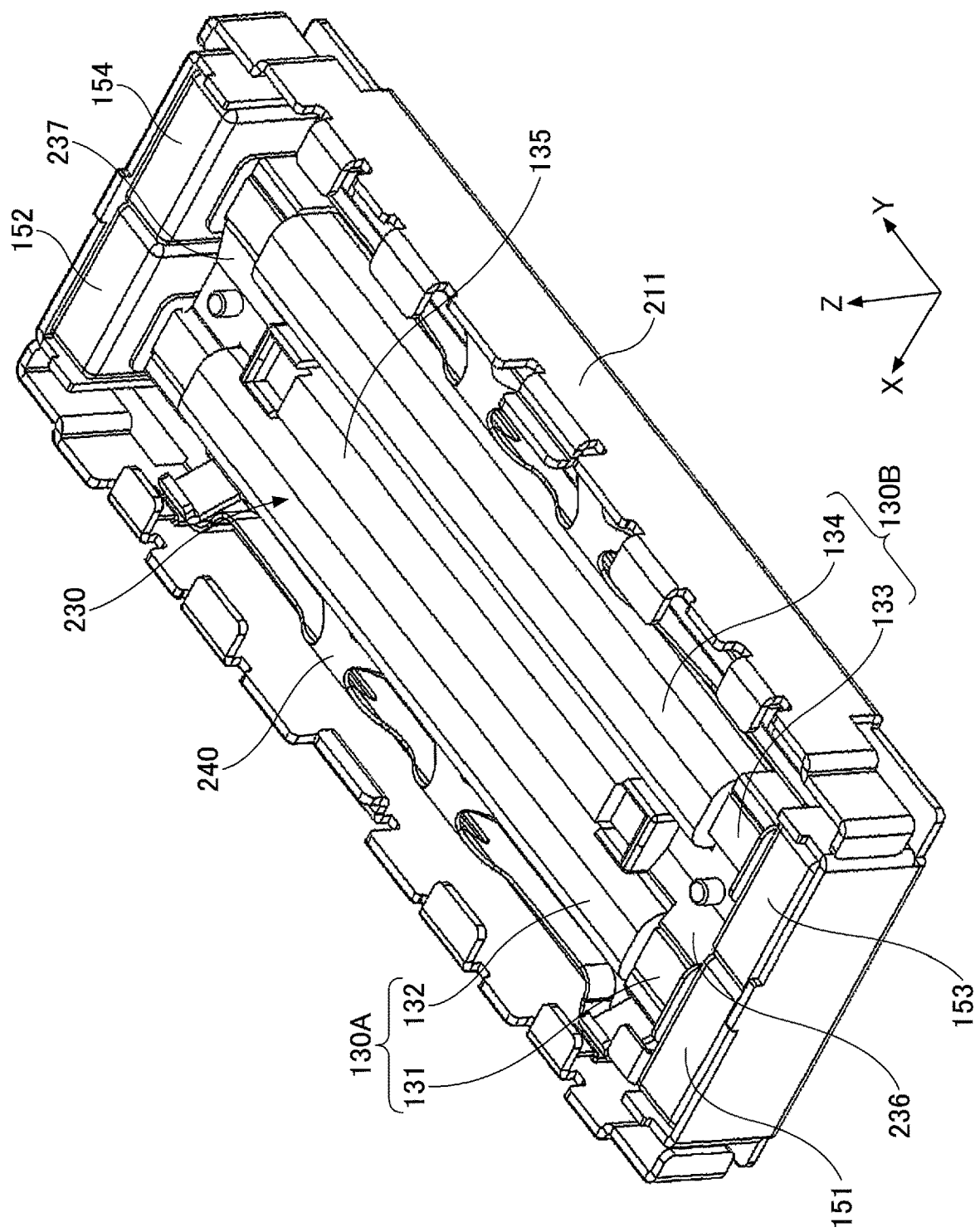
FIG. 14 is a perspective view illustrating a vibration generator (in a state in which an upper case and FPC are removed) according to a second embodiment.
Figure 15:
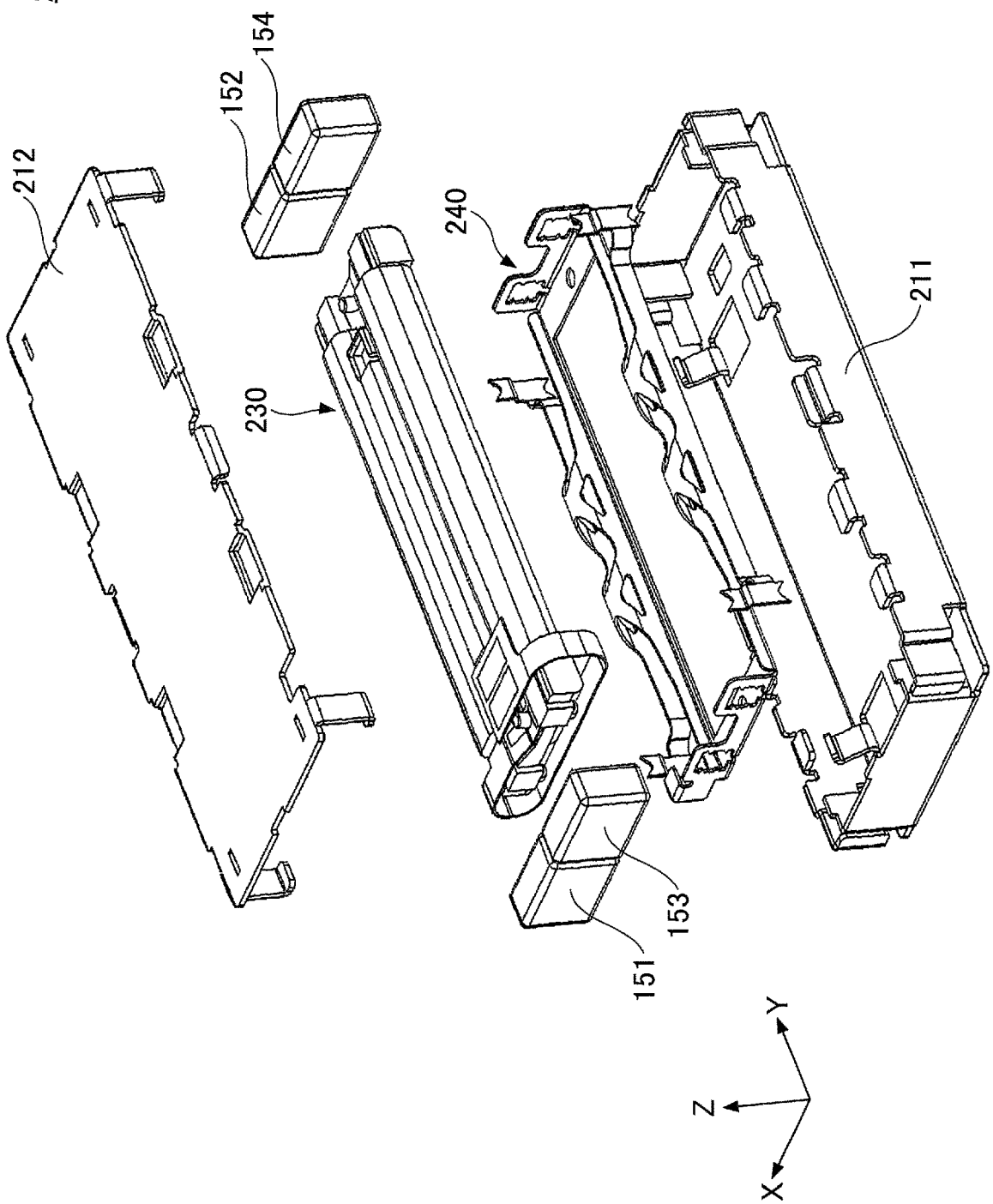
FIG. 15 is an exploded view of a vibration generator according to a second embodiment.

FIG. 13 is a perspective view illustrating a vibration generator 20 according to the second embodiment. FIG. 14 is a perspective view illustrating the vibration generator 20 (in a state in which an upper case and FPC are removed) according to the second embodiment. FIG. 15 is an exploded view of the vibration generator 20 according to the second embodiment.

As illustrated in FIG. 13 to FIG. 15, the vibration generator 20 includes a housing 210, the vibrating body unit 230, an elastic support 240, permanent magnets from 151 to 154, flexible printed circuits (FPC) 260.

The housing 210 includes a lower case 211 and an upper case 212 that can be separated from each other. As illustrated in FIG. 13, the upper case 212 is fixed to the lower case 211 by multiple hooks 211A provided on an upper edge of the lower case 211. The multiple hooks 211A are folded inside and press the upper case 212 from above. The housing 210 of the second embodiment is different from the housing 110 of the first embodiment in that an opening portion 213 for exposing the FPC 260 outside the housing 210 is formed on an edge of the upper case 212.

The vibrating body unit 230 includes the first electromagnet 130A and the second electromagnet 130B inside the vibrating body unit 230, and is a portion that vibrates along the up-down direction (i.e., the Z axis direction in the drawing) and the left-right direction (i.e., the X axis direction in the drawing) inside the housing 210 by generating a magnetic field with the first electromagnet 130A and the second electromagnet 130B. The vibrating body unit 230 of the second embodiment is different from the vibrating body unit 130 of the first embodiment in that the holders 236 and 237 are provided and are different in shape from the holders 136 and 137 of the first embodiment.

The elastic support 240 is a member that enables the vibrating body unit 230 to vibrate by supporting the vibrating body unit 230 and elastically deforming in the up-down direction (i.e., the Z axis direction in the drawing) and the left-right direction (i.e., the X axis direction in the drawing) inside the housing 210. The elastic support 240 of the second embodiment is different from the elastic support 140 of the first embodiment in that the elastic support 240 includes an elastic arm different in shape from the elastic arm of the first embodiment.

The permanent magnets 151 and 153 are provided side by side in the transverse direction inside the housing 210 such that the permanent magnets 151 and 153 face ends (i.e., ends on the negative side of the Y axis in the drawing) of the magnetic cores 131 and 133 provided in the vibrating body unit 230. The permanent magnets 152 and 154 are provided side by side in the transverse direction inside the housing 210 such that the permanent magnets 152 and 154 face the other ends (i.e., ends on the positive side of the Y axis in the drawing) of the magnetic cores 131 and 133 provided in the vibrating body unit 230.

The FPC 260 is a member connecting the coils 132 and 134 to an external circuit (which is not illustrated) so as to supply an alternating current to the coils 132 and 134 provided in the first electromagnet 130A and the second electromagnet 130B of the vibrating body unit 230. As illustrated in FIG. 13, an end of the FPC 260 on an external circuit side is exposed outside the housing 210, and two electrode terminals 265 and 266 formed by a metallic film are provided in the exposed portion.

(Configuration of the Vibrating Body Unit 230)

Figure 16:
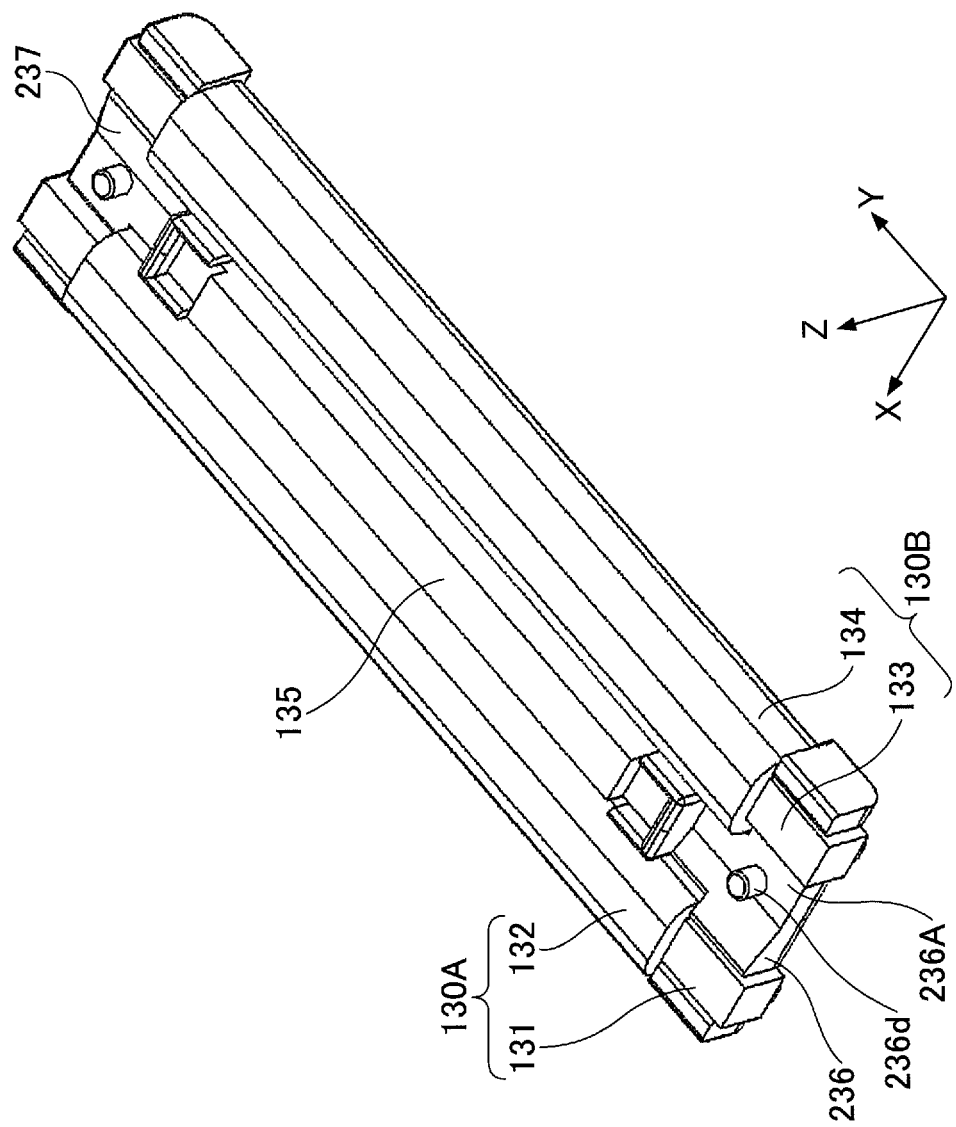
FIG. 16 is a perspective view illustrating a vibrating body unit provided in a vibration generator according to a second embodiment.
Figure 17:
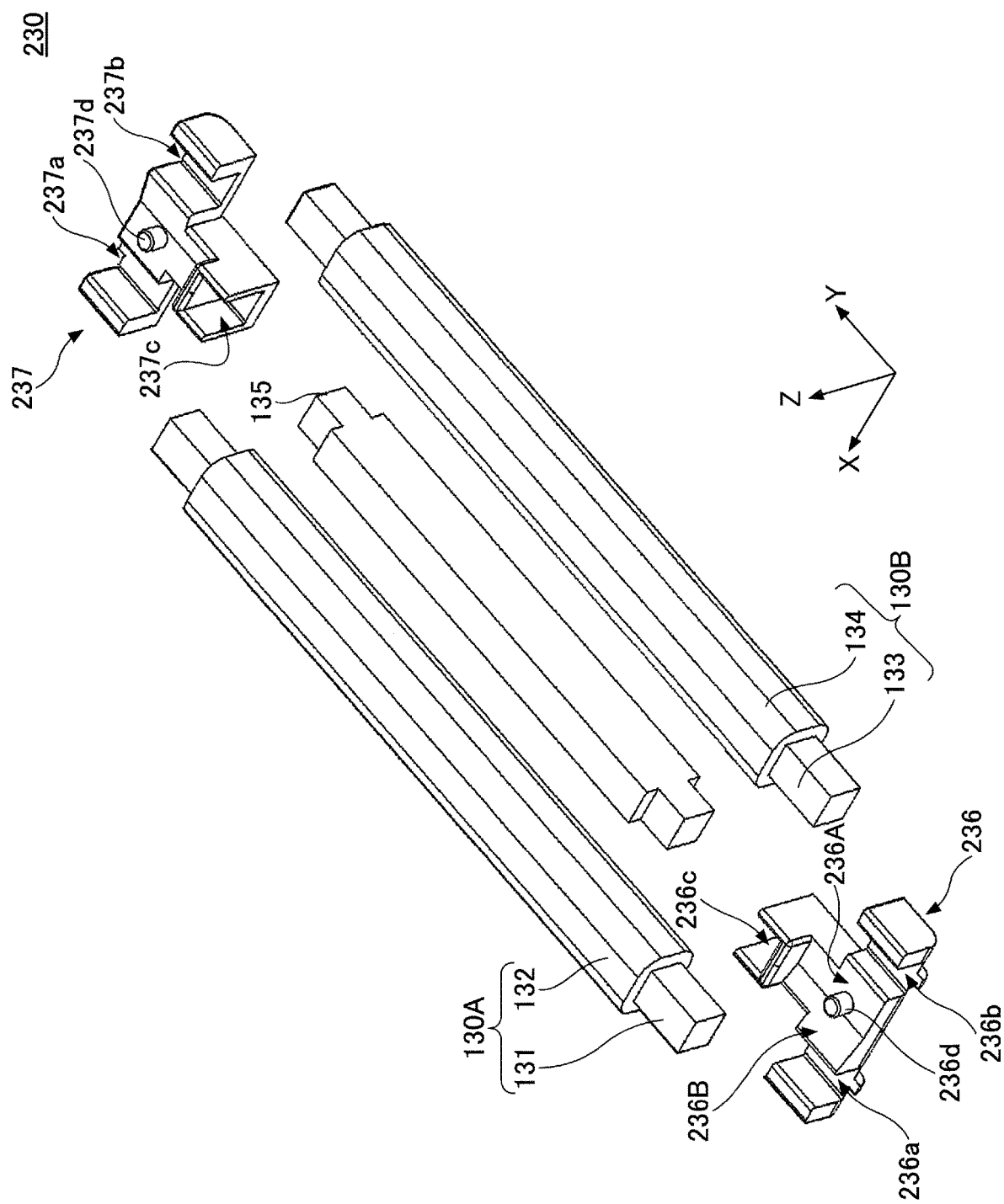
FIG. 17 is an exploded view of a vibrating body unit provided in a vibration generator according to a second embodiment.

FIG. 16 is a perspective view illustrating the vibrating body unit 230 provided in the vibration generator 20 according to the second embodiment. FIG. 17 is an exploded view of the vibrating body unit 230 provided in the vibration generator 20 according to the second embodiment.

As illustrated in FIG. 16 and FIG. 17, the vibrating body unit 230 includes the magnetic core 131, the coil 132, the magnetic core 133, the coil 134, the weight 135, the holder 236, and the holder 237. That is, the vibrating body unit 230 is different from the vibrating body unit 130, of the first embodiment in that the vibrating body unit 230 includes the holders 236 and 237 instead of the holders 136 and 137.

In the holder 236, a magnetic core holding portion 236a holding one end of the magnetic core 131, a magnetic core holding portion 236b holding one end of the magnetic core 133, and a weight holding portion 236c holding one end of the weight 135, are formed. Each of the holding portions from 236a to 236c is similar to a corresponding portion of the holding portions from 136a to 136c formed in the holder 136 of the first embodiment. Between the magnetic core holding portion 236a and the magnetic core holding portion 236b in the holder 236, a flat portion 236A and a slope 236B are formed. The flat portion 236A is a portion at a position lower than another portion. On the flat portion 236A, one column-shaped projecting portion 236d is formed. The projecting portion 236d can support an end of the FPC 260 on the coils 132 and 134 side at a predetermined position by a circle-shaped opening portion formed on the end of the FPC 260 on the coils 132 and 134 side being fit to the projecting portions 236d. The slope 236B is a portion inclined downward from a height position of another portion to a height position of the flat portion 236A. The slope 236B is formed in order to dispose an end of the FPC 260 on the coils 132 and 134 side on the flat portion 236A without forcibly bending the FPC 260.

In the holder 237, a magnetic core holding portion 237a holding the other end of the magnetic core 131, a magnetic core holding portion 237b holding the other end of the magnetic core 133, and a weight holding portion 237c holding the other end of the weight 135, are formed. Each of the holding portions from 237a to 237c is similar to a corresponding portion of the holding portions from 137a to 137c formed in the holder 137 of the first embodiment.

The holder 236 and the holder 237 can use a component common to each other. For example, the vibration generator 20 of the embodiment uses a component common to the holder 236 for the holder 237. Thus, in the vibration generator 20 of the embodiment, one projecting portion is provided on the holder 237, similar to the holder 236. Thus, for example, in the vibration generator 20 of the embodiment, the FPC 260 can be provided on the holder 237 side and the end of the FPC 260 on the coils 132 and 134 side can be supported by the holder 237.

(Configuration of the Elastic Support 240)

Figure 18:
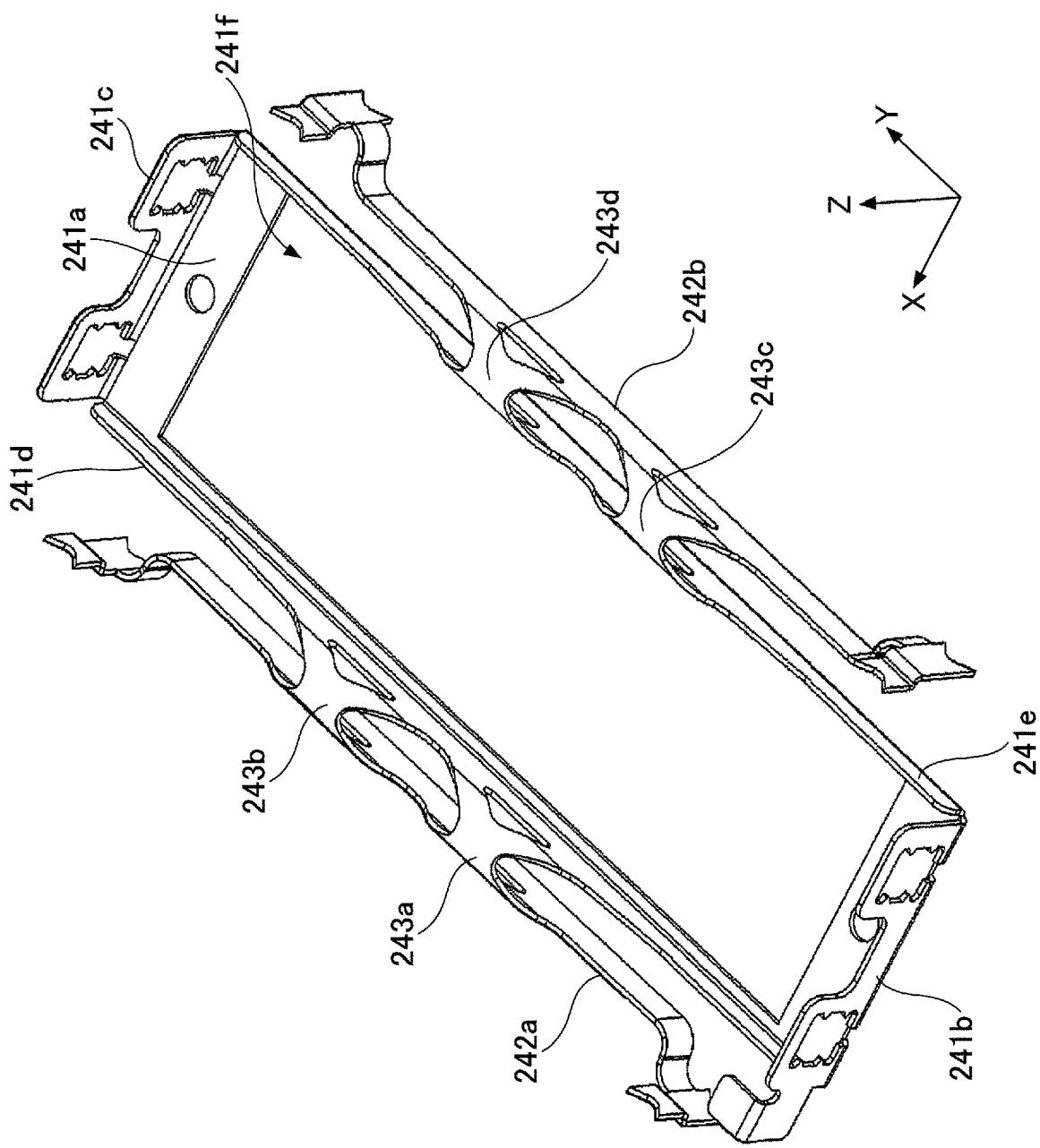
FIG. 18 is a perspective view illustrating an elastic support provided in a vibration generator according to a second embodiment.
Figure 19:
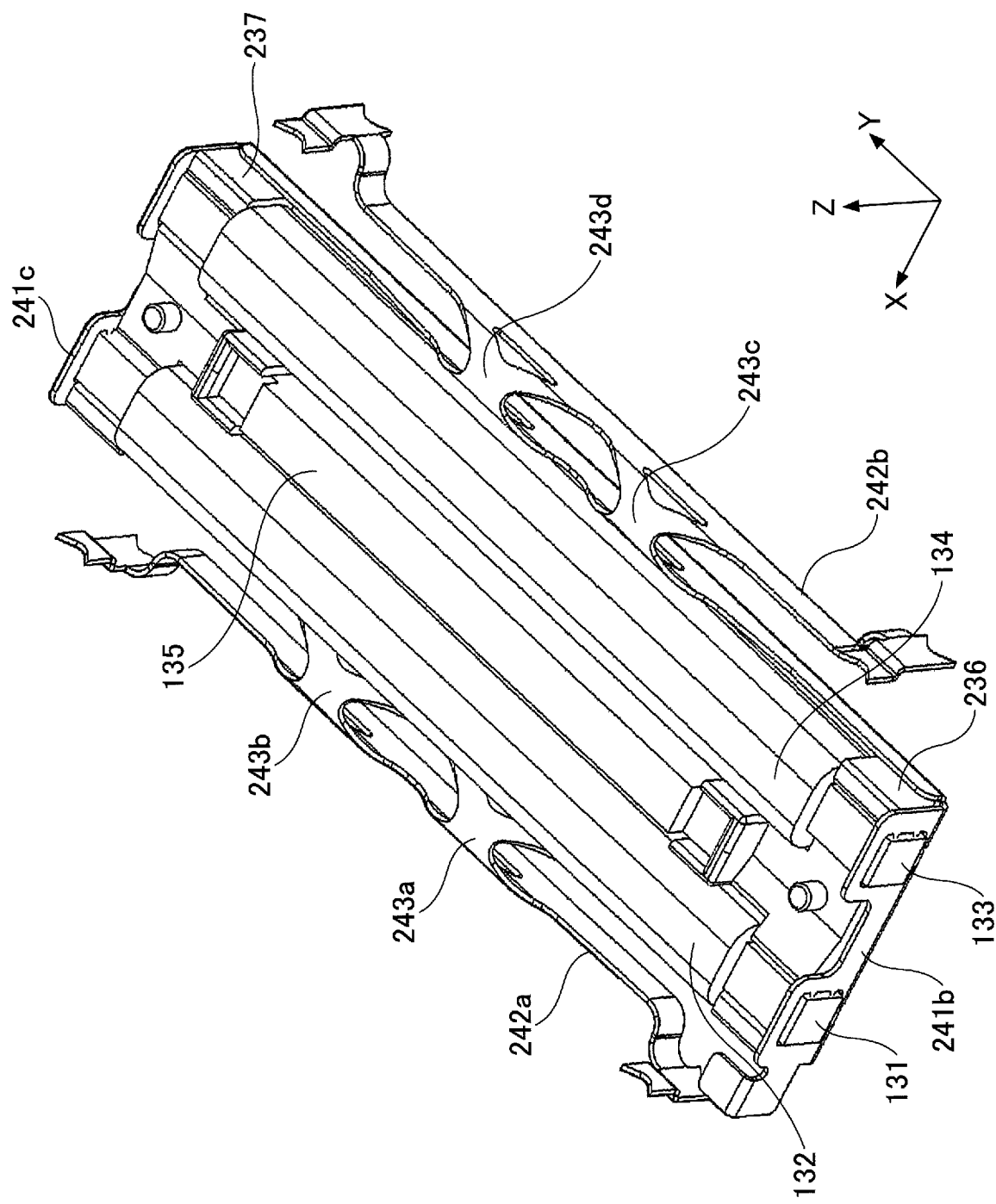
FIG. 19 is a perspective view illustrating an elastic support (in a state of supporting a vibrating body unit) provided in a vibration generator according to a second embodiment.
Figure 20:
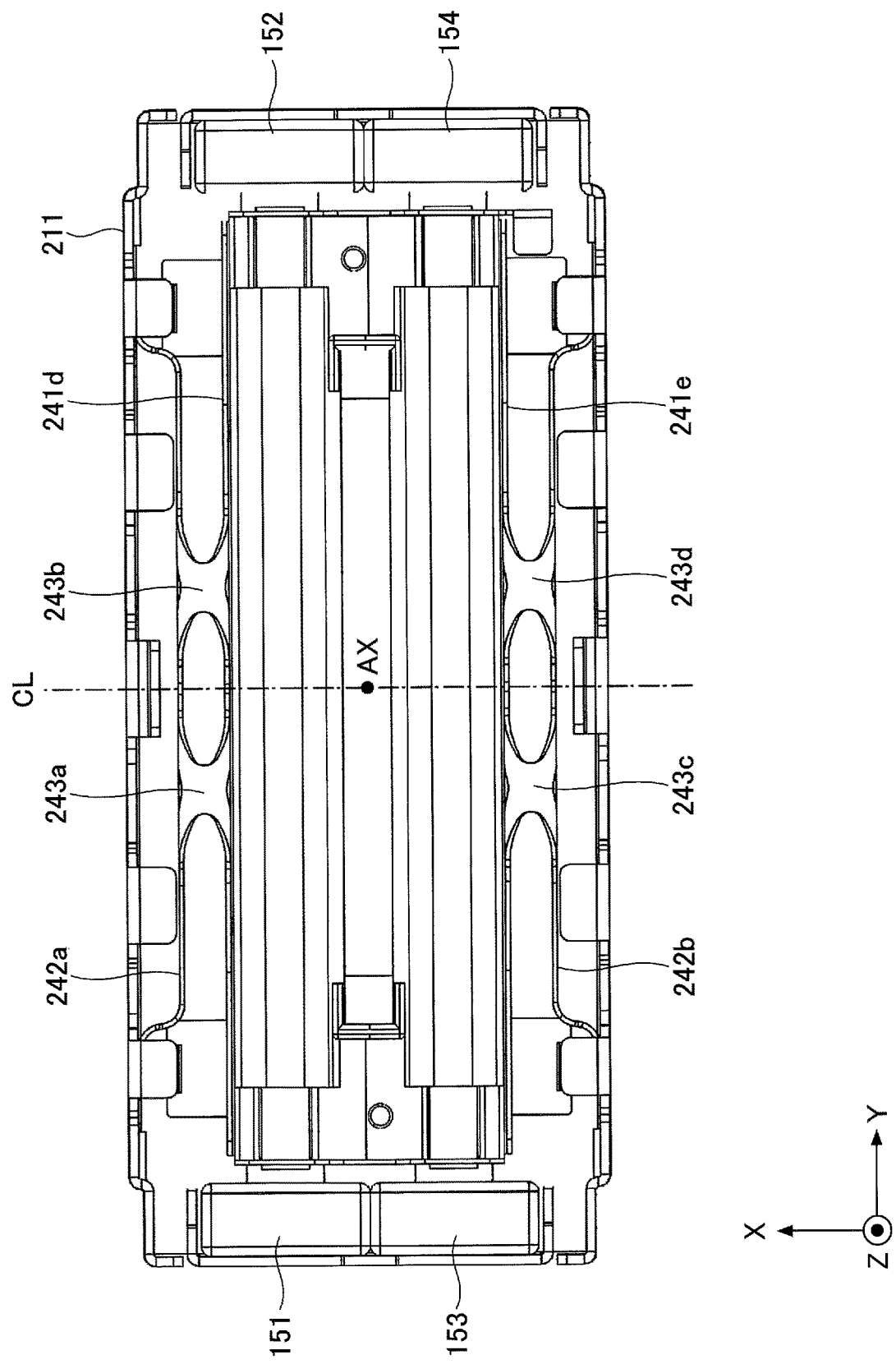
FIG. 20 is a plan view illustrating an elastic support (in a state of being incorporated in a lower case) provided in a vibration generator according to a second embodiment.

FIG. 18 is a perspective view illustrating the elastic support 240 provided in the vibration generator 20 according to the second embodiment. FIG. 19 a perspective view illustrating the elastic support 240 (in a state of supporting the vibrating body unit 230) provided in the vibration generator 20 according to the second embodiment. FIG. 20 is a plan view illustrating the elastic support 240 (in a state of being incorporated in the lower case 211) provided in the vibration generator 20 according to the second embodiment.

As illustrated in FIG. 18 and FIG. 19, the elastic support 240 includes a vibrating body holding portion 241, an elastic arm, and an elastic beam.

The vibrating body holding portion 241 is a tray-shaped portion holding the vibrating body unit 230. The vibrating body holding portion 241 is approximately formed in a rectangle shape in planar view from above. The vibrating body holding portion 241 includes a bottom surface 241a, a first wall 241b, a second wall 241c, a first side wall 241d, and a second side wall 241e.

The bottom surface 241a is a planar part forming a rectangle shape having a transverse direction in the left-right direction (i.e., the X axis direction in the drawing) and a longitudinal direction in the front-back direction (i.e., the Y axis direction in the drawing). In the bottom surface 241a, a relatively large rectangle-shaped opening portion 241f, which is opened along an outer edge of the bottom surface 241a, is formed. This moderately weakens torsional rigidity of both the left and right bottom edges extending along the longitudinal direction (i.e., the Y axis direction in the drawing), and the bottom edges become easily twisted outward in the left-right direction (i.e., the X axis direction in the drawing). Thus, the vibrating body holding portion 241 causes the elastic support 240 to easily deform elastically in the up-down direction (i.e., the Z axis direction in the drawing). As a result, the vibration generator of the embodiment can obtain a sufficient vibration generated by the vibrating body unit 230 supported by the vibrating body holding portion 241.

The first wall 241b is a wall-shaped part erected vertically on one short side part (i.e., a short side part on the negative side of the Y axis in the drawing) of the bottom surface 241a. In the first wall 241b, two rectangle-shaped opening portions are formed side by side in the transverse direction (i.e., the X axis direction in the drawing), and as illustrated in FIG. 19, by swaging the two opening portions after penetrating one end of each of the magnetic core 131 and the magnetic core 133 (i.e., an end on the negative side of the Y axis in the drawing) into a corresponding opening portion of the two opening portions, one end of each of the magnetic core 131 and the magnetic core 133 can be securely supported.

The second wall 241c is a wall-shaped part erected vertically on the other short side part (i.e., a short side part on the positive side of the Y axis in the drawing) of the bottom surface 241a. In the second wall 241c, two rectangle-shaped opening portions are formed side by side in the transverse direction (i.e., the X axis direction in the drawing), and as illustrated in FIG. 19, by swaging the two opening portions after penetrating the other end of each of the magnetic core 131 and the magnetic core 133 (i.e., an end on the positive side of the Y axis in the drawing) into a corresponding opening portion of the two opening portions, the other end of each of the magnetic core 131 and the magnetic core 133 can be securely supported.

The first side wall 241d is a wall-shaped part erected vertically on one long side part (i.e., a long side part on the positive side of the X axis in the drawing) of the bottom surface 241a. The second side wall 241e is a wall-shaped part erected vertically on the other long side part (i.e., a long side part on the negative side of the X axis in the drawing) of the bottom surface 241a.

The elastic arm is a thin long plate portion extending straight along the longitudinal direction (i.e., the Y axis direction in the drawing) of the vibrating body holding portion 241 on each of the left and right outer sides of the vibrating body holding portion 241. The elastic arm is a portion that functions as what is called a flat spring, and enables the vibrating body unit 230 to vibrate in the transverse direction (i.e., the X axis direction in the drawing) by the elastic arm being elastically deformed. Specifically, in the embodiment, the elastic support 240 includes two elastic arms 242a and 242b.

The elastic arm 242a is an example of a fifth elastic arm. The elastic arm 242a is a portion extending straight from a position near one end (i.e., an end on the negative side of the Y axis in the drawing) of the first side wall 241d to a position near the other end (i.e., an end on the positive side of the Y axis in the drawing) of the first side wall 241d along the first side wall 241d outside the first side wall 241d. A middle part of the elastic arm 242a is connected to an upper edge of the first side wall 241d by elastic beams 243a and 243b disposed side by side in the longitudinal direction (i.e., the Y axis direction in the drawing).

The elastic arm 242b is an example of a sixth elastic arm. The elastic arm 242b is a portion extending straight from a position near one end (i.e., an end on the negative side of the Y axis in the drawing) of the second side wall 241e to a position near the other end (i.e., an end on the positive side of the Y axis in the drawing) of the second side wall 241e along the second side wall 241e outside the second side wall 241e. A middle part of the elastic arm 242b is connected to an upper edge of the second side wall 241e by elastic beams 243c and 243d disposed side by side in the longitudinal direction (i.e., the Y axis direction in the drawing).

The elastic support 240 configured as described above is elastically deformed in the transverse direction (i.e., the X axis direction in the drawing) mainly by each of the elastic arms 242a and 242b being largely bent in the transverse direction (i.e., the X axis direction in the drawing). In addition, the elastic support 240 is configured to be elastically deformed in the vertical direction (i.e., the Z axis direction in the drawing) by torsional deformation of both the left and right bottom edges extending along the longitudinal direction (i.e., the Y axis direction in the drawing) of the vibrating body holding portion 241, which is caused mainly by each of the elastic arms from 243a to 243d being bent, and the opening portion 241f being provided in the bottom surface 241a. Here, as each of the elastic arms 242a and 242b is relatively short in a vertical length (i.e., a length in the Z axis direction in the drawing), and a straight portion extending along the longitudinal direction (i.e., the Y axis direction in the drawing) of the vibrating body holding portion 241 is sufficiently long, that is, has a sufficient elastic effective length, each of the elastic arms 242a and 242b can be largely bent in the transverse direction (i.e., the X axis direction in the drawing). This enables the vibration generator 20 of the embodiment to achieve thickness reduction of the vibrating body unit 230 and obtain a sufficient vibration in the transverse direction (i.e., the X axis direction in the drawing) of the vibrating body unit 230.

As illustrated in FIG. 20, the elastic arm 242a is connected to the first side wall 241d of the vibrating body holding portion 241 by two elastic beams 243a and 243b provided such that the center of the vibrating body holding portion 241 (i.e., a position on a center line CL illustrated in FIG. 20) in the longitudinal direction (i.e., the Y axis direction in the drawing) is between two elastic beams 243a and 243b. Similarly, the elastic arm 242b is connected to the second side wall 241e of the vibrating body holding portion 241 by two elastic beams 243c and 243d provided such that the center of the vibrating body holding portion 241 (i.e., a position on the center line CL illustrated in FIG. 20) in the longitudinal direction (i.e., the Y axis direction in the drawing) is between two elastic beams 243c and 243d. That is, on both the left and right side walls of the vibrating body holding portion 241, two elastic beams are connected to each of the left and right side walls such that the center line CL is between the two elastic beams, and the two elastic beams are provided on positions moderately away from the center line CL. This can prevent the vibration generator 20 of the embodiment from rotating the vibrating body holding portion 241 around the center line CL as a rotating axis. Additionally, this can prevent the vibration generator 20 of the embodiment from rotating the vibrating body holding portion 241 in an XY plane around an AX axis, which is parallel to the Z axis and passing through a center of the vibrating body holding portion 241 in the X axis direction and Y axis direction in the drawing, as a rotating axis.

Figure 21:
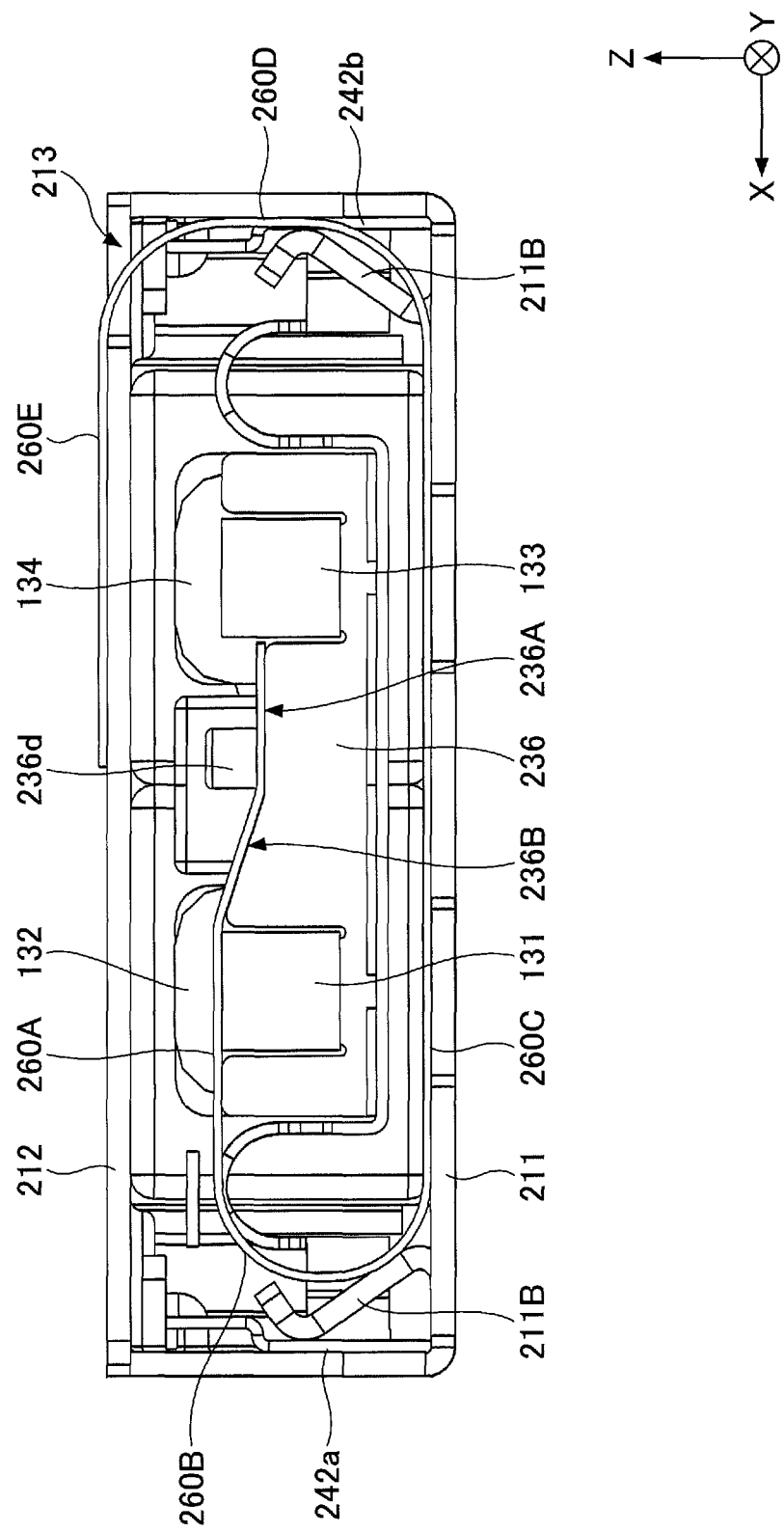
FIG. 21 is a cross-sectional view along B-B of the vibration generator illustrated in FIG. 13.

As illustrated in FIG. 20, both ends of each of the elastic arms 242a and 242b are bent in a crank shape outward, and flat portions (i.e., an example of a housing fixing portion) positioned outside the straight portion (i.e., an elastic effective portion) extending along the longitudinal direction (i.e., the Y axis direction in the drawing) of the vibrating body holding portion 241, are formed. Each end of the elastic arms 242a and 242b is fixed to a corresponding position on an inner surface of the side wall of the lower case 211 of the housing 210 by a selectable fixing method (such as an adhesive, a rivet, and a screw) on the flat portion. As illustrated in FIG. 20, this can approximately position the straight portion of each of the elastic arms 242a and 242b in a center between the side wall of the vibrating body holding portion 241 and the side wall of the lower case 211, and enables the vibration generator 20 of the embodiment to obtain a sufficient range of vibration in the left-right direction (i.e., the X axis direction in the drawing) in each of the elastic arms 242a and 242b. As illustrated in FIG. 21, the embodiment adopts a configuration that the flat portions of each of the elastic arms 242a and 242b are fixed to the internal surface of a corresponding side wall of the lower case 211 by being sandwiched between the internal surface of the corresponding side wall of the lower case 211 and corresponding supporting walls 211B formed by a part of the bottom surface portion of the lower case 211 being bent upward.

As illustrated in FIG. 20, the elastic beams from 243a to 243d are X-shaped portions in planar view from above. That is, each of the elastic beams from 243a to 243d has a shape such that two pillar portions extending upward and obliquely from each of the side walls of the vibrating body holding portion 241 and two pillar portions extending upward and obliquely from a corresponding elastic arm 242 intersect at a top. This moderately increases strength of the elastic beams from 243a to 243d, and a twist does not easily occur. Thus, each of the elastic beams from 243a to 243d can prevent the vibrating body holding portion 241 from rotating around itself as a rotating axis. Additionally, a plate width (i.e., a width of the Y axis direction in the drawing) of each of the elastic beams from 243a to 243d is smallest at its top. This moderately decreases an elastic modulus at a top of each of the elastic beams from 243a to 243d. That is, each of the elastic beams from 243a to 243d can sufficiently vibrate the vibrating body unit 230 by being elastically deformed most largely at its top.

(Supporting Structure of the FPC 260)

Figure 22:
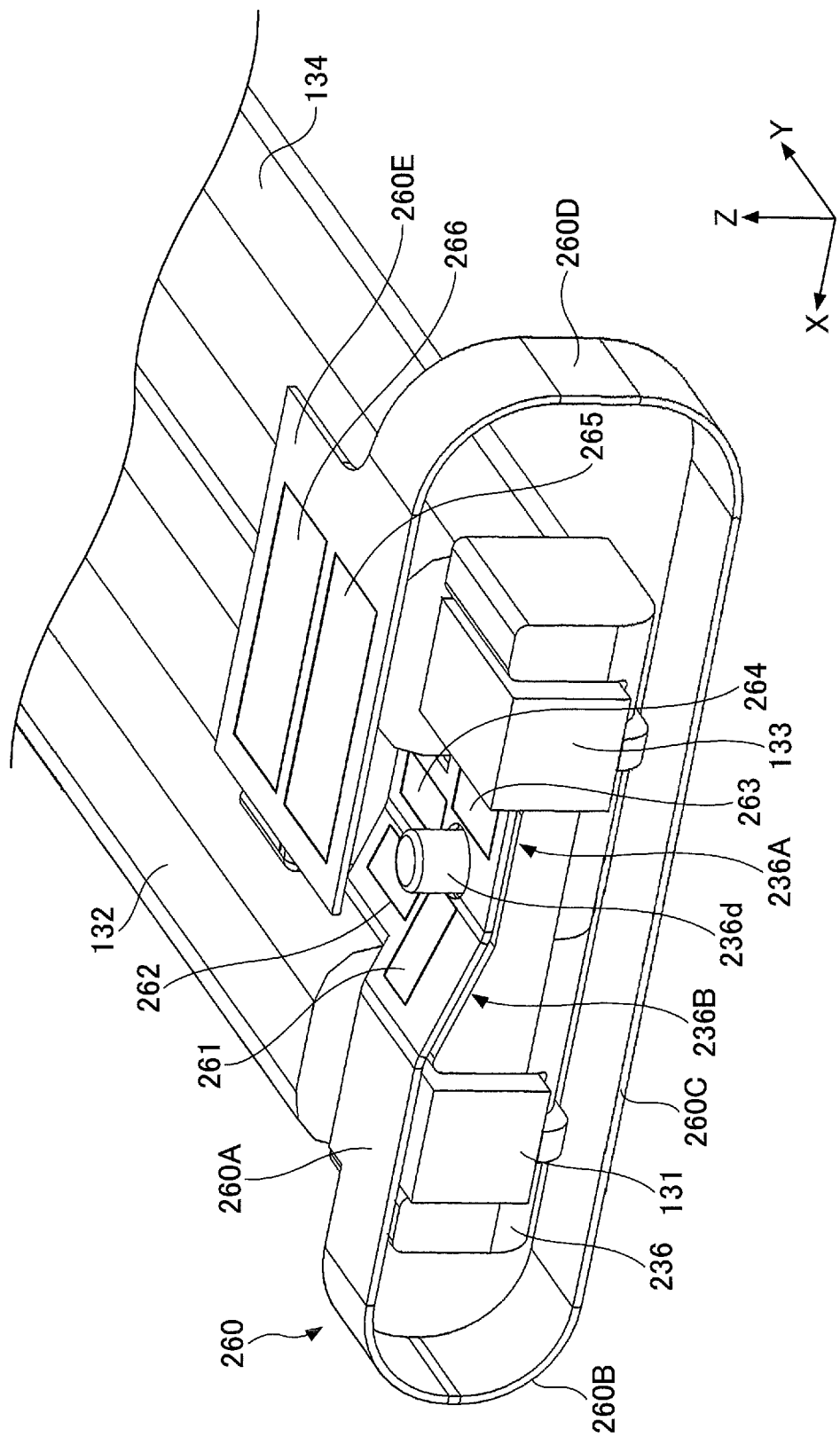
FIG. 22 is a drawing illustrating a supporting structure of FPC in a vibration generator according to a second embodiment.

FIG. 21 is a cross-sectional view along B-B of the vibration generator 10 illustrated in FIG. 13. FIG. 22 is a drawing illustrating a supporting structure of the FPC 260 in the vibration generator 20 according to the second embodiment.

As illustrated in FIG. 21 and FIG. 22, the FPC 260 includes a first line portion 260A, a first bending portion 260B, a second line portion 260C, a second bending portion 260D, and a third line portion 260E in order from the vibrating body unit 130 side.

The first line portion 260A is a portion extending straight in the transverse direction (i.e., the X axis direction in the drawing) along the upper surface of the holder 236. As illustrated in FIG. 22, on an upper surface of the first line portion 260A, four electrode terminals from 261 to 262 formed by a metallic film are provided for connecting the coils 132 and 134. The first line portion 260A includes a circle-shaped opening portion, and by fitting the column-shaped projecting portion 236d provided on the flat portion 236A of the holder 236 into the opening portion, the first line portion 260A is stably supported by the holder 236 in a state positioned at a predetermined position.

The first bending portion 260B is a portion bent downwards at 180° from an end (i.e., an end on the positive side of the X axis in the drawing) of the first line portion 260A and connected to the second line portion 260C. That is, the first bending portion 260B is a portion for turning an extending direction of the FPC 260 from the vibrating body unit 130 to an external circuit, from one direction in the transverse direction (i.e., the positive direction of the X axis in the drawing) to the other direction in the transverse direction (i.e., the negative direction of the X axis in the drawing).

The second line portion 260C is a portion extending straight in the transverse direction (i.e., the X axis direction in the drawing) along an inner bottom surface of the lower case 211 below the holder 236.

The second bending portion 260D is a portion bent upwards at 180° from an end (i.e., an end on the negative side of the X axis in the drawing) of the second line portion 260C, and connected to the third line portion 260E. That is, the second bending portion 260D is a portion for turning an extending direction of the FPC 160 from the vibrating body unit 130 to an external circuit, from the other direction in the transverse direction (i.e., the negative direction of the X axis in the drawing) to one direction in the transverse direction (i.e., the positive direction of the X axis in the drawing). The second bending portion 260D extends to an opening portion 213 formed on the upper case 212, and a portion of the FPC 260 after the second bending portion 260D (i.e., the third line portion 260E) are exposed from the opening portion 213 to the outside of the housing 210.

The third line portion 260E is a portion exposed from the opening portion 213 formed on the upper case 212 to the outside of the housing 210, and extending straight in the transverse direction (i.e., the X axis direction in the drawing) along a surface of the upper case 212. As illustrated in FIG. 22, on an upper surface of the third line portion 260E, two electrode terminals 265 and 266 formed by a metallic film are provided for connecting an external circuit.

As illustrated in FIG. 21 and FIG. 22, the flat portion 236A of the holder 236 is lower than another portion (i.e., a portion holding the magnetic core 131). Additionally, in the holder 236, the slope 236B, which is inclined downward from a position of another portion (i.e., a portion holding the magnetic core 131) to a position of the flat portion 236A, is formed. This enables the vibration generator 20 of the embodiment to arrange the first line portion 260A of the FPC 260 along the flat portion 236A and the slope 236B. As a result, the vibration generator 20 of the embodiment can stably support the electrode terminals from 261 to 264 of the first line portion 260A by surfaces of the flat portion 236A and the slope 236B. Additionally, the vibration generator 20 of the embodiment can obtain a space to fit thickness of soldering when the electrode terminals from 261 to 264 are soldered, on the flat portion 236A and the slope 236B. The vibration generator 20 of the embodiment can enable the end of the first line portion 260A to be lead to the flat portion 236A without forcibly bending the first line portion 260A.

Third Embodiment

In the following, with reference to the drawings, a third embodiment will be described. In the third embodiment, a modified example of the vibration generator 10 described in the first embodiment will be described. In the following description, changes from the vibration generator 10 of the first embodiment will be mainly described.

(Configuration of a Vibration Generator 30)

Figure 23:
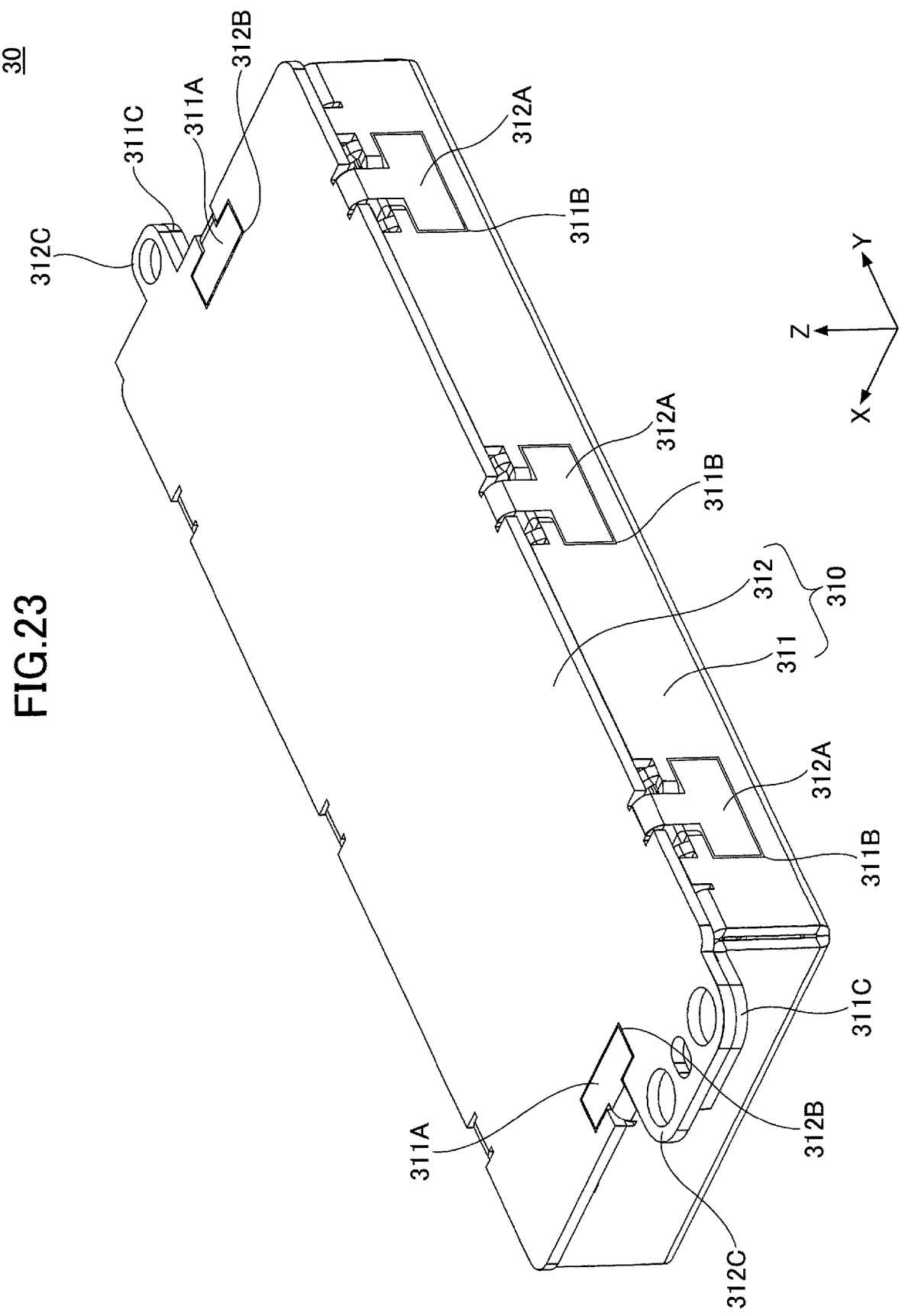
FIG. 23 is a perspective view illustrating a vibration generator according to a third embodiment.
Figure 24:
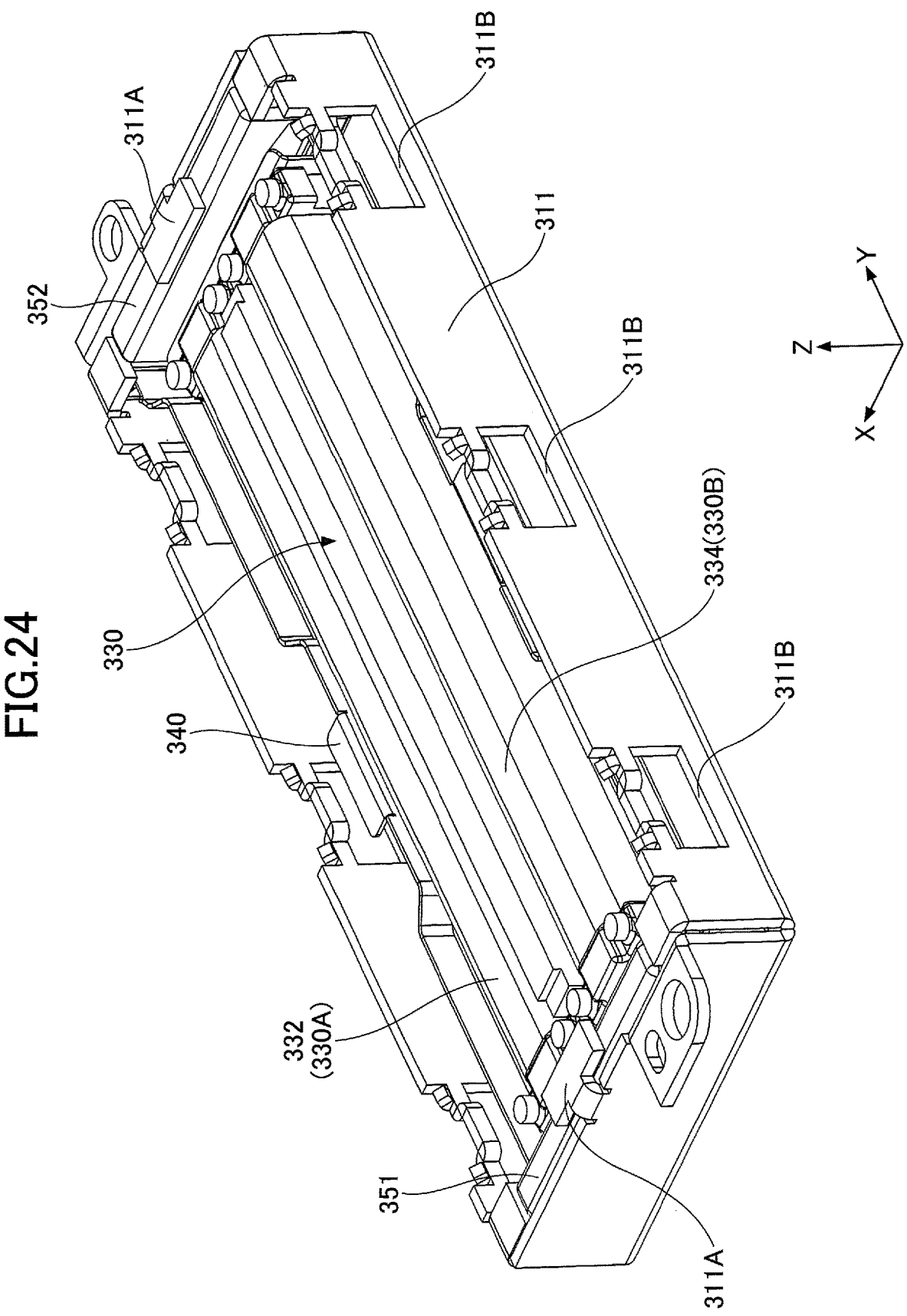
FIG. 24 is a perspective view illustrating a vibration generator (in a state in which an upper case is removed) according to a third embodiment.
Figure 25:
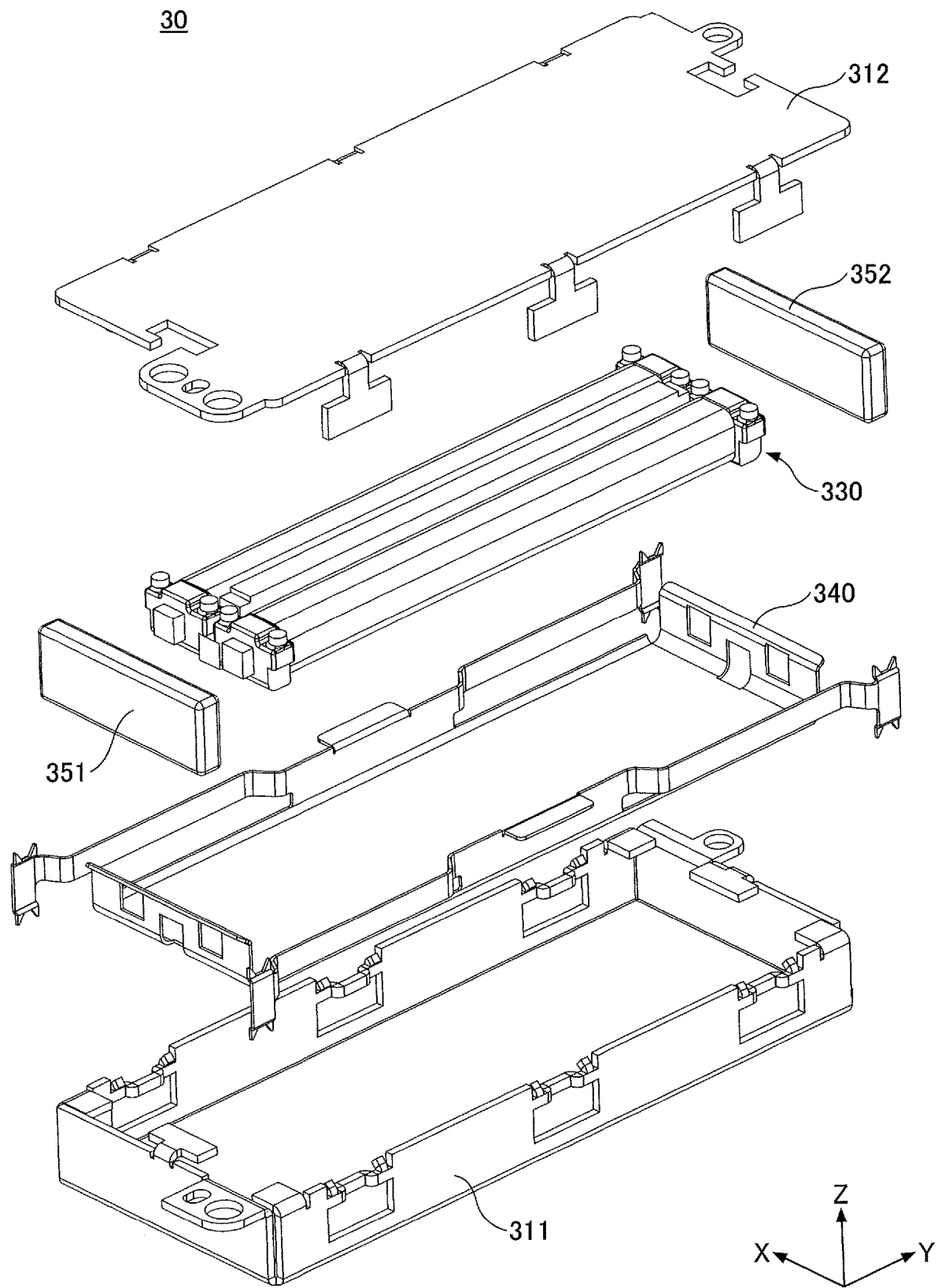
FIG. 25 is an exploded view of a vibration generator according to a third embodiment.

FIG. 23 is a perspective view illustrating a vibration generator 30 according to the third embodiment. FIG. 24 is a perspective view illustrating the vibration generator 30 (in a state in which an upper case 313 is removed) according to the third embodiment. FIG. 25 is an exploded view of the vibration generator 30 according to the third embodiment.

The vibration generator 30 of the embodiment is configured such that a vibrating body unit 330 provided inside a housing 310 vibrates along the left-right direction (i.e., a first direction and the X axis direction in the drawing) in one direction. The vibration generator 30 is similar to the vibration generator 10 of the first embodiment in that the vibration generator 30 is thin and can obtain a sufficient vibration in the left-right direction.

As illustrated in FIG. 23 to FIG. 25, the vibration generator 30 includes the housing 310, the vibrating body unit 330, an elastic support 340, and permanent magnets from 351 to 354.

The housing 310 includes a lower case 311 and an upper case 312 that can be separated from each other. As illustrated in FIG. 23, hooks 311A, which are internally and horizontally bent at a right angle, are formed on upper edges of both front and back short side parts in the lower case 311. The hook 311A has a front part in a wide rectangle shape. When the upper case 312 is in a state of closing an upper opening of the lower case 311, the front part of the hook 311A having a rectangle shape is fit into an opening 312B formed on the upper case 312. The opening 312B approximately has the same size of a rectangle shape as the front part of the hook 311A. This positions the upper case 312 at a predetermined position to the lower case 311, and movements of the upper case 312 in the front-back direction (i.e., the Y axis direction in the drawing) and in the left-right direction (i.e., the X axis direction in the drawing) with respect to the lower case 311 are stopped by a shear plane of the front part of the hook 311A.

As illustrated in FIG. 23, multiple hooks 312A (e.g., three in an example illustrated in FIG. 23), which are projecting outside and horizontally in an unbent state, are formed on each of the left and right long side parts of an outer edge of the upper case 312. The hook 312A has a front part in a wide rectangle shape. When the upper case 312 is in a state of closing an upper opening of the lower case 311, the front part of the hook 312A having a rectangle shape is fit into an opening 311B formed on the lower case 311 by being bent downward at a right angle. The opening 311B approximately has the same size of a rectangle shape as the front part of the hook 312A. This stops movements of the upper case 312 in the front-back direction (i.e., the Y axis direction in the drawing) and in the up-down direction (i.e., the Z axis direction in the drawing) with respect to the lower case 311 by a shear plane of the front part of the hook 312A. That is, the upper case 312 is securely fixed to the lower case 311.

As illustrated in FIG. 23, on both front and back short side parts of an outer edge of the upper case 312, flat plate-shaped tabs 312C projecting outside and horizontally are formed. Additionally, on upper edges of both front and back short side parts of the lower case 311, flat plate-shaped tabs 311C bent at a right angle outside and horizontally are formed. As illustrated in FIG. 23, when the upper case 312 is in a state of closing an upper opening of the lower case 311, the tab 311C formed on the lower case 311 and the tab 312C formed on the upper case 312 overlap each other. In this state, each of the tab 311C and the tab 312C functions as a fixing portion fixing the housing 310 to a target device. For example, the fixing portion forms a circle-shaped opening portion. This can fix the housing 310 to a target device by penetrating a fixing member such as a screw into the opening portion for example. The fixing portion enhances its strength by having an overlapping structure of two metallic plates (i.e., the tab 311C and the tab 312C). This prevents the fixing portion from being easily deformed by the vibration of the vibration generator 30 for example, and can securely fix the housing 310. Additionally, the upper case 312 can firmly close the lower case 311 by the tab 311C and the tab 312C being firmly fastened with a fixing member such as a screw in a state of overlapping each other when the housing 310 is fixed to a target device.

The vibrating body unit 330 includes a first electromagnet 330A and a second electromagnet 330B inside, and is a portion that vibrates along the left-right direction (i.e., the X axis direction in the drawing) inside the housing 310 by generating a magnetic field with the first electromagnet 330A and the second electromagnet 330B.

The elastic support 340 is a member that enables the vibrating body unit 330 to vibrate along the left-right direction (i.e., the X axis direction in the drawing) by supporting the vibrating body unit 330 and elastically deforming in the left-right direction (i.e., the X axis direction in the drawing) inside the housing 310.

Inside the housing 310, the permanent magnet 351 is provided in the left-right direction (i.e., the X axis direction in the drawing) as the longitudinal direction such that the permanent magnet 351 faces one end (i.e., an end on the negative side of the Y axis in the drawing) of the magnetic cores 331 and 333 provided in the vibrating body unit 330. Inside the housing 310, the permanent magnet 352 is provided in the left-right direction (i.e., the X axis direction in the drawing) as the longitudinal direction such that the permanent magnet 352 faces the other end (i.e., an end on the positive side of the Y axis in the drawing) of the magnetic cores 331 and 333 provided in vibrating body unit 330.

The vibration generator 30 configured as described above can generate an alternating magnetic field around the coils 332 and 334 by supplying an alternating current to the coils 332 and 334 provided in the first electromagnet 330A and the second electromagnet 330B from an external circuit (which is not illustrated) through the FPC (which is not illustrated). This causes the vibrating body unit 330 to vibrate along the left-right direction (i.e., the X axis direction in the drawing), by an attractive force and a repulsive force generated between the first electromagnet 330A with the second electromagnet 330B and the permanent magnet 351 with the permanent magnet 352, with elastic deformation of the elastic support 340 supporting the vibrating body unit 330. Specific configurations of the vibrating body unit 330 and the elastic support 340 will be described later with reference to FIG. 26 to FIG. 30. Specific configurations of the permanent magnets 351 and 352 will be described later with reference to FIG. 31 and FIG. 32.

(Configuration of the Vibrating Body Unit 330)

Figure 26:
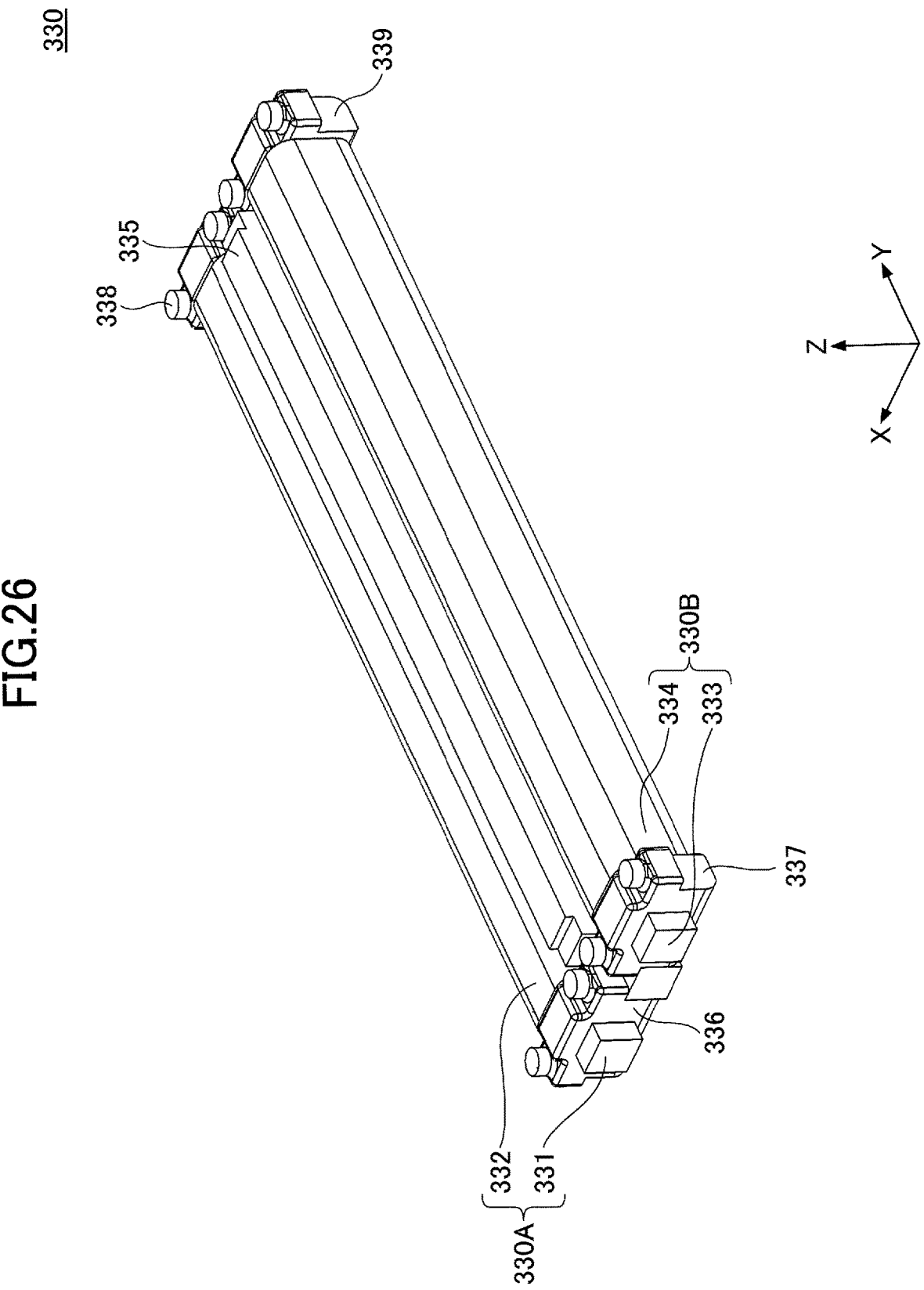
FIG. 26 is a perspective view illustrating a vibrating body unit provided in a vibration generator according to a third embodiment.
Figure 27:
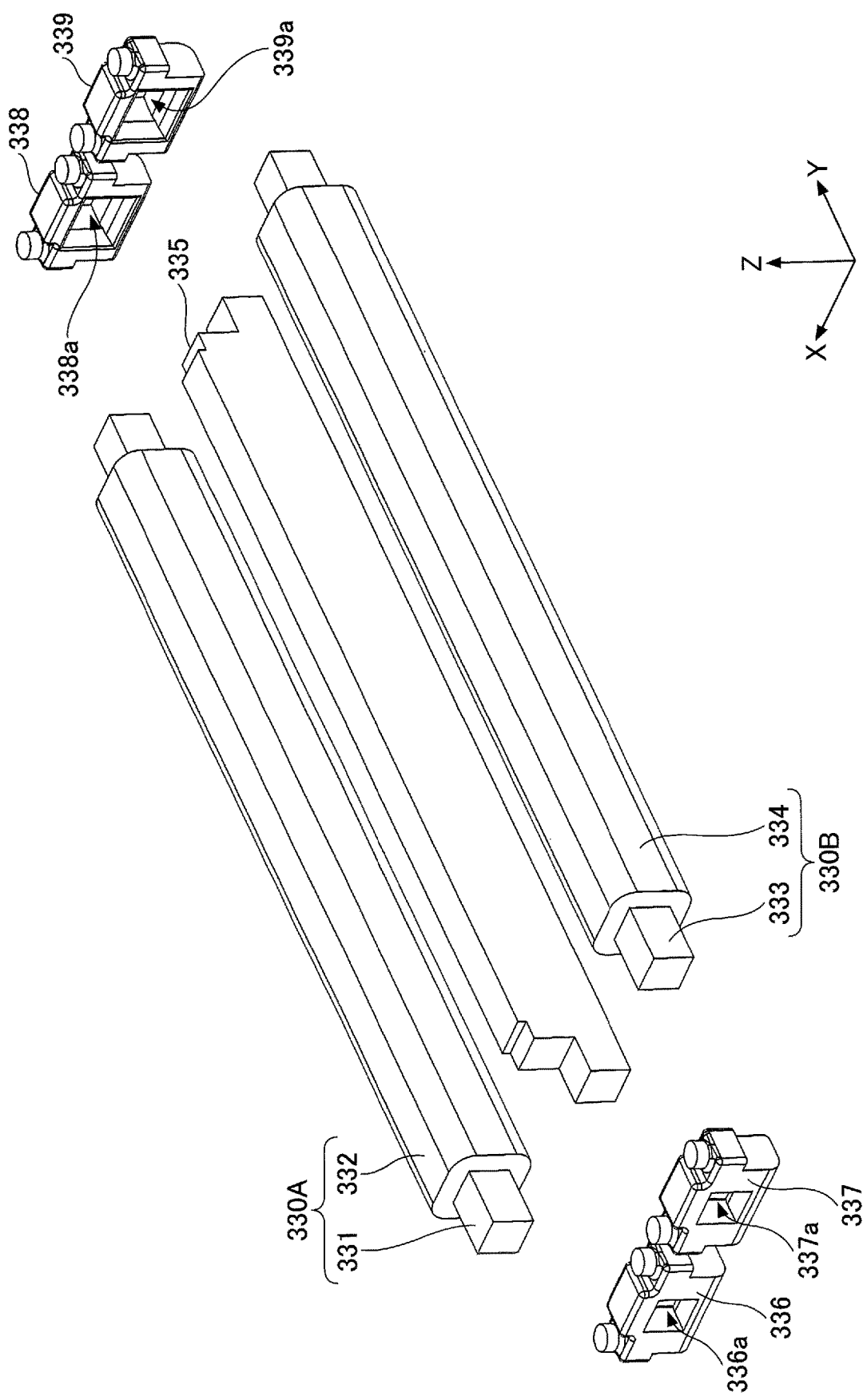
FIG. 27 is an exploded view of a vibrating body unit provided in a vibration generator according to a third embodiment.

FIG. 26 is a perspective view illustrating the vibrating body unit 330 provided in the vibration generator 30 according to the third embodiment. FIG. 27 is an exploded view of the vibrating body unit 330 provided in the vibration generator 30 according to the third embodiment.

As illustrated in FIG. 26 and FIG. 27, the vibrating body unit 330 includes the magnetic core 331, the coil 332, the magnetic core 333, the coil 334, a weight 335, and flanges from 336 to 339.

The magnetic core 331 and the coil 332 constitute the first electromagnet 330A. A configuration of the first electromagnet 330A is similar to the first electromagnet 130A described in the first embodiment. The magnetic core 333 and the coil 334 constitute the second electromagnet 330B. A configuration of the second electromagnet 330B is similar to the second electromagnet 130B described in the first embodiment. Each of the magnetic cores 331 and 333, and the coils 332 and 334 intersects the transverse direction (i.e., the first direction and the X axis direction in the drawing) that is a vibrating direction of the vibrating body unit 330, and extends in the front-back direction (i.e., the third direction and the Y axis direction in the drawing).

The weight 335 is a prism-shaped member having a fixed weight, and being disposed parallel to the first electromagnet 330A and the second electromagnet 330B, between the first electromagnet 330A and the second electromagnet 330B. As both ends of the weight 335 of the embodiment are held by the flanges from 336 to 339, the weight 335 is approximately the same length as the magnetic cores 331 and 333 in the longitudinal direction (i.e., the Y axis direction in the drawing).

The flanges from 336 to 339 are members formed by, for example, material having insulation. The flange 336 holds one end (i.e., an end on the negative side of the Y axis in the drawing) of the magnetic core 331 in a magnetic core holding portion 336a opened in a rectangle shape. The flange 337 holds one end (i.e., an end on the negative side of the Y axis in the drawing) of the magnetic core 333 in a magnetic core holding portion 337a opened in a rectangle shape. The flange 338 holds the other end (i.e., an end on the positive side of the Y axis in the drawing) of the magnetic core 331 in a magnetic core holding portion 338a opened in a rectangle shape. The flange 339 holds the other end (i.e., an end on the positive side of the Y axis in the drawing) of the magnetic core 333 in a magnetic core holding portion 339a opened in a rectangle shape.

The flange 336 and the flange 337 hold one end (i.e., an end on the negative side of the Y axis in the drawing) of the weight 335 between the flange 336 and the flange 337. The flange 338 and the flange 339 hold the other end (i.e., an end on the positive side of the Y axis in the drawing) of the weight 335 between the flange 338 and the flange 339.

On an upper surface of each of the flanges from 336 to 339, two column-shaped projections are formed. Each projection can collectively hold an end of an electric wire forming the coils 332 and 334 by winding the end of the electric wire. Additionally, each projection can hold the FPC with positioning the FPC at a predetermined position, for example, by being fit to a circle-shaped opening formed on the FPC (which is not illustrated).

As described above, in the vibrating body unit 330 of the vibration generator 30 of the embodiment, two electromagnets 330A and 330B are provided side by side in the transverse direction (i.e., the X axis direction in the drawing). This enables the vibration generator 30 of the embodiment to achieve thickness reduction of the vibrating body unit 330, and compensate for a decrease of a vibrating quantity accompanied with the thickness reduction (i.e., size reduction of an electromagnet) of the vibrating body unit 330, with two electromagnets 330A and 330B. Therefore, according to the vibration generator 30 of the embodiment, thickness reduction of the vibrating body unit 330 can be achieved and a sufficient vibration of the vibrating body unit 330 can be obtained.

In addition, in the vibration generator 30 of the embodiment, the vibrating body unit 330 includes the weight 335 having a fixed weight. This enables the vibration generator 30 of the embodiment to compensate for a decrease of weight accompanied with thickness reduction (i.e., size reduction of an electromagnet) of the vibrating body unit 330, with the weight 335. Therefore, according to the vibration generator 30 of the embodiment, thickness reduction of the vibrating body unit 330 can be achieved and a sufficient vibration of the vibrating body unit 330 in the transverse direction can be obtained.

(Configuration of the Elastic Support 340)

Figure 28:
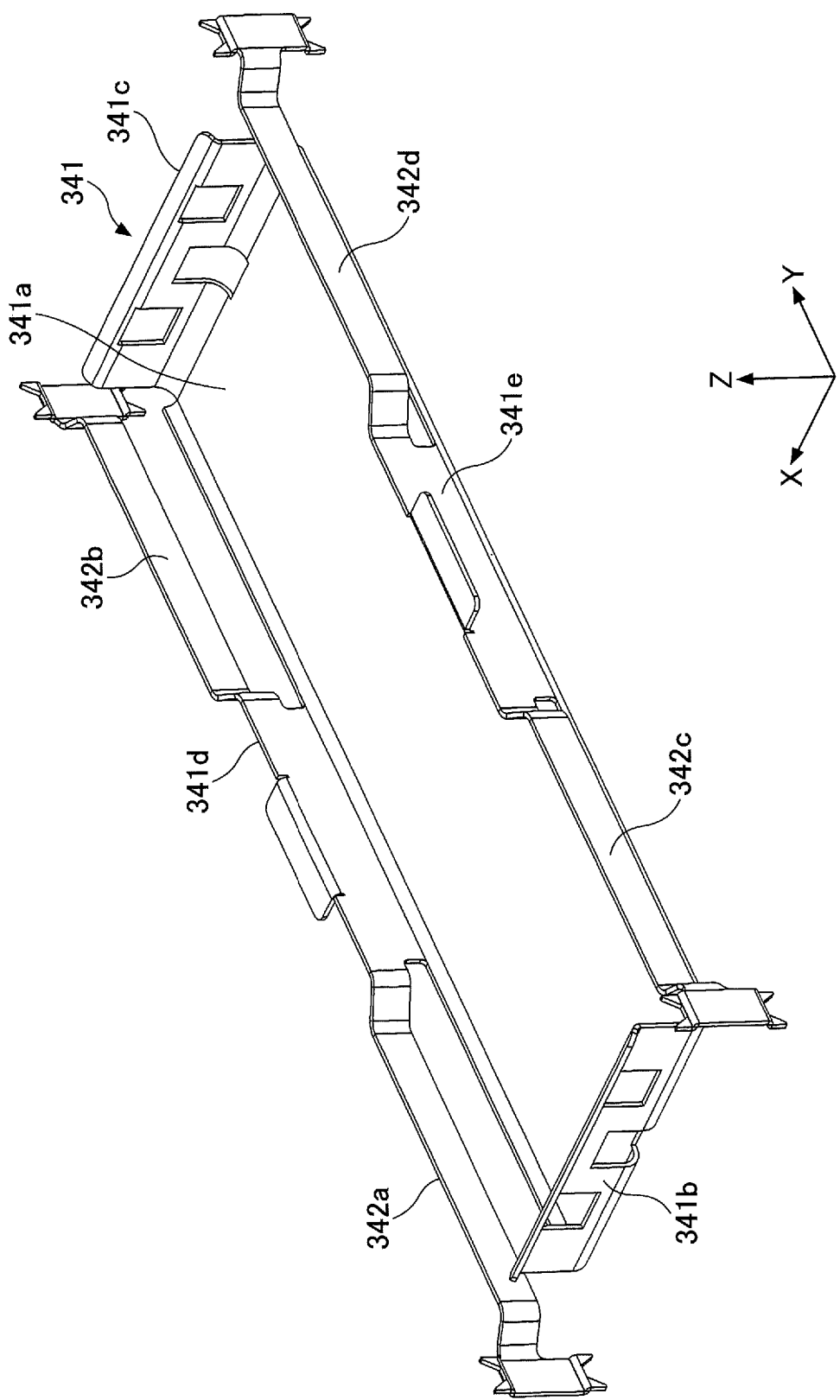
FIG. 28 is a perspective view illustrating an elastic support provided in a vibration generator according to a third embodiment.
Figure 29:
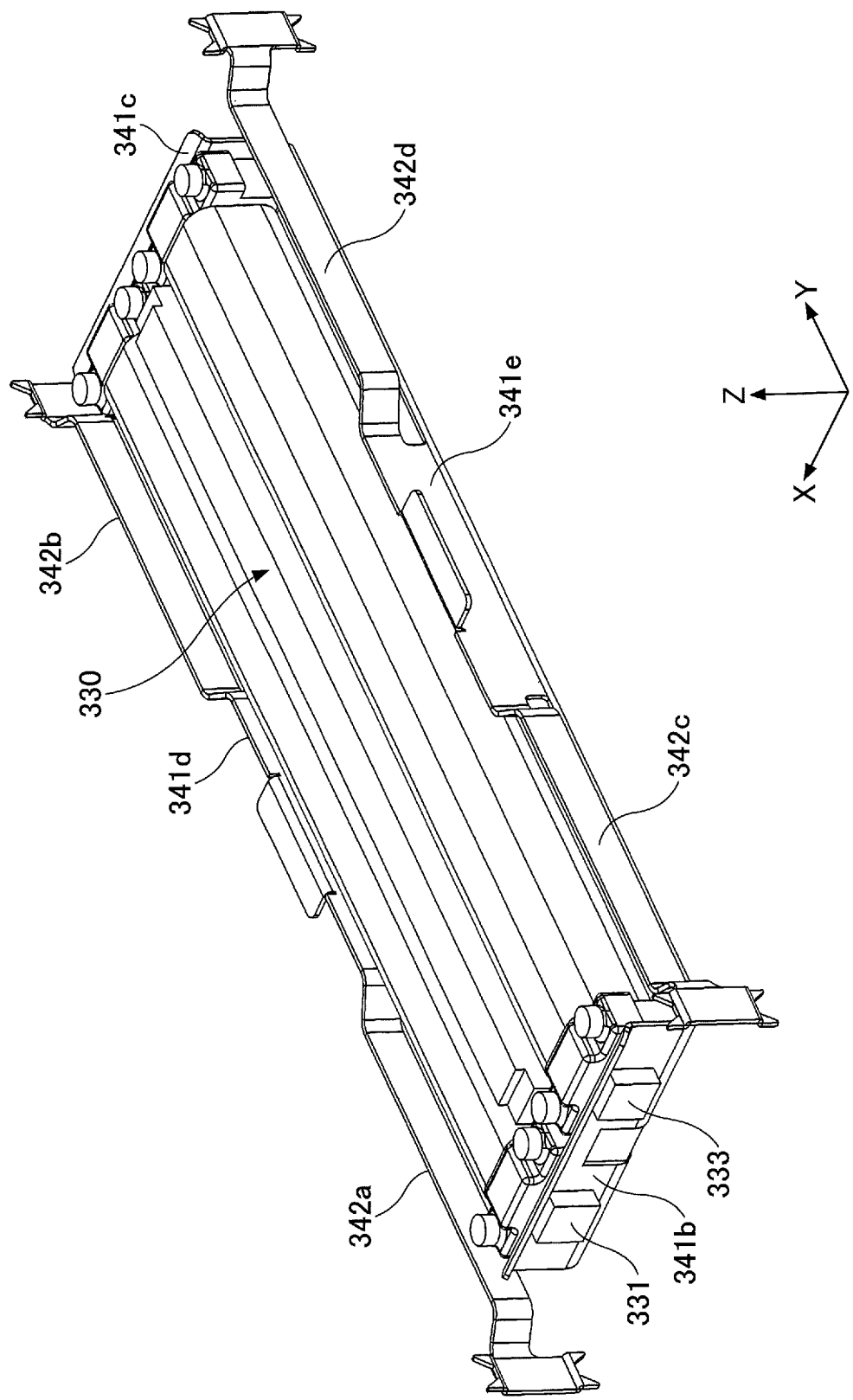
FIG. 29 is a perspective view illustrating an elastic support (in a state of supporting a vibrating body unit) provided in a vibration generator according to a third embodiment.
Figure 30:
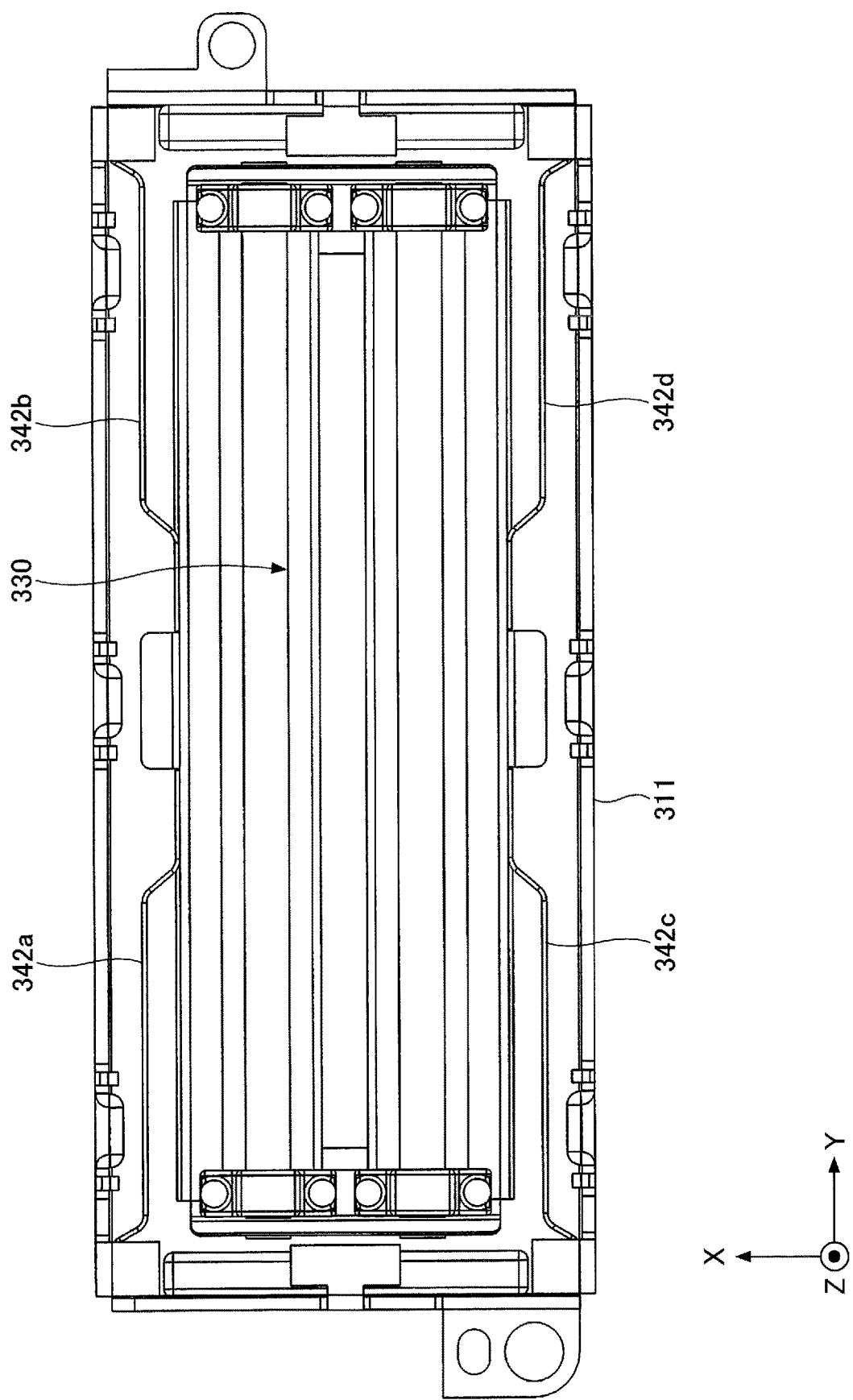
FIG. 30 is a plan view illustrating an elastic support (in a state of being incorporated in a lower case) provided in a vibration generator according to a third embodiment.

FIG. 28 is a perspective view illustrating the elastic support 340 provided in the vibration generator 30 according to the third embodiment. FIG. 29 is a perspective view illustrating the elastic support 340 (in a state in which an elastic support supports the vibrating body unit 330) provided in the vibration generator 30 according to the third embodiment. FIG. 30 is a plan view illustrating the elastic support 340 (in a state of being incorporated in the lower case 311) provided in the vibration generator 30 according to the third embodiment.

As illustrated in FIG. 28 and FIG. 29, the elastic support 340 includes a vibrating body holding portion 341 and an elastic arm. The vibrating body holding portion 341 is a tray-shaped portion holding the vibrating body unit 330. The vibrating body holding portion 341 is approximately formed in a rectangle shape in planar view from above.

The vibrating body holding portion 341 includes a bottom surface 341a, a first wall 341b, a second wall 341c, a first side wall 341d, and a second side wall 341e.

The bottom surface 341a is a planar part forming a rectangle shape having a transverse direction in the left-right direction (i.e., the X axis direction in the drawing) and a longitudinal direction in the front-back direction (i.e., the Y axis direction in the drawing). The vibrating body holding portion 341 of the embodiment does not require elastic deformation in the up-down direction, and is different from the vibrating body holding portion 141 of the first embodiment in that an opening is not formed on the bottom surface 341a.

The first wall 341b is a wall-shaped part erected vertically on one short side part (i.e., a short side part on the negative side of the Y axis in the drawing) of the bottom surface 341a. In the vibration generator 30 of the embodiment, a front part (i.e., a front part on the negative side of the Y axis in the drawing) of each of the magnetic cores 331 and 333 and the flanges 336 and 337 are securely supported by the first wall 341b with the front part of each of the magnetic cores 331 and 333 being flattened. This maintains a state in which one end of the weight 335 is held by the flanges 336 and 337. Specifically, in the first wall 341b, two rectangle-shaped opening portions are formed side by side in the transverse direction (i.e., the X axis direction in the drawing), and as illustrated in FIG. 29, by flattening or splitting and spreading the front part of each of the magnetic cores 331 and 333 after penetrating the front part into a corresponding opening portion of the two opening portions, the front part of each of the magnetic core 331 and the magnetic core 333 can be securely, supported. Here, as the front part of each of the magnetic core 331 and the magnetic core 333 is supported by a corresponding one of the flanges 336 and 337, the first wall 341b can securely support the flanges 336 and 337 at the same time by securely supporting the front part of each of the magnetic core 331 and the magnetic core 333. Furthermore, as the flanges 336 and 337 hold one end of the weight 335, the first wall 341b can maintain a state in which one end of the weight 335 is held by the flanges 336 and 337 by securely supporting the flanges 336 and 337.

The second wall 341c is a wall-shaped part erected vertically on the other short side part (i.e. a short side part on the positive side of the Y axis in the drawing) of the bottom surface 341a. In the vibration generator 30 of the embodiment, a front part (i.e., a front part on the positive side of the Y axis in the drawing) of each of the magnetic cores 331 and 333 and the flanges 338 and 339 are securely supported by the second wall 341c with the front part of each of the magnetic cores 331 and 333 being flattened. This maintains a state in which the other end of the weight 335 is held by the flanges 338 and 339. Specifically, in the second wall 341c, two rectangle-shaped opening portions are formed side by side in the transverse direction (i.e., the X axis direction in the drawing), and as illustrated in FIG. 29, by flattening or splitting and spreading the front part (i.e., a front part on the positive side of the Y axis in the drawing) of each of the magnetic cores 331 and 333 after penetrating the front part into a corresponding opening portion of the two opening portions, the front part of each of the magnetic core 331 and the magnetic core 333 can be securely supported. Additionally, as a front part of each of the magnetic core 331 and the magnetic core 333 is supported by a corresponding one of the flanges 338 and 339, the second wall 341c can securely support the flanges 338 and 339 at the same time by securely supporting the front part of each of the magnetic core 331 and the magnetic core 333. Furthermore, as the flanges 338 and 339 hold the other end of the weight 335, the second wall 341c can maintain a state in which the other end of the weight 335 is held by the flanges 338 and 339 by securely supporting the flanges 338 and 339.

The first side wall 341d is a wall-shaped part erected vertically on one long side part (i.e., a long side part on the positive side of the X axis in the drawing) of the bottom surface 341a. The second side wall 341e is a wall-shaped part erected vertically on the other long side part (i.e. a long side part on the negative side of the X axis in the drawing) of the bottom surface 341a.

The elastic arm is a thin long plate portion extending straight along the longitudinal direction (i.e., the Y axis direction in the drawing) of the vibrating body holding portion 341 on each of the left and right outer sides of the vibrating body holding portion 341. The elastic arm is a portion that functions as what is called a flat spring, and enables the vibrating body unit 330 to vibrate in the transverse direction (i.e., the X axis direction in the drawing) by the elastic arm being elastically deformed. In the embodiment, the elastic support 340 includes four elastic arms 342a, 342b, 342c, and 342d.

The elastic arm 342a is a portion extending straight along one long side part (i.e., a long side part on the positive side of the X axis in the drawing) of the bottom surface 341a from one end (i.e., an end on the negative side of the Y axis in the drawing) of the first side wall 341d. The elastic arm 342b is a portion extending straight along one long side part (i.e., a long side part on the positive side of the X axis in the drawing) of the bottom surface 341a from the other end (i.e., an end on the positive side of the Y axis in the drawing) of the first side wall 341d.

The elastic arm 342c is a portion extending straight along the other long side part (i.e., a long side part on the negative side of the X axis in the drawing) of the bottom surface 341a from one end (i.e., an end on the negative side of the Y axis in the drawing) of the second side wall 341e. The elastic arm 342d is a portion extending straight along the other long side part (i.e., a long side part on the negative side of the X axis in the drawing) of the bottom surface 341a from the other end (i.e., an end on the positive side of the Y axis in the drawing) of the second side wall 341e.

The elastic support 340 configured as described above is elastically deformed in the transverse direction (i.e., the X axis direction in the drawing) mainly by each of the elastic arms from 342a to 342d being largely bent in the transverse direction (i.e., the X axis direction in the drawing). Here, as each of the elastic arms from 342a to 342d is relatively short in a vertical length (i.e., a length in the Z axis direction in the drawing), and a straight portion extending along the longitudinal direction (i.e., the Y axis direction in the drawing) of the vibrating body holding portion 341 is sufficiently long; that is, as the straight portion has a sufficient elastic effective length, each of the elastic arms from 342a to 342d can be largely bent in the transverse direction (i.e., the X axis direction in the drawing). This enables the vibration generator 30 of the embodiment to achieve thickness reduction of the vibrating body unit 330 and obtain a sufficient vibration in the transverse direction (i.e., the X axis direction in the drawing) of the vibrating body unit 330.

As illustrated in FIG. 28 to FIG. 30, the front part of each of the elastic arms from 342a to 342d is bent in a crank shape outward, and a flat portion (i.e., an example of a housing fixing portion) positioned outside the straight portion (i.e., an elastic effective portion) extending along the longitudinal direction (i.e., the Y axis direction in the drawing) of the vibrating body holding portion 341, is formed. The front part of each of the elastic arms from 342a to 342d is fixed to a corresponding position on an inner surface of the side wall of the lower case 311 of the housing 310 by a selectable fixing method (such as an adhesive, a rivet, and a screw) on the flat portion. As illustrated in FIG. 30, this can approximately position the straight portion of each of the elastic arms from 342a to 342d in a center between the side wall of the vibrating body holding portion 341 and the side wall of the lower case 311, and enables the vibration generator 30 of the embodiment to obtain a sufficient range of vibration in the left-right direction (i.e., the X axis direction in the drawing) in each of the elastic arms from 342a to 342d. The embodiment adopts a configuration that the flat portion of each of the elastic arms from 342a to 342d is fixed to a corresponding internal surface of a side wall of the lower case 311 by being pressed against a corresponding internal surface of a side wall of the lower case 311 with outward spring force of each of the elastic arms from 342a to 342d.

(Magnetization State of the Permanent Magnet 351)

Figure 31:
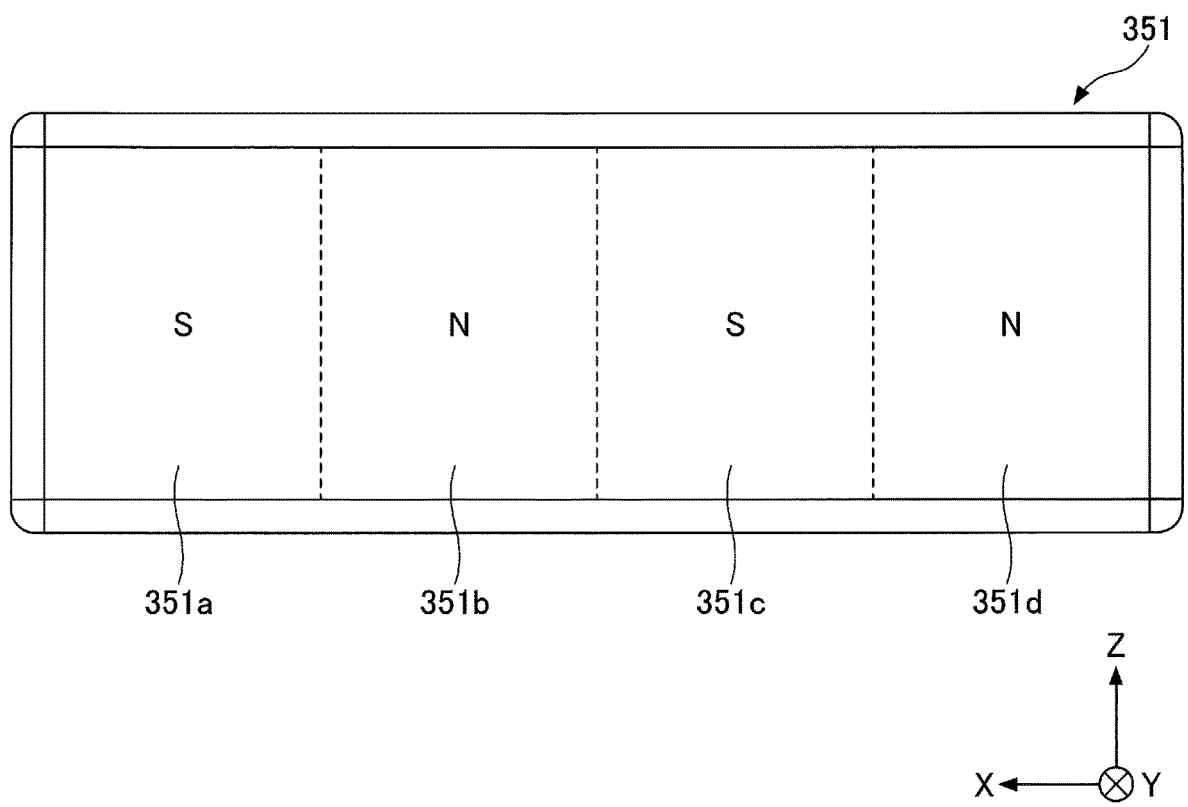
FIG. 31 is a drawing for describing a magnetization state of a permanent magnet provided in a vibration generator according to a third embodiment.

FIG. 31 is a drawing for describing a magnetization state of the permanent magnet 351 provided in the vibration generator 30 according to the third embodiment. Here, a magnetization state of the permanent magnet 351 in planar view of the permanent magnet 351 from the negative side of the Y axis will be described.

As illustrated in FIG. 31, the permanent magnet 351 is divided into four regions arranged in the transverse direction (i.e., the X axis direction in the drawing) in planar view from the negative side of the Y axis in the drawing, and each region is magnetized to a magnetic pole different from an adjacent region. For example, in an example illustrated in FIG. 31, a first magnetization region 351a, which is a first region from the left, is magnetized to the south pole, and a second magnetization region 351b, which is a second region from the left, is magnetized to the north pole. The magnetization regions 351a and 351b are regions facing one end (i.e., an end on the negative side of the Y axis in the drawing) of the magnetic core 331 provided in the vibrating body unit 330. Additionally, in the example illustrated in FIG. 31, a third magnetization region 351c, which is a third region from the left, is magnetized to the south pole, and a fourth magnetization region 351d, which is a fourth region from the left, is magnetized to the north pole. The magnetization regions 351c and 351d are regions facing one end (i.e., an end on the negative side of the Y axis in the drawing) of the magnetic core 333 provided in the vibrating body unit 330.

Although not illustrated, as in the permanent magnet 351, the permanent magnet 352 provided in a position facing the permanent magnet 351 is divided into four regions arranged in the transverse direction (i.e., the X axis direction in the drawing) in plan view from the negative side of the Y axis in the drawing, and each region is magnetized to a magnetic pole different from an adjacent region. However, in the permanent magnet 352, as opposed to the permanent magnet 351, a first magnetization region, which is a first region from the left, is magnetized to the north pole, and a second magnetization region, which is a second region from the left is magnetized to the south pole. The first and second magnetization regions are regions facing the other end (i.e., an end on the positive side of the Y axis in the drawing) of the magnetic core 331 provided in the vibrating body unit 330. Additionally, in the permanent magnet 352, a third magnetization region, which is a third region from the left, is magnetized to the north pole, and a fourth magnetization region, which is a fourth region from the left, is magnetized to the south pole. The third and fourth magnetization regions are regions facing the other end (i.e., an end on the positive side of the Y axis in the drawing) of the magnetic core 333 provided in the vibrating body unit 330.

In the vibration generator 30 of the embodiment, a permanent magnet magnetized to four poles is provided to each of front and rear of two electromagnets 330A and 330B. Instead, two permanent magnets each magnetized to two poles may be used. Alternatively, four permanent magnets each magnetized to one pole may be used.

(Operation of the Vibrating Body Unit 330)

Figure 32A:
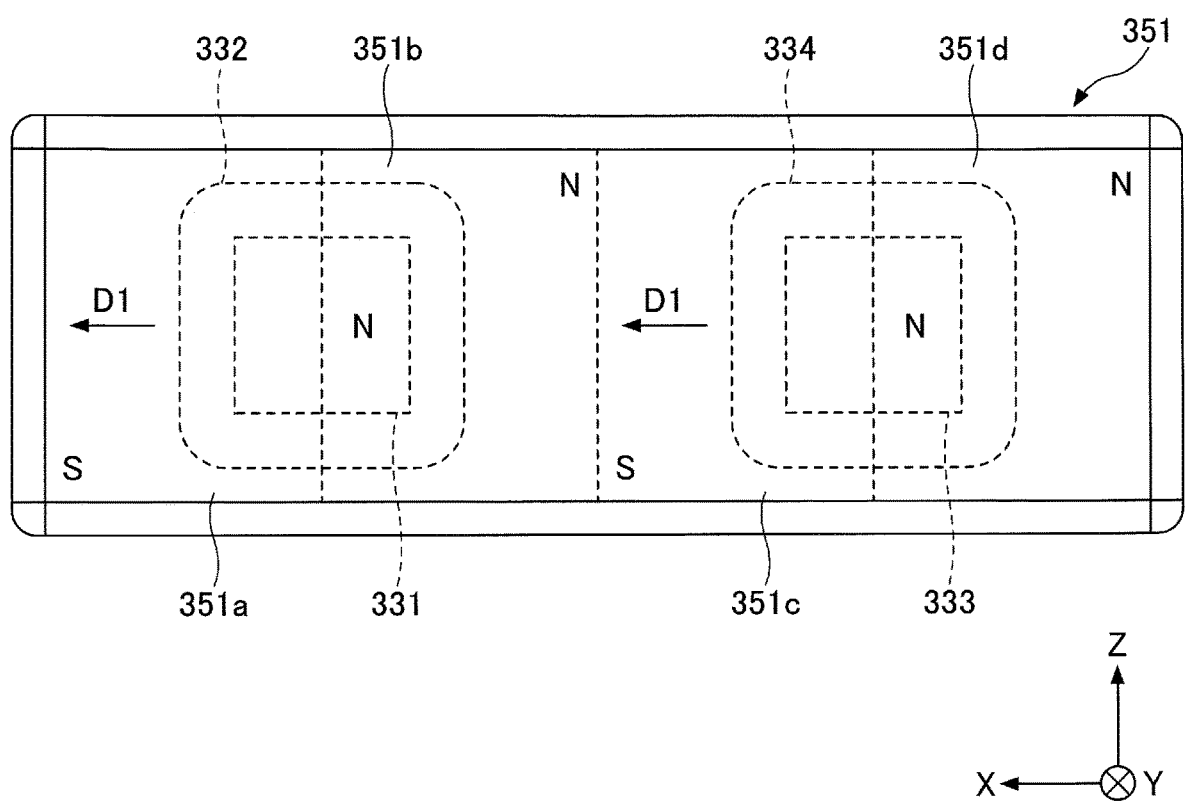
FIG. 32A is a drawing for describing an operation of a vibrating body unit provided in a vibration generator according to a third embodiment.
Figure 32B:
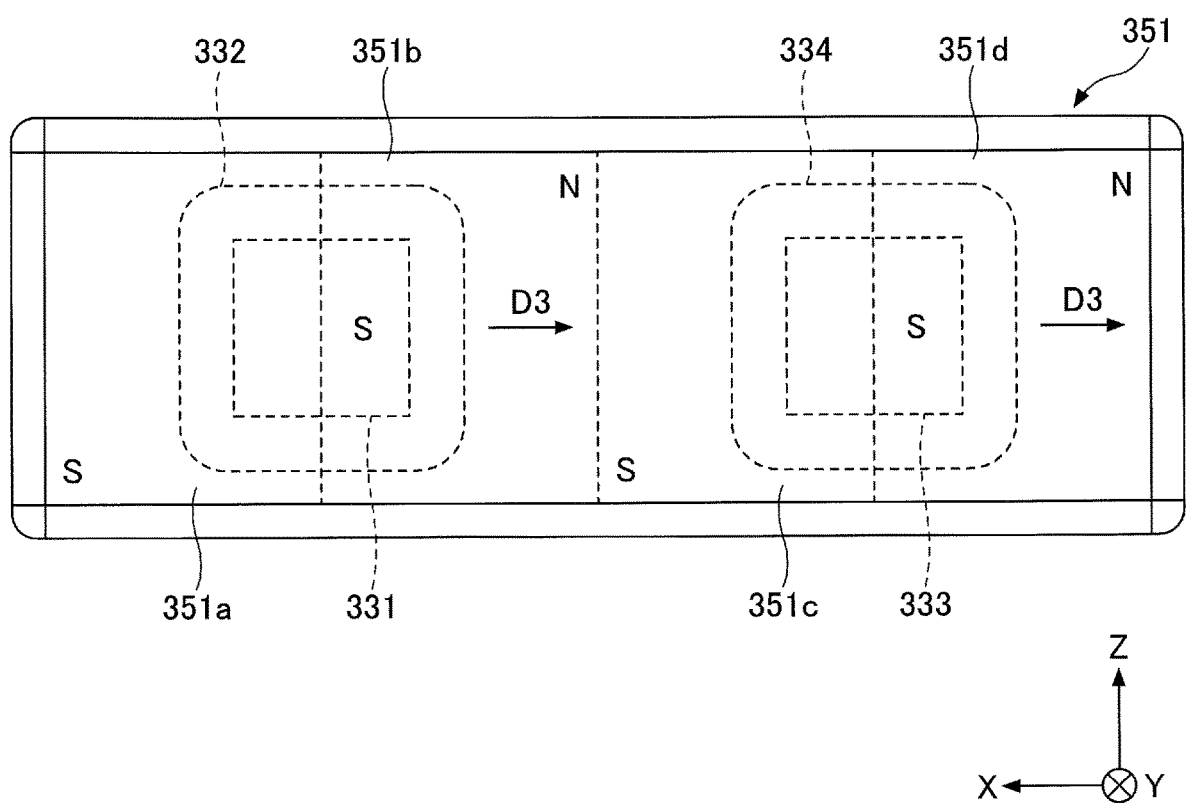
FIG. 32B is a drawing for describing an operation of a vibrating body unit provided in a vibration generator according to a third embodiment.

FIG. 32A and FIG. 32B are drawings for describing an operation of the vibrating body unit 330 provided in the vibration generator 30 according to the third embodiment.

In the vibration generator 30 of the embodiment, both ends of the magnetic core 331 are magnetized such that both ends of the magnetic core 331 have polarities different from each other by causing an alternating current to flow through the coil 332 constituting the first electromagnet 330A and generating an alternating magnetic field around the first electromagnet 330A.

In the vibration generator 30 of the embodiment, both ends of the magnetic core 333 are magnetized such that both ends of the magnetic core 333 have polarities different from each other by causing an alternating current to flow through the coil 334 constituting the second electromagnet 330B and generating an alternating magnetic field around the second electromagnet 330B.

For example, as illustrated in FIG. 32A, when one end of each of the magnetic core 331 and the magnetic core 333 (i.e., an end on the negative side of the Y axis in the drawing) is magnetized to the north pole, an attractive force toward the first magnetization region 351a (i.e., the south pole) of the permanent magnet 351 and a repulsive force repelling the second magnetization region 351b (i.e., the north pole) of the permanent magnet 351 are generated on one end of the magnetic core 331. Simultaneously, on the other end of the magnetic core 331 magnetized to the south pole, an attractive force toward the first magnetization region (i.e., the north pole) of the permanent magnet 352 and a repulsive force repelling the second magnetization region (i.e., the south pole) of the permanent magnet 352 are generated.

On one end of the magnetic core 333, an attractive force toward the third magnetization region 351c (i.e., the south pole) of the permanent magnet 351 and a repulsive force repelling the fourth magnetization region 351d (i.e., the north pole) of the permanent magnet 351 are generated. Simultaneously, on the other end of the magnetic core 333 magnetized to the south pole, an attractive force toward the third magnetization region (i.e., the north pole) of the permanent magnet 352 and a repulsive force repelling the fourth magnetization region (i.e., the south pole) of the permanent magnet 352 are generated.

This moves the vibrating body unit 330 to the left (i.e., the arrow D1 direction in the drawing). At this time, a thrust force of the vibrating body unit 330 directed to the left is a total of a thrust force of the first electromagnet 330A directed to the left and a thrust force of the second electromagnet 330B directed to the left. This enables the vibrating body unit 330 to obtain a sufficient thrust force for vibrating with a predetermined resonance frequency while elastically deforming the elastic support 340.

In contrast, as illustrated in FIG. 32B, when one end of each of the magnetic core 331 and the magnetic core 333 (i.e., an end on the negative side of the Y axis in the drawing) is magnetized to the south pole, an attractive force toward the second magnetization region 351b (i.e., the north pole) of the permanent magnet 351 and a repulsive force repelling the first magnetization region 351a (i.e., the south pole) of the permanent magnet 351 are generated on one end of the magnetic core 331. Simultaneously, on the other end of the magnetic core 331 magnetized to the north pole, an attractive force toward the second magnetization region (i.e., the south pole) of the permanent magnet 352 and a repulsive force repelling the first magnetization region (i.e., the north pole) of the permanent magnet 352 are generated.

On one end of the magnetic core 333, an attractive force toward the fourth magnetization region 351d (i.e., the north pole) of the permanent magnet 351 and a repulsive force repelling the third magnetization region 351c (i.e., the south pole) of the permanent magnet 351 are generated. Simultaneously, on the other end of the magnetic core 333 magnetized to the north pole, an attractive force toward the fourth magnetization region (i.e., the south pole) of the permanent magnet 352 and a repulsive force repelling the third magnetization region (i.e., the north pole) of the permanent magnet 352 are generated.

This moves the vibrating body unit 330 to the right (i.e., the arrow D3 direction in the drawing). At this time, a thrust force of the vibrating body unit 330 directed to the right is a total of a thrust force of the first electromagnet 330A directed to the right and a thrust force of the second electromagnet 330B directed to the right. This enables the vibrating body unit 330 to obtain a sufficient thrust force for vibrating with a predetermined resonance frequency while elastically deforming the elastic support 340.

As described above, in the vibration generator 30 of the embodiment, a moving direction of the vibrating body unit 330 is determined in the left direction or the right direction by a direction in which a current flows through the coils 332 and 334. Thus, in the vibration generator 30 of the embodiment, by supplying an alternating current to the coils 332 and 334, movement of the vibrating body unit 330 in the left direction (i.e., the arrow D1 direction in the drawing) as illustrated in FIG. 32A and movement of the vibrating body unit 330 in the right direction (i.e., the arrow D3 direction in the drawing) as illustrated in FIG. 32B are alternately repeated. This causes the vibrating body unit 330 to vibrate in left-right direction (i.e., the X axis direction in the drawing).

The vibrating body unit 330 is supported by the elastic support 340, and vibrates along the transverse direction (i.e., the X axis direction in the drawing) with a first natural frequency. The first natural frequency is a frequency determined in accordance with a first elastic modulus and quantity of the vibrating body unit 330. That is, the vibrating body unit 330 sufficiently vibrates along the transverse direction (i.e., the X axis direction in the drawing) by controlling a frequency of an alternating current supplied to the coils 132 and 134 from an external circuit, and generating an alternating magnetic field with the same frequency of the first natural frequency around each of the first electromagnet 330A and the second electromagnet 330B.

Embodiments have been described in detail above. However, the present invention is not limited to these embodiments, and various modifications and changes can be made without departing from the spirit of the invention described in the claims.

For example, a configuration of the elastic arm provided in the elastic support (for example, number, length, etc.) is not limited to the configuration described in the first to third embodiments. Further, for example, a configuration of the elastic beam provided in the elastic support (for example, number, shape, width, an installation position, etc.) is not limited to the configuration described in the first to third embodiments. That is, configurations of the elastic arm and the elastic beam can be appropriately changed in accordance with various specifications of the vibration generator (for example, desired resonance frequency, a limit of the size of the housing, etc.). Additionally, the housing fixing portion provided at the front of the elastic arm is not limited to a planar shape described in the first and second embodiments above, and may be a shape convenient for being fixed to the housing. For example, the housing fixing portion may be a bent shape fitting to a shape of an installation position of the housing and may be a curved surface shape fitting to an installation surface of the housing.

Further, for example, in the vibration generators 10, 20, and 30 according to the first to third embodiments described above, an opening portion may not be provided on the bottom surface of the holding portion of the elastic support. That is, in the first to second embodiments described above, an opening portion is provided on the bottom surface of the holding portion of the elastic support so that the elastic support is easily elastically deformed especially in the up-down direction, but an opening portion may not be provided if a vibration with desired resonance frequency can be obtained without an opening portion.

In the first to third embodiments described above, two electromagnets are arranged in the transverse direction in each of the vibrating body units 130, 230 and 330, but the present invention is not limited to these. For example, three or more electromagnets may be arranged in the transverse direction in each of the vibrating body units 130, 230 and 330.

Further, in the first to third embodiments described above, one weight is provided between two electromagnets in each of the vibrating body units 130, 230 and 330, but the present invention is not limited to this. For example, in each of the vibrating body units 130, 230 and 330, two or more weights may be provided and a weight may be provided at a position other than a position between the two electromagnets. Additionally, a weight with a shape other than a prism shape may be provided.

In the first to third embodiments described above, multiple electromagnets are provided on the vibrating body units 130, 230, and 330 as first magnetic field generators, and multiple permanent magnets are provided on the housings 110, 210, and 310 as second magnetic field generators, but the present invention is not limited to these. That is, multiple permanent magnets may be provided on the vibrating body units 130, 230 and 330 as first magnetic field generators, and multiple electromagnets may be provided on the housings 110, 210, and 310 as second magnetic field generators.

In the first to third embodiments described above, the vibrating body holding portions 141, 241, and 341 are configured to hold the vibrating body units 130, 230, and 330 respectively, but the present invention is not limited to these. The vibrating body holding portions 141, 241, and 241 may be simply configured to be fixed to the vibrating body units 130, 230, and 330 respectively.

For example, the configuration provided in the vibration generator 30 of the third embodiment (for example, the fixing portion formed by the tab, the configuration for engaging the housing by the hook, the configuration for holding the front part of the magnetic core by the flange, etc.) may be provided in the vibration generators 10 and 20 of the first and second embodiments.

What is claimed is:

1. A vibration generator, comprising:
   a housing;
   a vibrating body accommodated in the housing;
   an elastic support supporting the vibrating body such that the vibrating body can vibrate along a first direction and a second direction intersecting each other; and
   a magnetic drive configured to drive the vibrating body along the first direction and the second direction using a magnetic force,
   wherein the magnetic drive includes a plurality of first magnetic field generators disposed side by side at a predetermined interval in the vibrating body in the first direction or the second direction, and a plurality of second magnetic field generators disposed on positions facing both ends of each of the plurality of first magnetic field generators in the housing, and
   wherein a longitudinal direction of the housing is in a third direction intersecting the first direction and the second direction.

2. The vibration generator as claimed in claim 1, wherein a first magnetic field generator among the plurality of first magnetic field generators is an electromagnet including a magnetic core and a coil, and a second magnetic field generator among the plurality of second magnetic field generators is a permanent magnet.

3. The vibration generator as claimed in claim 1, wherein the housing includes a lower case and an upper case that can be separated from each other, and each of the lower case and the upper case includes a flat plate tab projecting outside, and the flat plate tab of the lower case and the flat plate tab of the upper case form a fixing portion fixing the housing to a target device by overlapping each other in a state of the lower case and the upper case being coupled with each other.

* * * * *